United States Patent [19]
Inoue

[11] Patent Number: 5,214,312
[45] Date of Patent: May 25, 1993

[54] POWER FEED LINE SWITCHING CIRCUIT FOR SUBMARINE BRANCHING DEVICE AND METHOD OF FEEDING POWER TO SUBMARINE CABLE COMMUNICATION SYSTEM

[75] Inventor: Yoshiyuki Inoue, Kawasaki, Japan

[73] Assignee: Fujitsu Limited, Kawasaki, Japan

[21] Appl. No.: 728,190

[22] Filed: Jul. 10, 1991

[30] Foreign Application Priority Data

Jul. 10, 1990 [JP] Japan ................................. 2-182150
Jul. 10, 1990 [JP] Japan ................................. 2-182151
Jul. 10, 1990 [JP] Japan ................................. 2-182152

[51] Int. Cl.$^5$ ............................................. H04B 3/00
[52] U.S. Cl. ...................................... 307/43; 307/112
[58] Field of Search ................ 361/88, 93, 160, 170, 361/191; 307/43, 112, 125, 130, 131

[56] References Cited

U.S. PATENT DOCUMENTS

| | | | |
|---|---|---|---|
| 3,644,787 | 2/1972 | Hamilton | 361/56 |
| 4,419,591 | 12/1983 | Irokawa et al. | 307/45 |
| 4,621,198 | 11/1986 | Roberge et al. | 307/82 |
| 4,679,115 | 7/1987 | Connan et al. | 361/119 |
| 4,724,391 | 2/1988 | Blahous | 324/424 |
| 4,798,969 | 1/1989 | Inoue et al. | 307/112 |

FOREIGN PATENT DOCUMENTS

| | | |
|---|---|---|
| 63-189025 | 8/1988 | Japan . |
| 1-200832 | 8/1989 | Japan . |
| 1-276937 | 11/1989 | Japan . |
| 2-53332 | 2/1990 | Japan . |
| 999429 | 5/1962 | United Kingdom . |
| 2147178A | 5/1985 | United Kingdom . |
| 2202110A | 9/1988 | United Kingdom . |

Primary Examiner—Jeffrey A. Gaffin
Attorney, Agent, or Firm—Staas & Halsey

[57] ABSTRACT

A power feed line switching circuit for a submarine branching unit has first, second and third electrical paths connected in a Y-shaped connection, and first, second and third terminals connected respectively thereto. The power feed line switching circuit also has first, second and third relays each including a drive unit inserted in the first, second and third terminals and a switching unit for disconnecting the corresponding terminal and connecting the terminal to the ground, respectively. These relays are used to control the connections between the terminals and electrical paths, for establishing a one-end power feed line or a both-end power feed line to maintain power feed for repeaters and the submarine branching unit by the plurality of relays, even though a fault is caused in the optical marine cables for cable landing stations.

39 Claims, 50 Drawing Sheets

BOTH-END POWER FEED SYSTEM

——: EFFECTIVE OPTICAL MARINE CABLE
(ARROW INDICATE FLOWING DIRECTION OF CURRENT)

---: FAULTY OPTICAL MARINE CABLE

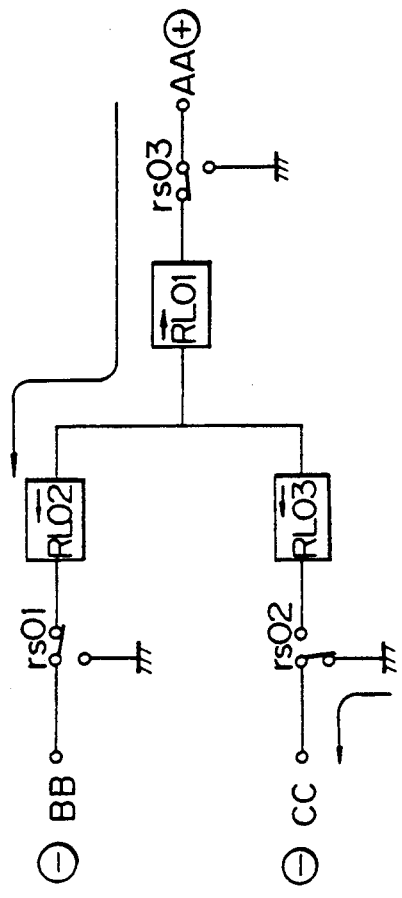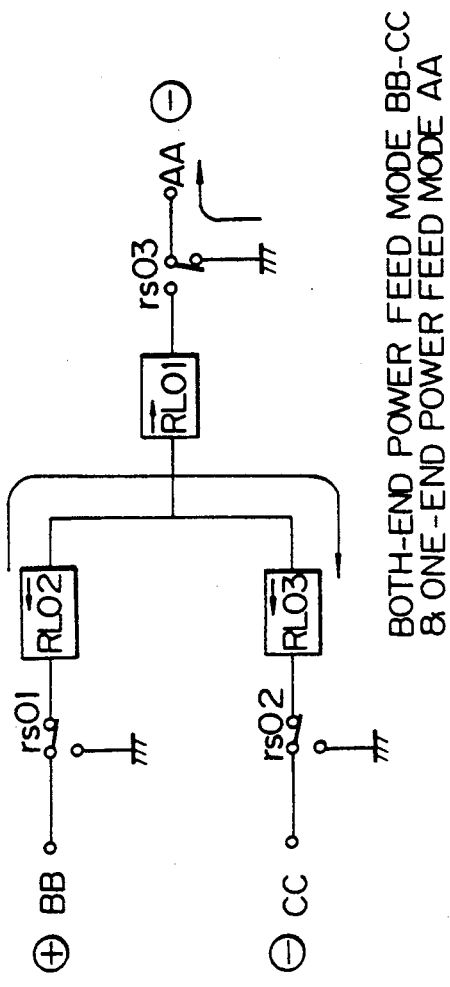
Fig. 24A
Fig. 24B

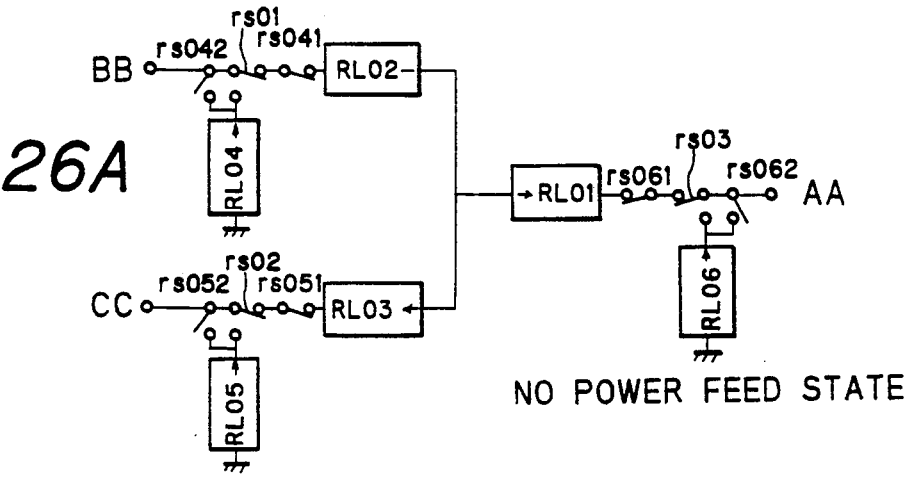
NO POWER FEED STATE
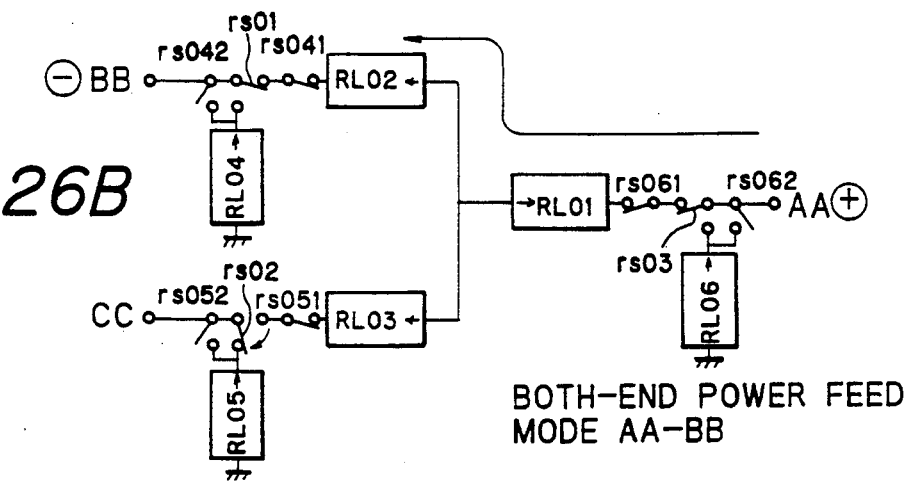
BOTH-END POWER FEED MODE AA-BB
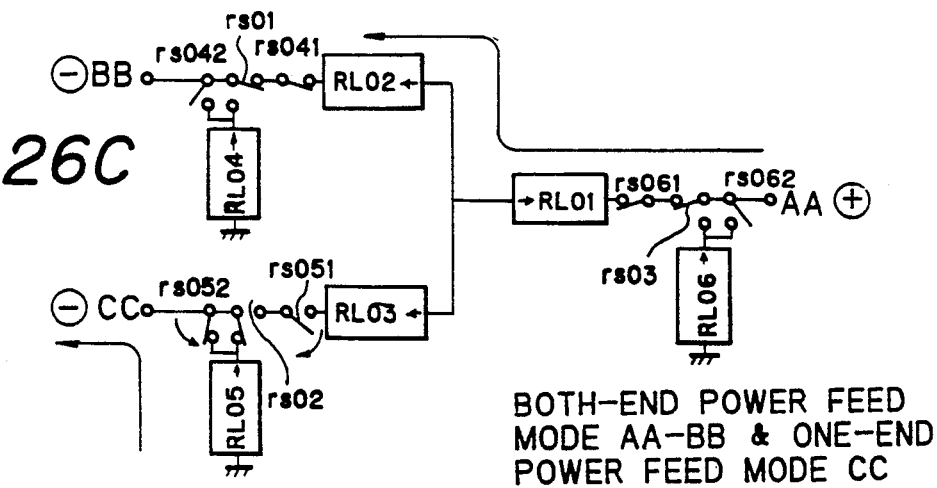
BOTH-END POWER FEED MODE AA-BB & ONE-END POWER FEED MODE CC

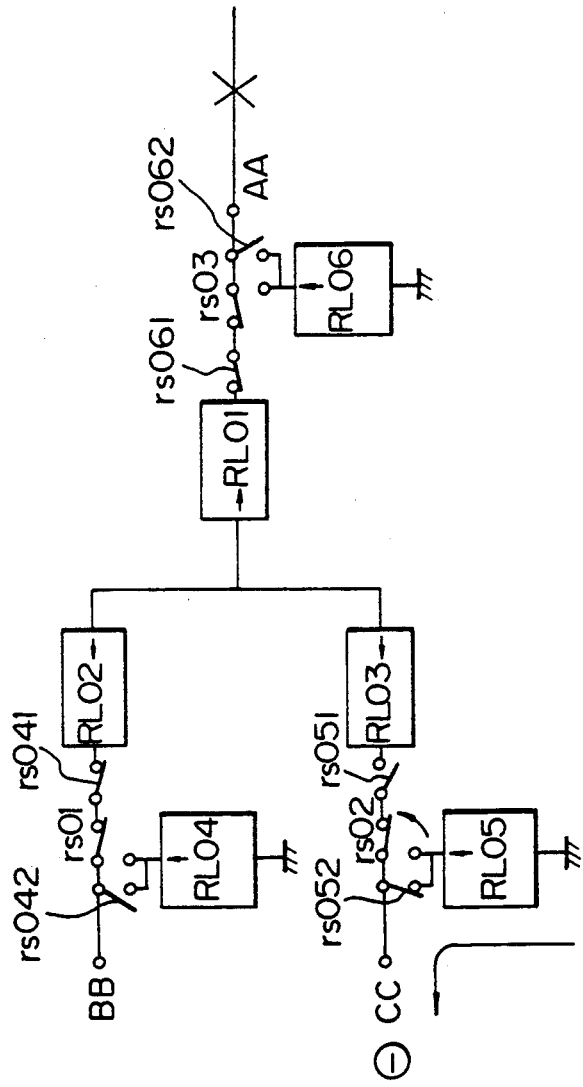

BOTH-END POWER FEED
MODE AA-BB & ONE-END
POWER FEED MODE CC

BOTH-END POWER FEED
MODE BB-CC & ONE-END
POWER FEED MODE AA

BOTH-END POWER FEED
MODE CC-AA & ONE-END
POWER FEED MODE BB

Fig. 37A  Fig. 37B
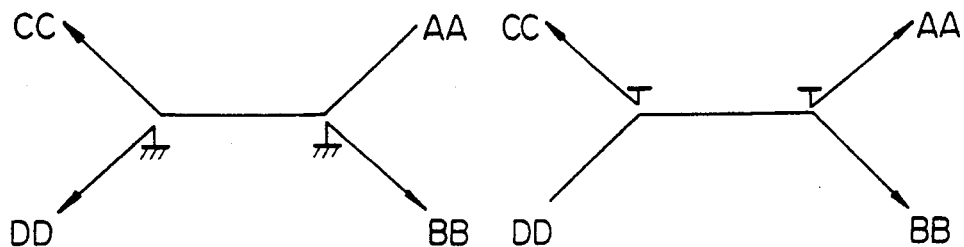
POSSIBLE POWER FEED LINE FORMATIONS IN NORMAL STATE
Fig. 37C  Fig. 37D
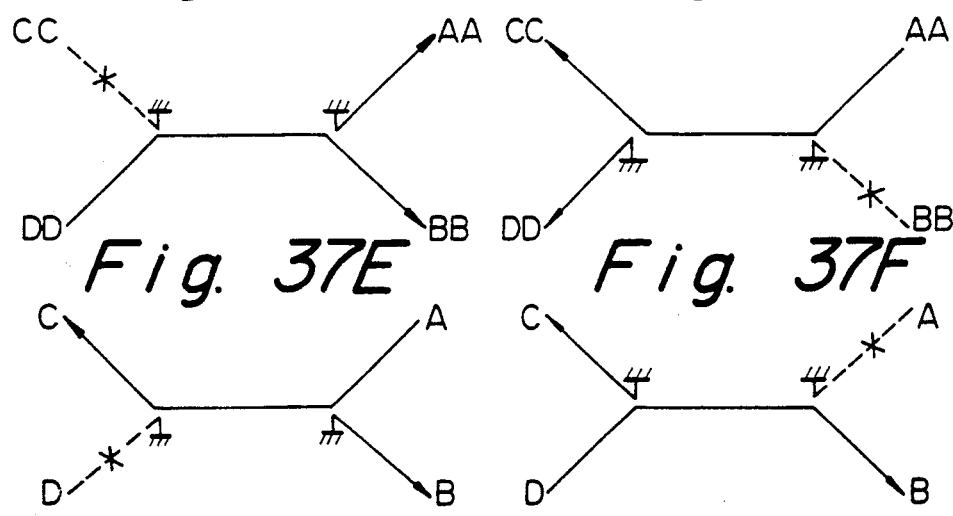
Fig. 37E  Fig. 37F
Fig. 37G
POSSIBLE POWER FEED LINE FORMATIONS IN ABNORMAL STATE

POWER FEED LINE SWITCHING CIRCUIT FOR SUBMARINE BRANCHING DEVICE AND METHOD OF FEEDING POWER TO SUBMARINE CABLE COMMUNICATION SYSTEM

BACKGROUND OF THE INVENTION

1. Field of the Invention

The present invention relates to a power feed line switching circuit for a submarine branching device and a method of feeding power to a submarine cable communication system. More particularly, the present invention is directed to a power feed line switching circuit for a submarine branching unit incorporated into a submarine cable communication system in which submarine cables are branched undersea to enable communication between three or more land stations, and further, to a method of feeding power employing the power feed line switching circuit.

2. Description of the Related Art

Generally, a submarine cable communication system, particularly, a submarine optical communication system using optical marine cables (OMC) is provided with optical repeaters (REP) at specific intervals in each of the optical marine cables. Note, in the prior art, a one-end power feed system (mode) and a both-end power feed system have been used in the submarine optical communication system.

A constant DC current is supplied through a power feed line of the optical marine cable to the optical repeaters. The DC current is supplied to the optical repeaters in either the one-end power feed mode in which the DC current is supplied from only one land station or the both-end power feed mode in which the DC current is supplied from two land stations. The both-end power feed mode is preferable because of a high reliability, and it is preferable to switch the power feed line when a fault occurs in the power feed line so that a set power feed line is a both-end power feed line, as much as possible.

In the one-end power feed system having three cable landing stations of the prior art, respective power feed units of the three cable landing stations are connected individually by power feed lines to a submarine branching unit (BU). Power is fed in the one-end power feed mode only from each of the cable landing stations to the submarine branching unit and the repeaters.

The conventional submarine optical cable communication system including three or more cable landing stations sets a power feed line by changing the power feed line switching circuit of the submarine branching unit for one-end power feed or both-end power feed. Note, the conventional power feed line switching circuits for a submarine optical cable communication system communicating between three or more cable landing stations are, for example, disclosed in Unexamined Japanese Patent Publication (Kokai) Nos. 2-53332, 1-200832, 1-276937 and 63-189025 (corresponding to U.S. Pat. No. 4,798,969 and G.B. Patent No. 2,202,110). The configurations and problems of these prior art power feed line switching circuits will be explained later with reference to the accompanying drawings.

SUMMARY OF THE INVENTION

An object of the present invention is to provide a power feed line switching circuit of a both-end power feed system having a high reliability for a submarine branching unit, capable of establishing a both-end power feed line as much as possible.

It is another object of the present invention to provide the switching of feed lines when a fault occurs in a power feed line, and to employ a power feed method using the power feed line switching circuit.

Another object of the present invention is to enable, even if a fault occurs in any one of the optical marine cables connected to the submarine branching unit, communication to be continued between the rest of the optical marine cables, to enable the set power feed line to serve as a both-end power feed as much as possible, to enable a power feed line to be set by a comparatively simple power feed line setting procedure, and to maintain the set power feed line even if a fault occurs in the cable during operation.

Still another object of the present invention is to provide a power feed line switching circuit for a submarine branching unit, capable of isolating the power feed lines of all the submarine cables from sea water when power is not to be fed, and to provide a method of feeding power employing the power feed line switching circuit.

According to a first aspect of the present invention there is provided a power feed line switching circuit for a submarine branching unit comprising first, second and third electrical paths connected in a Y-shaped connection, first, second and third terminals connected respectively to the ends of the electrical paths to connect the first, second and third electrical paths to the power feed lines of optical marine cables, a first relay including a drive unit inserted in the first electrical path, and a switching unit for disconnecting the second terminal from the second electrical path and connecting the second terminal to the ground. A second relay including a drive unit inserted in the second electrical path, and a switching unit for disconnecting the first terminal from the first electrical path and connecting the first terminal to the ground are also provided. In addition a third relay including a drive unit inserted in a grounding path between the switching unit of the first relay and the ground, and a first switching unit to form a lock-up circuit for the grounding path are provided.

The third relay may further include a second switching unit inserted in the second electrical path between the drive unit of the second relay and the switching unit of the first relay, to open the second electrical path simultaneously with the action of the first switching unit.

Furthermore, according to the first aspect of the present invention, there is also provided a method of feeding power to a submarine cable communication system having optical marine cables branched by one or more submarine branching units to connect three or more cable landing stations. Each of the submarine branching units include a power feed line switching circuit. The method comprises the steps of establishing a one-end power feed line for the cable landing station connected to the second terminal after establishing a both-end power feed line for the cable landing stations connected to the first and third terminals of the power feed line switching circuit for normal operation, and establishing a both-end power feed line for the cable landing stations connected to the second and third terminals, when the power feed line connecting the cable landing station to the first terminal becomes faulty, to disconnect the faulty power feed line.

The method of feeding power to a submarine cable communication system may further comprise a step of establishing a one-end power feed line for the cable landing station connected to the second terminal of each power feed line switching circuit, after establishing a main power feed line by connecting electrical paths between the first and third terminals through the optical marine cables in a cascade connection with respect to the plurality of submarine branching units for power feed between the two cable landing stations connected respectively to the opposite ends of the main power feed line in the both-end power feed mode. The respective operating currents of the first relays of a plurality of power feed line switching circuits in the submarine branching units may be different from each other. The respective first relays of the power feed line switching circuits may be driven sequentially by varying the current flowing through the main power feed line. The submarine cable communication system may comprise at least one submarine branching unit including the power feed line switching circuit and another submarine branching circuit including a different power feed line switching circuit therefrom.

According to a second aspect of the present invention there is provided a power feed line switching circuit for a submarine branching unit comprising: a first, second and third electrical paths connected in a Y-shaped connection; a first, second and third terminals connected respectively to the ends of the electrical paths to connect the first, second and third electrical paths to the power feed lines of optical marine cables; a first relay including a drive unit inserted in the first electrical path, and a switching unit for disconnecting the second terminal from the second electrical path and connecting the second terminal to the ground; a second relay including a drive unit inserted in the second electrical path, and a switching unit for disconnecting the third terminal from the third electrical path and connecting the third terminal to the ground; and a third relay including a drive unit inserted in the third electrical path, and a switching unit for disconnecting the first terminal from the first electrical path and connecting the first terminal to the ground.

The respective directions of operating currents flowing through the first, second and third relays with respect to the common node of the Y-shaped connection of the electrical paths may be the same. The power feed line switching circuit may further comprise: a fourth relay including a drive unit inserted in a grounding path between the switching unit of the first relay and the ground, and a first switching unit forming a lock-up circuit for the grounding path; and a fifth relay including a drive unit inserted in a grounding path between the switching unit of the second relay and the ground, and a first switching unit forming a lock-up circuit for the ground path. The power feed line switching circuit may further comprise a sixth relay including a drive unit inserted in a grounding path between the switching unit of the third relay and the ground, and a first switching unit forming a lock-up circuit for the ground path.

The fourth relay may further include a second switching unit for opening the second electrical path at a position between the drive unit of the second relay and the switching unit of the first relay simultaneously with the action of the first switching unit of the fourth relay, and the fifth relay may further include a second switching unit for opening the third electrical path at a position between the drive unit of the third relay and the switching unit of the second relay simultaneously with the action of the first switching unit of the fifth relay. The sixth relay may further include a second switching unit for opening the first electrical path at a position between the drive unit of the first relay and the switching unit of the third relay simultaneously with the action of the first switching unit of the sixth relay.

Further, according to a second aspect of the present invention, there is also provided a method of feeding power to a submarine cable communication system having a submarine branching unit for branching optical marine cables to interconnect three or more land stations. Each land station having a power feed unit having a power polarity changing unit. The submarine branching unit includes a power feed line switching circuit. The method comprises the step of establishing a one-end power feed line for the land station connected to the other terminal, after establishing a both-end power feed line between the land stations connected to the two terminals among the first, second and third terminals of the power feed line switching circuit.

Furthermore, according to the second aspect of the present invention, there is provided a method of feeding power to a submarine cable communication system having a submarine branching unit for branching optical marine cables to interconnect three or more land stations, each land station having a power feed unit having a power polarity changing unit. The submarine branching unit includes a power feed line switching circuit. The method comprises the steps of: establishing a one-end power feed line for the land station connected to the other terminal, after establishing a both-end power feed line between the land stations connected to the first and second terminals of the power feed line switching circuit or between the land stations connected to the first and third terminals, and establishing a both-end power feed line, when a fault occurs in the power feed line between the land stations performing both-end power feed, between the land stations connected to the two terminals other than the terminal connected to the faulty power feed line, to disconnect the faulty power feed line.

In addition, according to the second aspect of the present invention, there is also provided a method of feeding power to a submarine cable communication system having a submarine branching unit for branching optical marine cables to interconnect four or more land stations, each land station having a power feed unit having a power polarity changing unit. The submarine branching unit includes a power feed line switching circuit. The method comprises the steps of using a power feed line interconnecting a plurality of power feed line switching circuits through an optical marine cable connected to the first terminal as a main power feed line, and establishing a one-end power feed line for the other land stations, after establishing a both-end power feed line between the two land stations interconnected by the main power feed line.

The respective operating currents of the first relay, and the second or third relay of the plurality of power feed line switching circuits may be different from each other. The first relay, and the second or third relay may be driven sequentially by varying the current flowing in the main power feed line. A power feed line may be formed by using the power feed line switching circuit, and a power feed line switching circuit of a circuit configuration other than that of the former power feed line switching circuit.

According to a third aspect of the present invention there is provided a power feed line switching circuit for a submarine branching unit, comprising: a first, second and third terminals connected respectively to the power feed lines of optical marine cables; a first power feed line for a both-end power feed between the first and second terminals; a second power feed line for one-end power feed between the third terminal and a ground; a first relay including a drive unit inserted in the first power feed line, and a switching unit inserted in the second power feed line to disconnect the third terminal from the ground when the first relay is de-energized and to ground the third terminal when the first relay is energized.

The power feed line switching circuit may further comprise a second relay including a drive unit inserted in a grounding line between the third terminal and the ground, and a switching unit connected in parallel to the switching unit of the first relay to form a lock-up circuit in the grounding line.

Further, according to the third aspect of the present invention, there is provided a method of feeding power to a submarine cable communication system having a submarine branching unit for branching optical marine cables to interconnect three or more land stations, each land station having a power feed unit having a power polarity changing unit. The submarine branching unit includes a power feed line switching circuit. The method comprises the step of: forming a power feed line by feeding power in the both-end power feed mode between the cable landing stations connected respectively to the first and second terminals of the power feed line switching circuit, and then feeding power in the one-end power feed mode by the cable landing station connected to the third terminal.

Furthermore, according to the third aspect of the present invention, there is provided a method of feeding power to a submarine cable communication system having a submarine branching unit for branching optical marine cables to interconnect four or more land stations, each land station having a power feed unit having a power polarity changing unit, and the submarine branching unit includes a power feed line switching circuit. The method comprises the step of forming a main power feed line by connecting the first power feed lines of the power feed line switching circuits included in the plurality of submarine branching units in a series connection, and forming a power feed line by feeding power in the both-end power feed mode between the cable landing stations connected respectively to the ends of the main power feed line, and then feeding power in the one-end power feed mode by the cable landing stations connected respectively to the respective third terminals of the power feed line switching units.

The power feed line switching circuit and another power feed line switching circuit may be employed in the submarine branching unit.

BRIEF DESCRIPTION OF THE DRAWINGS

FIGS. 24A, 24B and 24C are diagrams showing possible power feed lines which can be established by the power feed the switching circuit shown in FIG. 22;

FIGS. 26A, 26B and 26C are diagrams for explaining a power feed line setting procedure by which power feed lines are established by the power feed line switching circuit shown in FIG. 25;

FIG. 27 is a diagram for explaining the functions of lock-up relays employed in the power feed line switching circuit shown in FIG. 25;

FIGS. 37A, 37B, 37C, 37D, 37E, 37F and 37G are diagrams showing power feed lines which can be established in the submarine optical cable communication system shown in FIGS. 35 or 36;

DESCRIPTION OF THE PREFERRED EMBODIMENTS

For a better understanding of the preferred embodiments, the problems of the prior art will be explained with reference to FIGS. 1 to 8.

Figure 1:
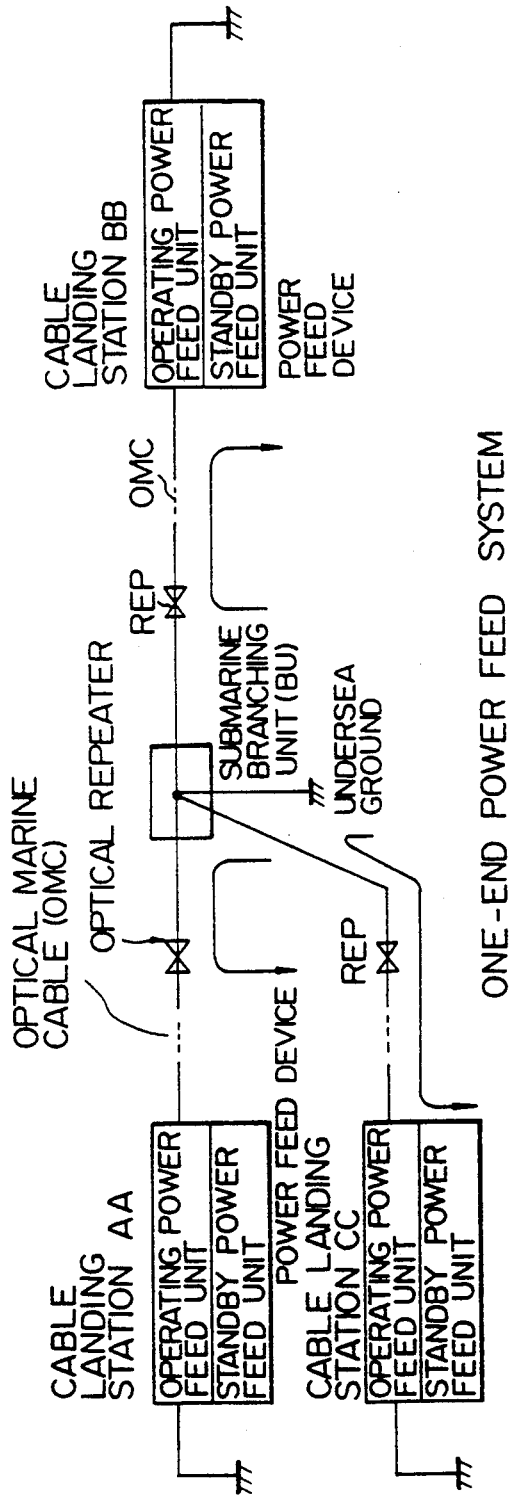
FIG. 1 is a diagram for explaining a one-end power feed system according to the prior art.

FIG. 1 is a diagram for explaining a one-end power feed system according to the prior art. As shown in FIG. 1, cable landing stations AA and BB are connected by an optical marine cable OMC, optical repeaters REP are inserted at predetermined intervals, of for example, approximately hundreds of kilometers each, in the optical marine cable OMC. A submarine branching unit BU is inserted in the optical marine cable OMC. The optical marine cable OMC is branched by the submarine branching unit BU to enable communication between three or more cable landing stations.

Note, in the submarine optical cable communication system shown in FIG. 1, the power feed lines of the optical marine cables OMC, which are connected to the cable landing stations AA, BB and CC, are connected to the undersea ground, or connected to the sea at the submarine branching unit BU. Therefore, the respective power feed units of the cable landing stations AA, BB and CC are connected individually by power feed lines to the submarine branching unit BU, and power is fed in the one-end power feed mode only from the cable landing stations AA, BB or CC to the submarine branching unit BU and the repeaters REP.

In the one-end power feed system shown in FIG. 1, if a power feed unit malfunctions while power is fed in the one-end power feed mode, it is impossible to feed power by a power feed unit other than the malfunctioning power feed unit. Therefore, the cable landing stations AA, BB and CC must be provided with standby power feed units and operating power feed units. That is, each of the cable landing stations AA, BB and CC includes both, a currently operating power feed unit and a standby power feed unit, respectively.

Figure 2:
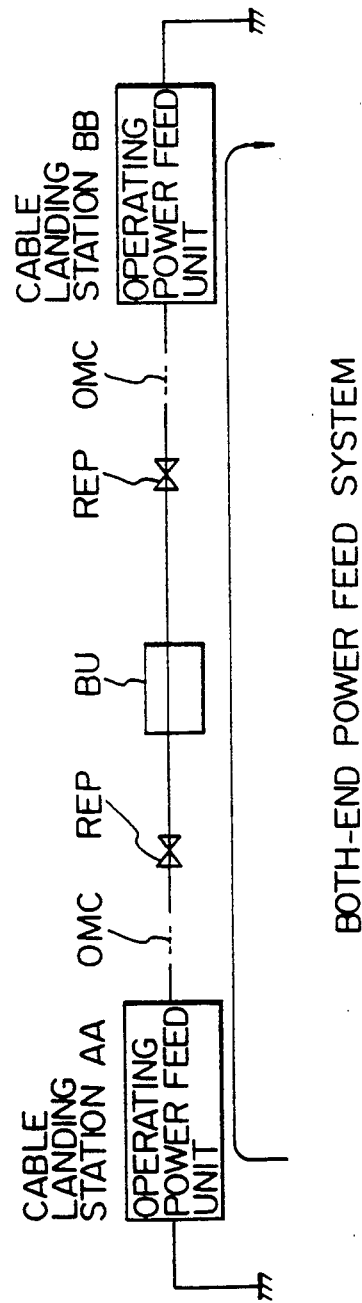
FIG. 2 is a diagram for explaining a both-end power feed system according to the prior art.

FIG. 2 is a diagram for explaining a both-end power feed system according to the prior art. As shown in FIG. 2, cable landing stations AA and BB are interconnected by an optical marine cable OMC. Optical repeaters REP and a submarine branching unit BU are inserted in the optical marine cable OMC. In the both-end power feed mode, the power feed line between the cable landing stations AA and BB of the optical marine cable OMC is not connected to the undersea ground (or, the sea).

When the power feed unit of either the cable landing station AA or BB is of a positive polarity, the power feed unit of the other cable landing station is of a negative polarity. Therefore, power is fed to the power feed line of the optical marine cable (i.e., the submarine branching unit BU and the repeaters REP) from both the cable landing stations AA and BB. Therefore, in the both-end power feed mode, one of the power feed units feeds power to all the load in case the other power feed unit, malfunctions and is unable to feed power. Hence the cable landing stations need not be provided with standby power feed units. That is, in the both-end power feed system shown in FIG. 2, each power feed unit includes only the operating power feed unit and does not include a standby power feed unit.

Consequently, in view of reliability, economy and operating voltage, the both-end power feed system is more preferable than the one-end power feed system.

Figure 3:
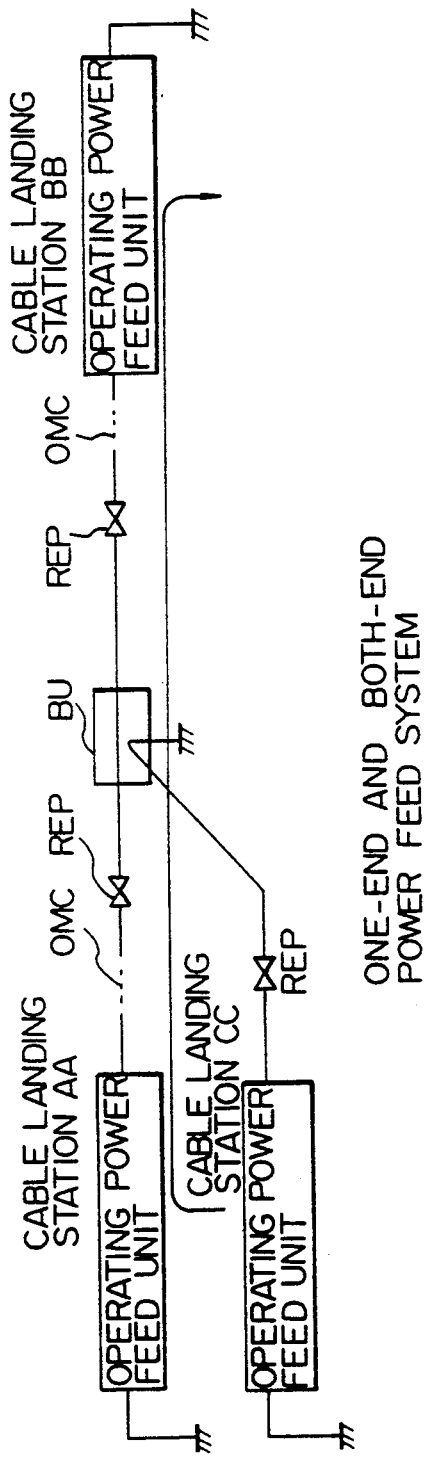
FIG. 3 is a diagram for explaining a one-end and a both-end power feed system according to the prior art.

FIG. 3 is a diagram for explaining a one-end and both-end power feed system according to the prior art. As shown in FIG. 3, in this power feed system, the power feed lines of submarine cables connected respectively to cable landing stations AA and BB are connected by a submarine branching unit BU without grounding the same for power feed between the cable landing stations AA and BB in the both-end power feed mode. The power feed line of a submarine cable connected to a cable landing station CC is grounded undersea by the submarine branching unit BU to feed power in the one-end power feed mode from the cable landing station CC.

Note, a submarine cable communication system, particularly, a submarine optical cable communication system using an optical marine cable (OMC), is provided with optical repeaters (REP) inserted at intervals in the optical marine cable. A constant DC current is supplied through a power feed line of the optical marine cable to the optical repeaters. The DC current is supplied to the optical repeaters in either a one-end power feed mode in which the DC current is supplied from only one land station or a both-end power feed mode in which the DC current is supplied from two land stations. The both-end power feed mode is preferable because of its high reliability. It is preferable to switch the power feed line when a fault occurs in the power feed line so that a set power feed line is a both-end power feed line as much as possible.

Figure 4:
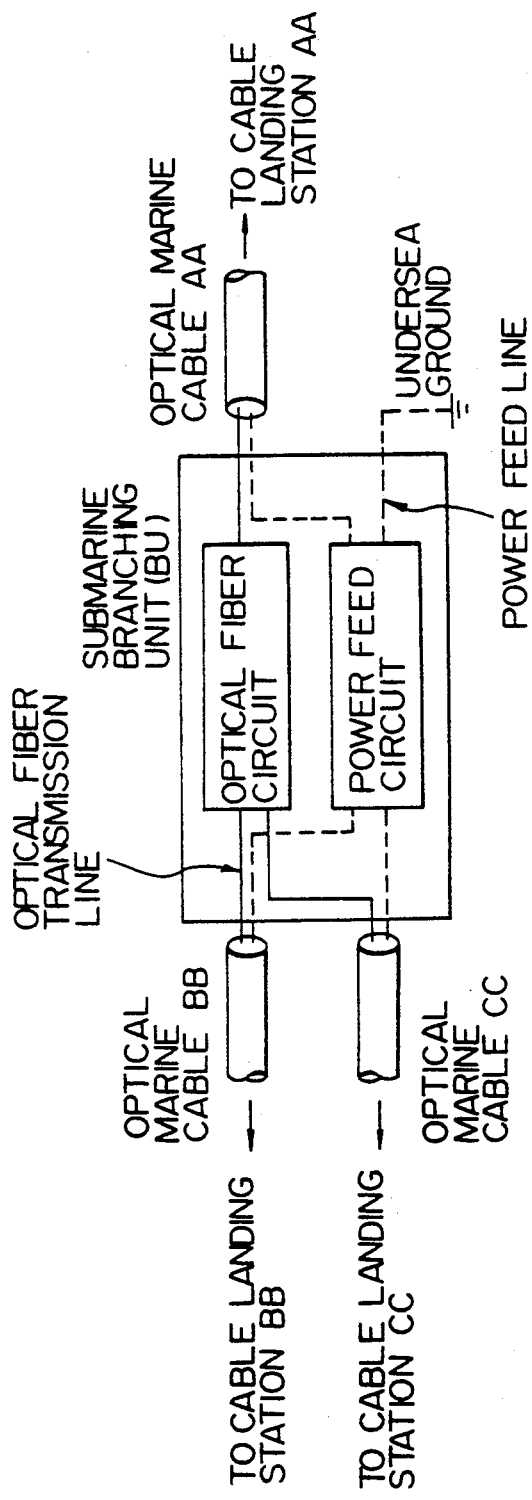
FIG. 4 is a diagram for explaining the general construction of a submarine branching unit.

FIG. 4 is a diagram for explaining a general construction of a submarine branching unit. As shown in FIG. 4, the submarine branching unit BU mainly includes an optical fiber circuit and a power feed circuit. The optical fiber circuit is inserted in the optical fiber transmission line of the optical marine cable, and the power feed circuit is inserted in the power feed line of the optical marine cable.

Figures 5A, 5B, 5C, 5D, 5E, 5F:
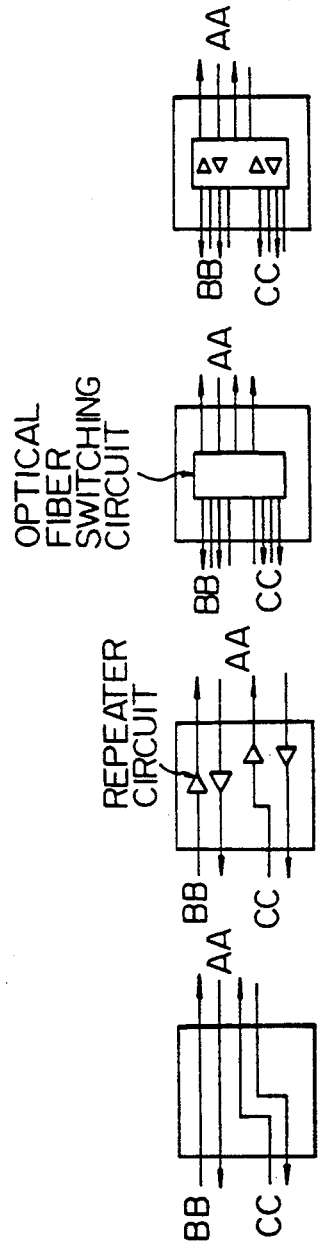
FIGS. 5A, 5B, 5C, 5D, 5E and 5F are diagrams showing various configurations of the optical fiber circuit shown in FIG. 4.

FIGS. 5A to 5F are diagrams showing various configurations of the optical fiber circuit shown in FIG. 4. Three optical marine cables are connected to the submarine branching unit BU to interconnect the three cable landing stations AA, BB and CC. As shown in FIGS. 5A to 5C, (a) the optical fiber circuit may be an optical fiber branching circuit (with reference to FIG. 5A), (b) the optical fiber circuit may include an optical repeater circuit and an optical branching circuit (with reference to FIG. 5B), and (c) the optical fiber circuit may include an optical branching/switching circuit (with reference to FIG. 5C). Further, as shown in FIGS. 5D to 5F, (d) the optical fiber circuit may include an optical repeater circuit and an optical branching/switching circuit (with reference to FIG. 5D), (e) the optical fiber circuit may include an optical repeater circuit and a multiplex converting circuit MUX and a demultiplex converting circuit DEMUX (with reference to FIG. 5E), and (f) the optical fiber include may comprise an optical repeater circuit, an optical branching/switching circuit and a multiplex converting circuit MUX and a demultiplex converting circuit DEMUX (with reference to FIG. 5F).

The conventional submarine optical cable communication system including three or more cable landing stations sets a power feed line by changing the power feed line switching circuit of the submarine branching unit for one-end power feed or both-end power feed.

Figure 6:
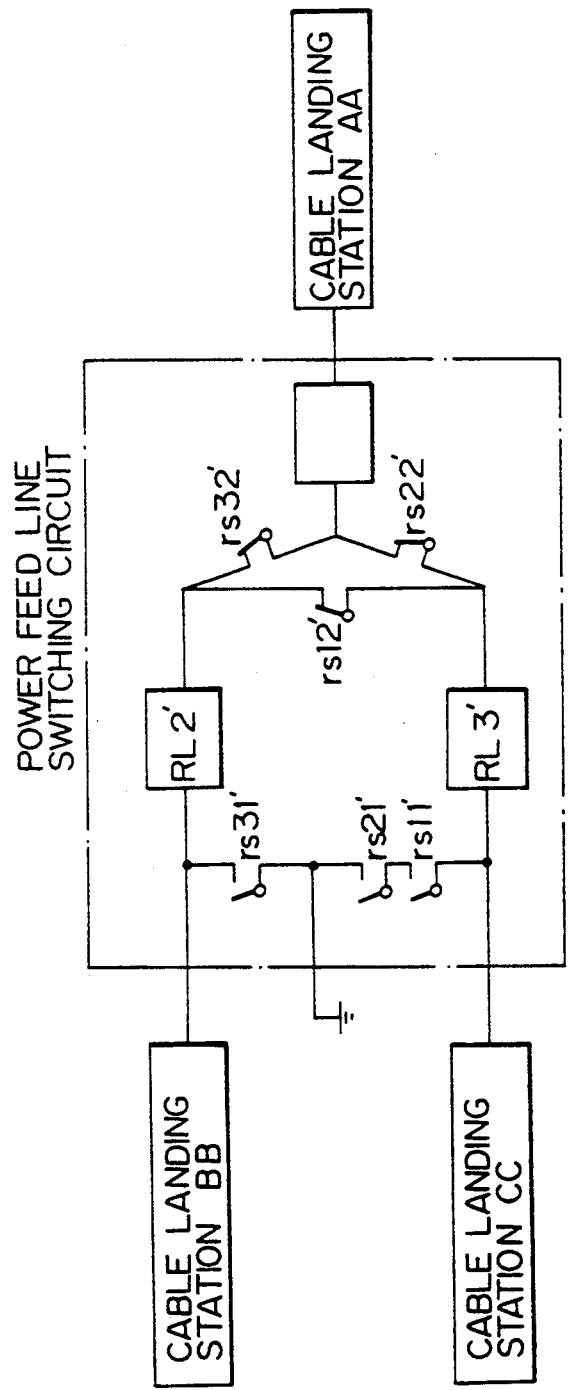
FIGS. 6, 7 and 8 are diagrams showing conventional power feed line switching circuits for a submarine optical cable communication system communicating between three or more cable landing stations.
Figure 7:
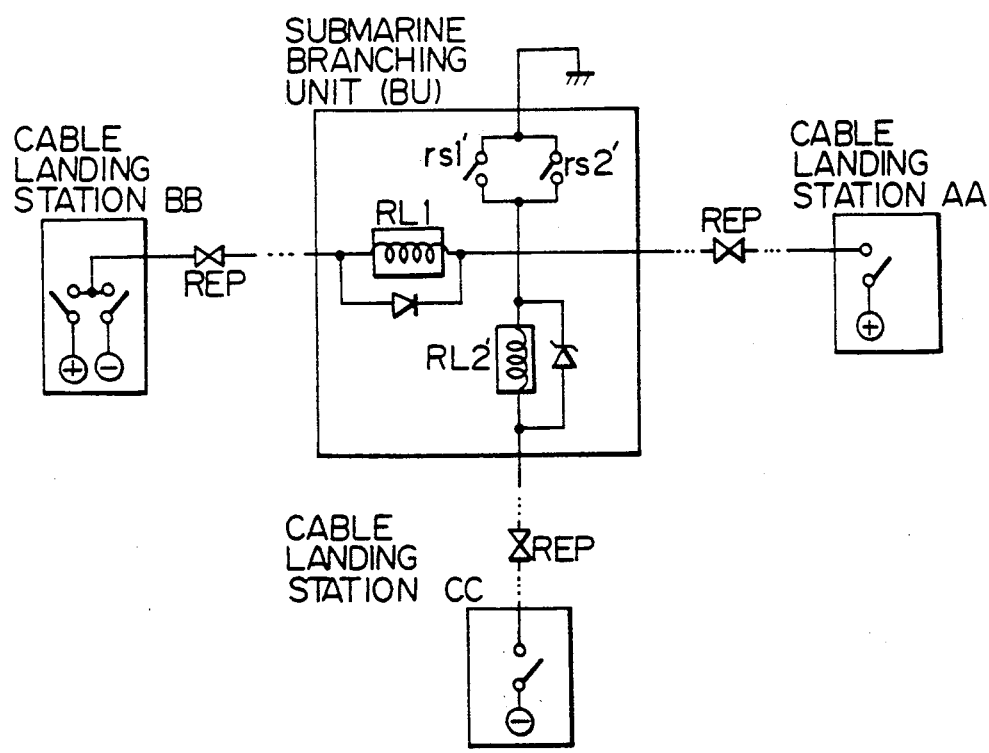
Figure 8:
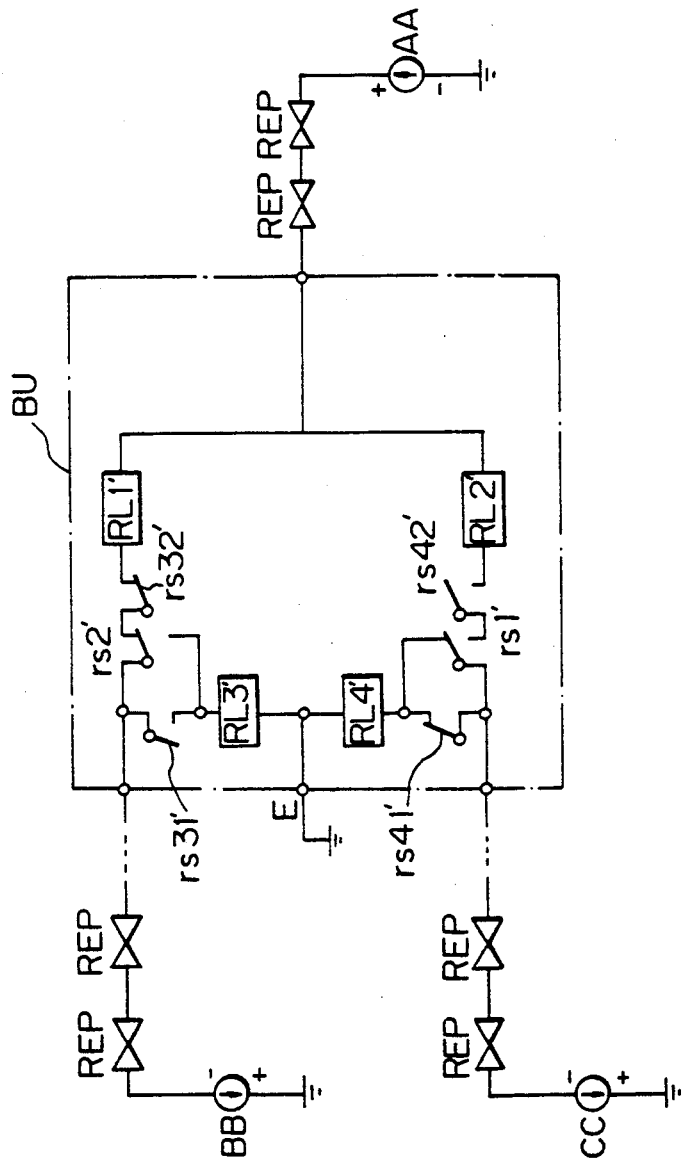

FIGS. 6 to 8 are diagrams showing conventional power feed line switching circuits for a submarine optical cable communication system which communicates between three or more cable landing stations. That is, various power feed line switching circuits have been proposed, and FIGS. 6 to 8 indicate configurations of power feed line switching circuits disclosed in Unexamined Japanese Patent Publication (Kokai) Nos. 2-53332, 1-200832 and 63-189025, respectively.

First, as shown in FIG. 6, the power feed line switching circuit of Unexamined Japanese Patent Publication No. 2-53332, which is a similar configuration to that shown in FIG. 7, is capable of enabling communication between two optical marine cables even if a fault occurs in any one of the three optical marine cables. However, this power feed line switching circuit has a complicated circuit configuration and needs a complicated power feed line setting procedure.

Next, the power feed line switching circuit of Unexamined Japanese Patent Publication No. 1-200832 shown in FIG. 7 is capable of enabling communication between two of three optical marine cables connected to a submarine branching unit BU even if a fault occurs in any one of the three optical marine cables. However, since all the power feed lines are grounded by the submarine branching unit BU, each cable landing station is able to feed power only in a one-end power feed mode, and hence this system is unsatisfactory in reliability.

Further, the power feed line switching circuit of Unexamined Japanese Patent Publication No. 63-189025 shown in FIG. 8 is currently put to practical use. If a fault occurs in one of two specified optical marine cables. That is, in an optical marine cable connected to a cable landing station BB or an optical marine cable connected to a cable landing station CC, a power feed line is changed to enable communication between the other two optical marine cables (CC-AA or AA-BB). However, if a fault occurs in a specified cable, for example, an optical marine cable connected to a cable landing station AA, it is impossible to form a power feed line between the other two optical marine cables (BB-CC) and the system becomes inoperative.

In addition, conventional submarine optical cable communication systems, in most cases, have transmission lines interconnecting three cable landing stations; whereas submarine optical cable communication systems employing a plurality of submarine branching units to interconnect more than three cable landing stations have been on the increase in recent years. Unexamined Japanese Patent Publication (Kokai) No. 1-276937 discloses a submarine optical power feed system for such a submarine optical cable communication system.

Next preferred embodiments of a power feed line switching circuit for a submarine branching device and a method of feeding power to a submarine cable communication system of the present invention will be described, with reference to the accompanying drawings.

Figure 9:
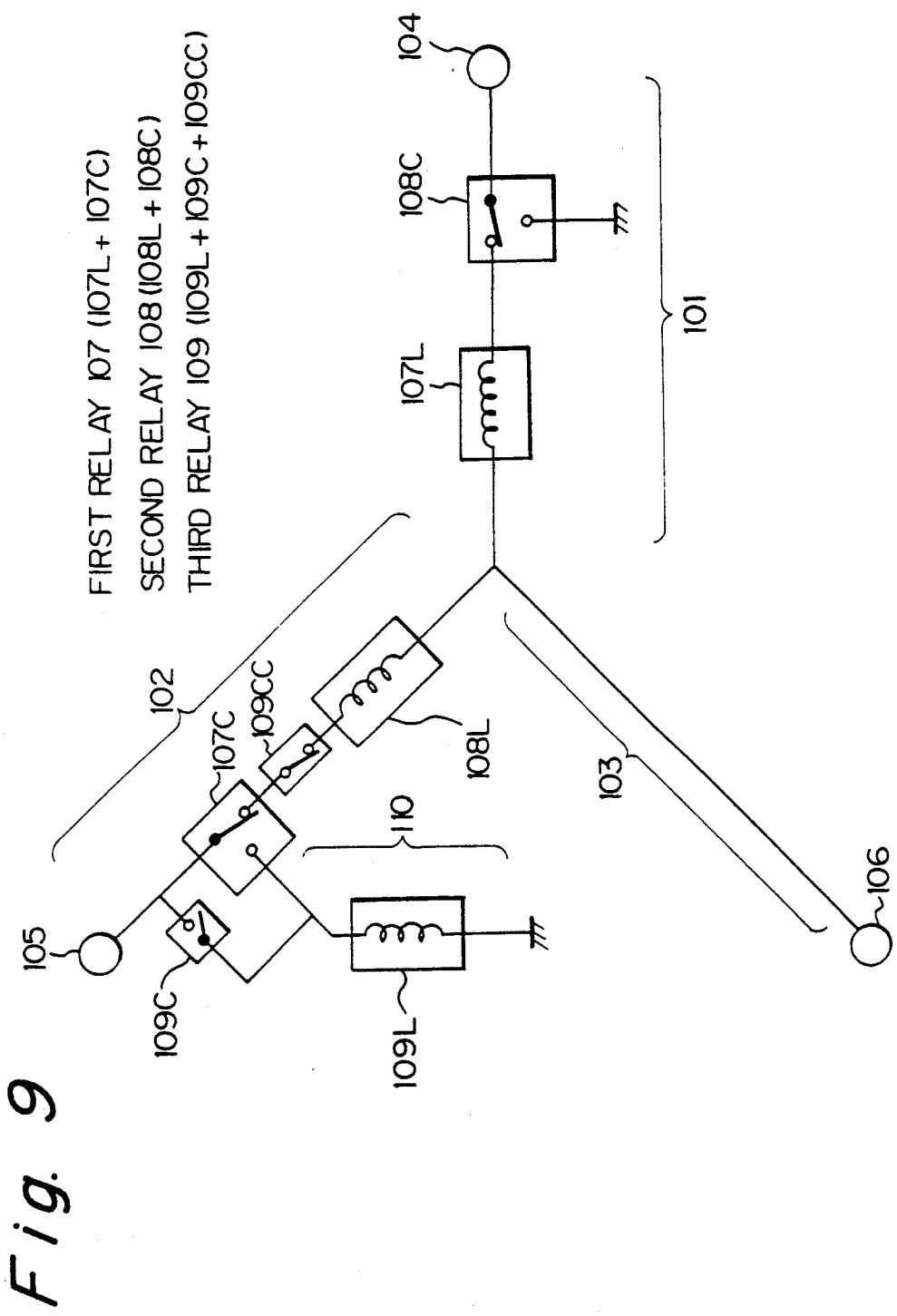
FIG. 9 is a diagram for explaining a principle of a first aspect of the present invention.

FIG. 9 is a diagram for explaining a principle of a first aspect of the present invention.

A power feed line switching circuit of a first aspect according to the present invention for a submarine branching unit comprises first, second and third electrical paths 101, 102 and 103 connected in a Y-shaped connection, and a first, second and third terminals 104, 105 and 106 connected respectively to the ends of the electrical paths 101, 102 and 103 to connect the first, second and third electrical paths 101, 102 and 103 to the power feed lines of optical marine cables. The power feed line switching comprises a first relay 107, a second relay 108, and a third relay 109. The first relay 107 includes a drive unit 107L inserted in the first electrical path 101, and a switching unit 107C for disconnecting the second terminal 105 from the second electrical path 102 and grounding the same. The second relay 108 includes a drive unit 108L inserted in the second electrical path 102, and a switching unit 108C for disconnecting the first terminal 104 from the first electrical path 101 and grounding the same. The third relay 109 includes a drive unit 109L inserted in a grounding path 110 connecting the switching unit 107L of the first relay 107 inserted in the second electrical path 102 to a ground, and a first switching unit 109C forming a lock-up circuit for the grounding path 110.

Further, as shown in FIG. 9, the third relay 109 of the power feed line switching circuit includes a second switching unit 109CC inserted in the second electrical path 102 between the drive unit 108L of the relay 108 and the switching unit 107C of the relay 107 to open the second electrical path 102 simultaneously with the action of the first switching unit 109C.

Figure 10:
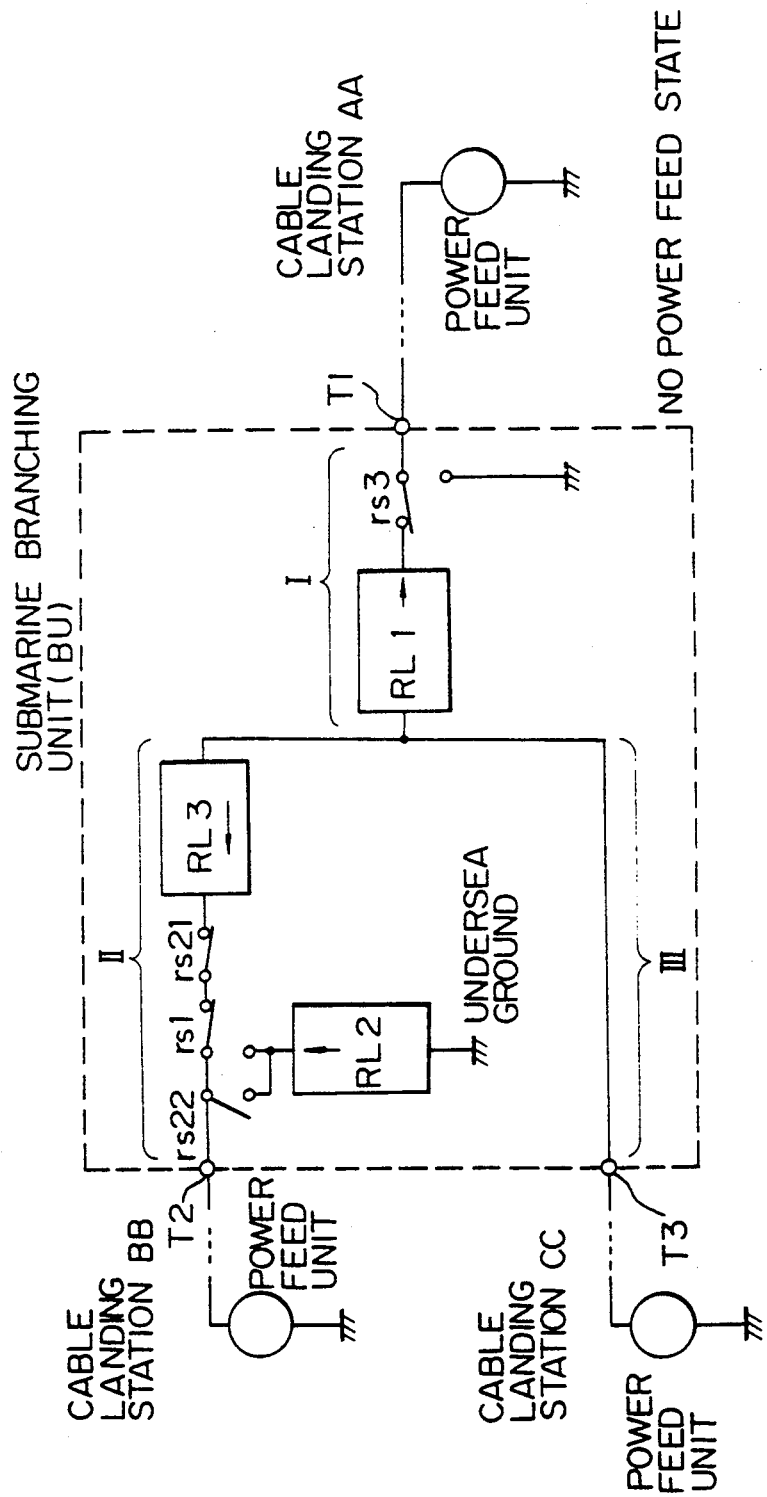
FIG. 10 is a diagram showing an embodiment of a power feed line switching circuit for a submarine branching unit according to a first aspect of the present invention.

FIG. 10 is a diagram showing an embodiment of a power feed line switching circuit for a submarine branching unit BU according to the first aspect of the present invention. Note, in the power feed line, switching circuit shown in FIG. 9, powers is not supplied from the power feed units of cable landing stations, and optical circuits are omitted therefrom. The submarine branching unit BU has three terminals T1, T2 and T3 connected through the power feed lines of optical marine cables to the power feed units of cable landing stations AA, BB and CC, respectively. The power feed units of the cable landing stations AA and BB supply currents of positive polarity. The power feed unit of the cable landing station CC supplies a current of negative polarity to the corresponding power feed lines of the optical marine cables.

The submarine branching unit BU has a power feed circuit comprising electrical paths I, II and III connected in a Y-shaped connection, and the terminals T1, T2 and T3 connected to the ends of the electrical paths I, II and III, respectively. A relay RL1 has a driving coil (hereinafter, referred to as "relay coil RL1") inserted in the electrical path I, and a relay RL3 has a driving coil (hereinafter, referred to as "relay coil RL3") inserted in the electrical path II. The relay RL1 has a transfer contact rs1 inserted in the electrical path II between the terminal T2 and the relay coil RL3. The transfer contact rs1 has a break contact inserted between the terminal T2 and the relay coil RL3, and a make contact inserted between the terminal T2 and a ground (undersea ground). Similarly, the relay RL3 has a transfer contact rs3 inserted in the electrical path I between the terminal T1 and the relay coil RL1. The transfer contact rs3 has a break contact inserted between the terminal T1 and the relay coil RL1, and a make contact inserted between the terminal T1 and the ground.

Further, a relay RL2 has a driving coil (hereinafter, it may be referred to as "relay coil RL2") inserted in a line connecting the transfer contact rs1 to the ground. The make contact rs22 of the relay RL2 is connected in parallel to the make contact of the transfer contact rs1 to form a lock-up circuit. The make contact rs21 of the relay RL2 is inserted between the transfer contact rs1 and the relay coil RL3.

The relays RL1 to RL3 are driven only by operating currents (working currents) that flow in the direction of arrows indicated in FIG. 10. Note, in the submarine branching unit BU shown in FIG. 10, the relays RL1, RL2 and RL3 are high-tension relays, such as vacuum relays.

Note, a housing of the submarine branching unit BU is, for example, made of a berylium-copper composition metal which includes an anti corrosion function and a pressure proof function. Such a submarine branching unit or an optical repeater may be used in sea water (submarine) at a depth of 8000 meters, and should be guaranteed during a long time, e.g., over 25 years.

Next, a feeding power to the optical marine cables to be carried out by using the power feed line switching circuit by the cable landing stations AA, BB and CC will be described with reference to FIGS. 11 to 14.

FIGS. 11 to 14 are diagrams for explaining the operation of the power feed line switching circuit shown in FIG. 10.

Figure 11:
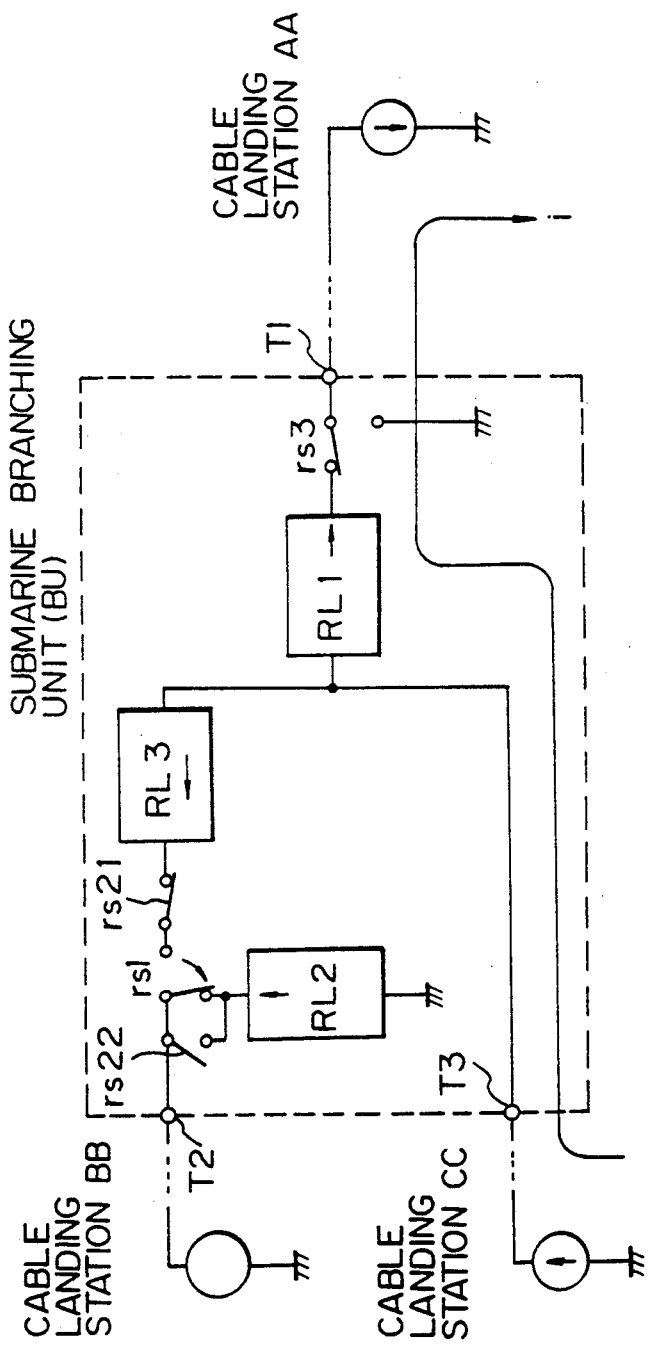
FIGS. 11, 12, 13 and 14 are diagrams for explaining the operation of the power feed line switching circuit shown in FIG. 10.

First, as shown in FIG. 11, a current is supplied in the direction of the arrow in the both-end power feed mode between the cable landing stations CC and AA. That is, the current is flown from the cable landing stations CC to AA to energize the relay RL1, so that the break contact of the transfer contact rs1 is opened and the terminal T2 is connected to the ground (undersea ground). Consequently, the power feed line of the optical marine cable from the cable landing station BB is connected to the ground through the transfer contact rs1 and the relay coil RL2.

Figure 12:
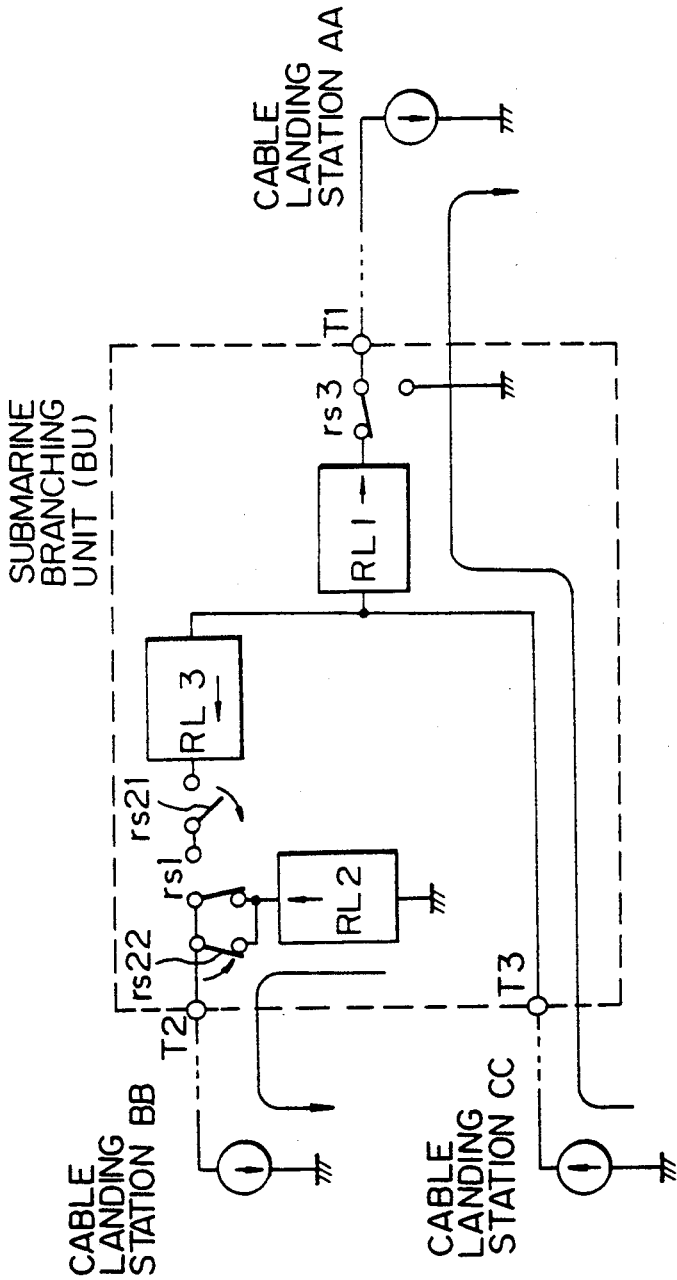

Then, as shown in FIG. 12, the cable landing station BB feeds power through the optical marine cable connected thereto to energize the relay RL2, so that the make contact rs22 is closed to form a lock-up circuit for the grounding line. Further the break contact rs21 is opened to disconnect the relay coil RL3 from the transfer contact rs1.

Note, the relay RL2 is used to prevent the changeover of the power feed line in case the optical marine cable connected to the cable landing station AA or CC becomes faulty during operation. The make contact rs22 of the relay RL2 serves as a lock-up contact. The break contact rs21 of the same prevents damaging the transfer contact rs by arc discharge when the break contact of the transfer contact rs1 is closed, or when the transfer contact rs1 is disconnected from the ground and returned to connect to the relay coil RL3. When a lock-up circuit is formed by the relay RL2, the break contact rs21 is opened and disconnects the transfer contact rs1 from the relay coil RL1. A relay having such functions is disclosed, for example, in Unexamined Japanese Patent Publication (Kokai) No. 63-189025, which is referred in the above.

Figure 13:
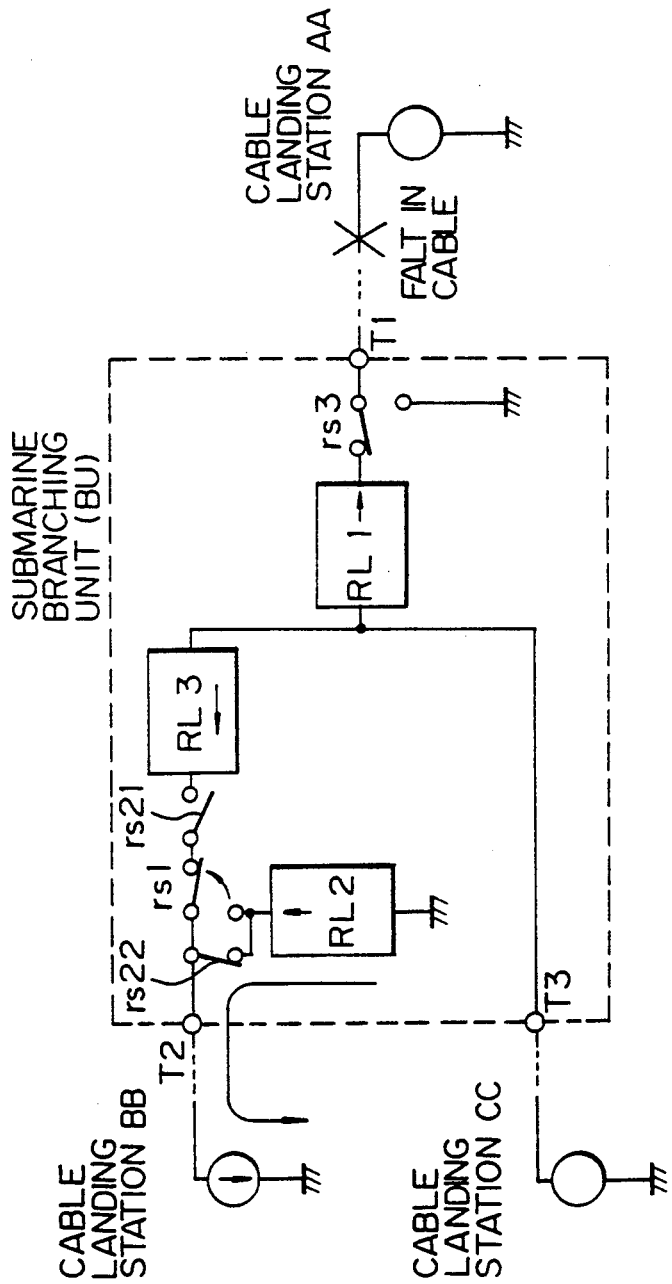

Assuming that the optical marine cable connected to the cable landing station AA has become faulty as shown in FIG. 13, then, the relay RL1 is de-energized and the break contact of the transfer contact rs1 is closed. In the meantime the power feed line connected to the cable landing station BB is maintained by the lock-up function of the relay RL2.

Figure 14:
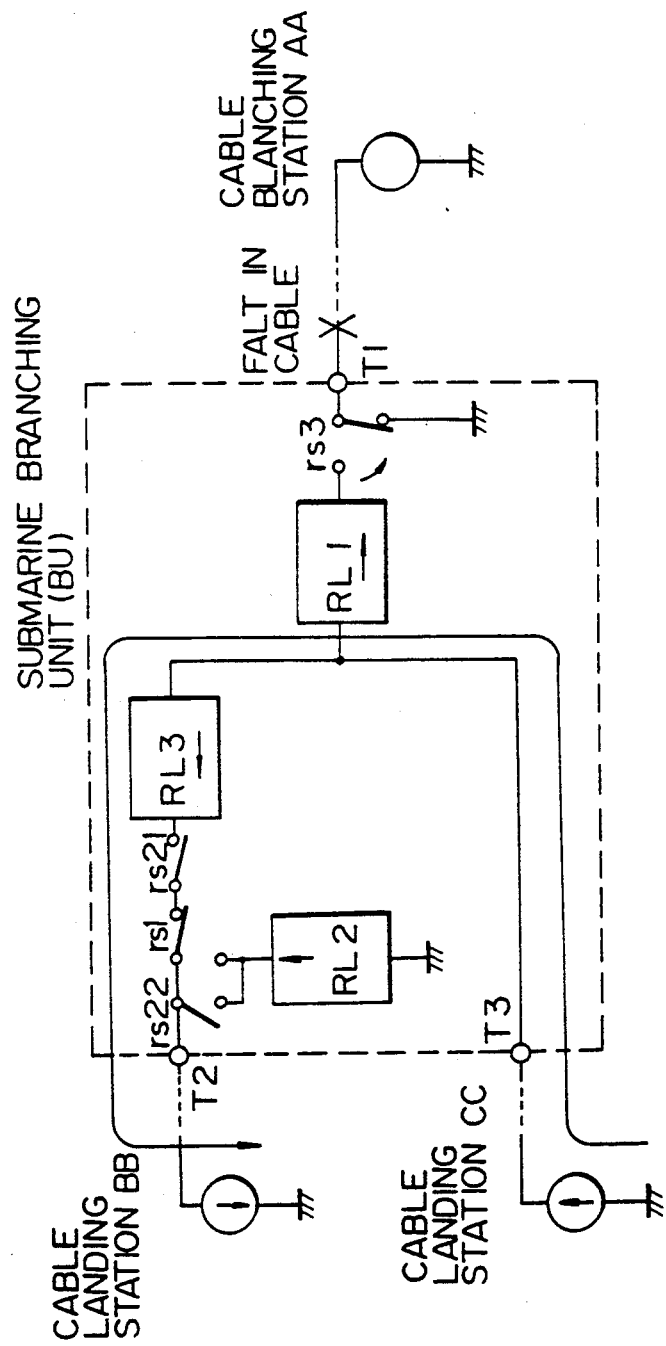

To feed power between the cable landing stations BB and CC in the both-end power feed mode, power feed from all the cable landing stations is interrupted temporarily. Then, power feed is started again between the cable landing stations CC and BB as shown in FIG. 14. Consequently, the relay RL3 is energized to open the break contact of the transfer contact rs3 of the relay RL3 to disconnect the optical marine cable connected to the cable landing station AA from the power feed line, so that a both-end power feed line is established between the cable landing stations BB and CC.

In this submarine optical cable communication system, all the cable landing stations are unable to feed power and the submarine optical cable communication system fails to operate properly if the optical marine cable connected to the cable landing station CC becomes faulty. Therefore, the cable landing stations AA and CC are assigned to the most significant cable landing stations of the submarine optical cable communication system and power is fed between the cable landing stations AA and CC in the both-end power feed mode, because the line between the cable landing stations AA and CC is not subject to the influence of faults in other lines.

Figure 15:
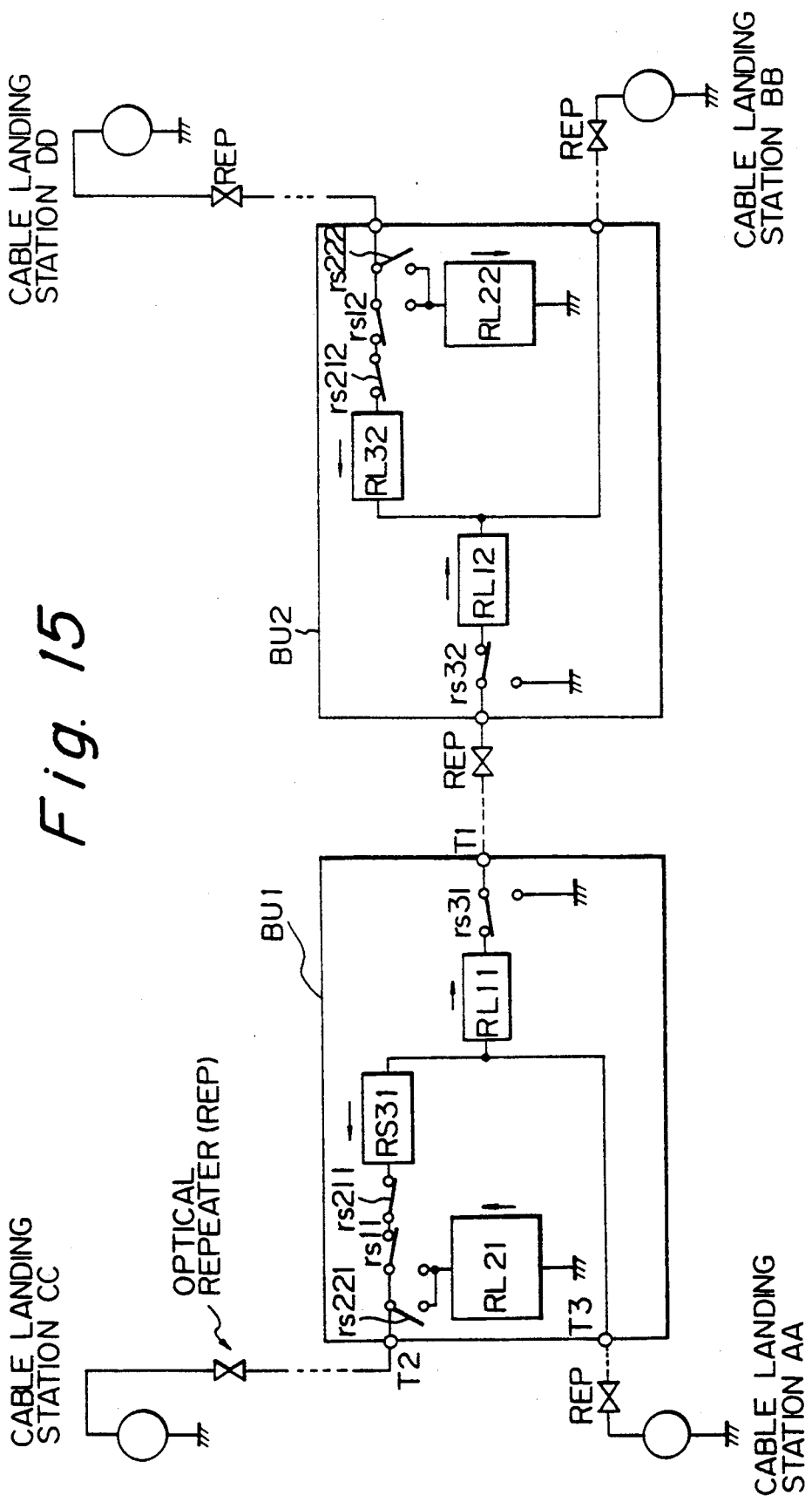
FIG. 15 is a diagram showing a power feed circuit for a submarine optical cable communication system employing two submarine branching units each incorporating the power feed line switching circuit shown in FIG. 10.

FIG. 15 is a diagram showing a power feed circuit for a submarine optical cable communication system employing two submarine branching units each incorporating the power feed line switching circuit shown in FIG. 10. As shown in FIG. 15, in the submarine optical cable communication system, four cable landing stations AA, BB, CC and DD are provided by the two submarine branching units BU1 and BU2.

The cable landing stations AA and BB are interconnected by a main optical marine cable for power feed in the both-end power feed mode. The submarine branching units BU1 and BU2 branches the main optical marine cable, and branched optical marine cables are connected respectively to the cable landing stations CC and DD. The cable landing stations CC and DD feed power in the one-end power feed mode.

Figure 16:
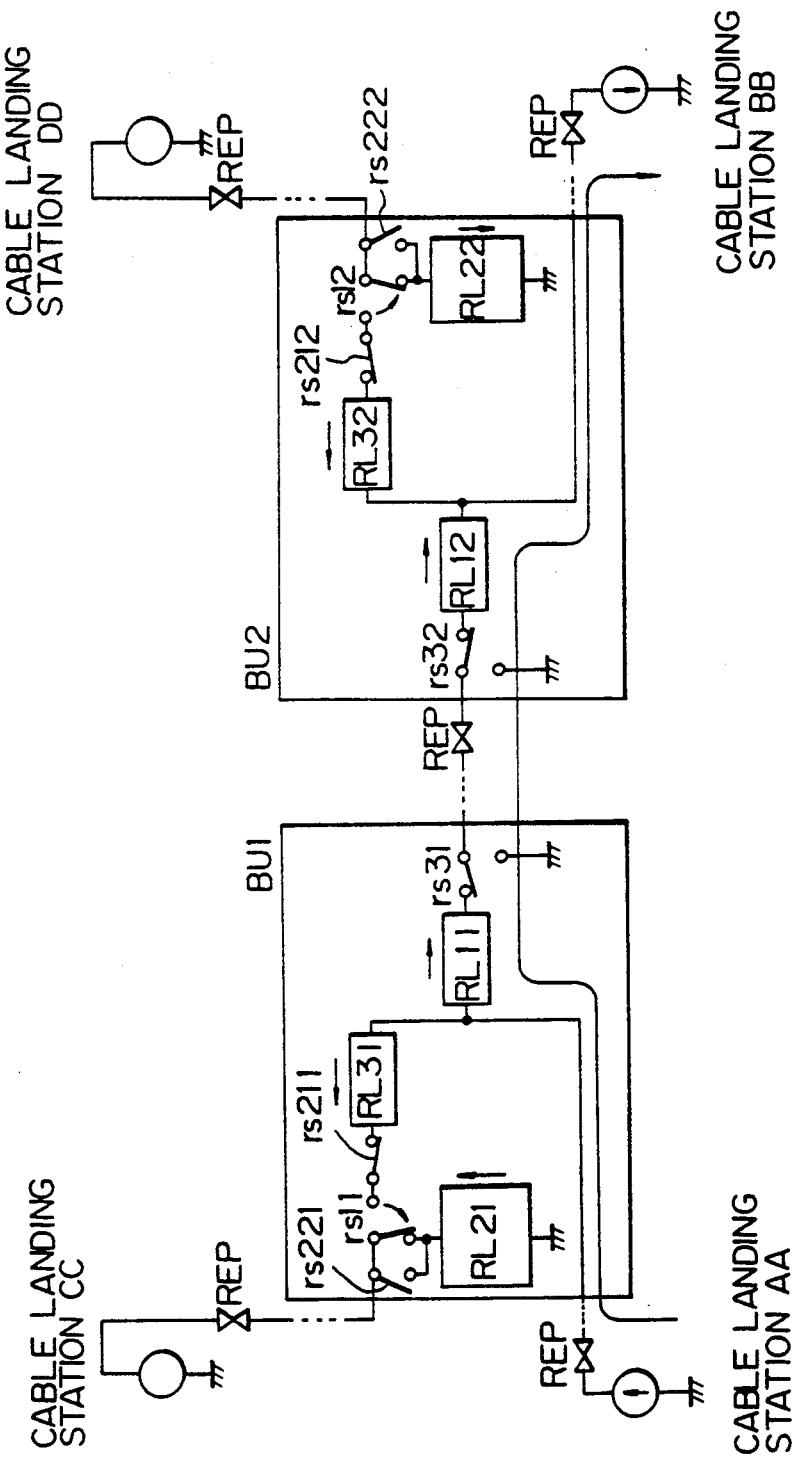
FIGS. 16 and 17 are diagrams for explaining the operation of the power feed circuit shown in FIG. 15.
Figure 17:
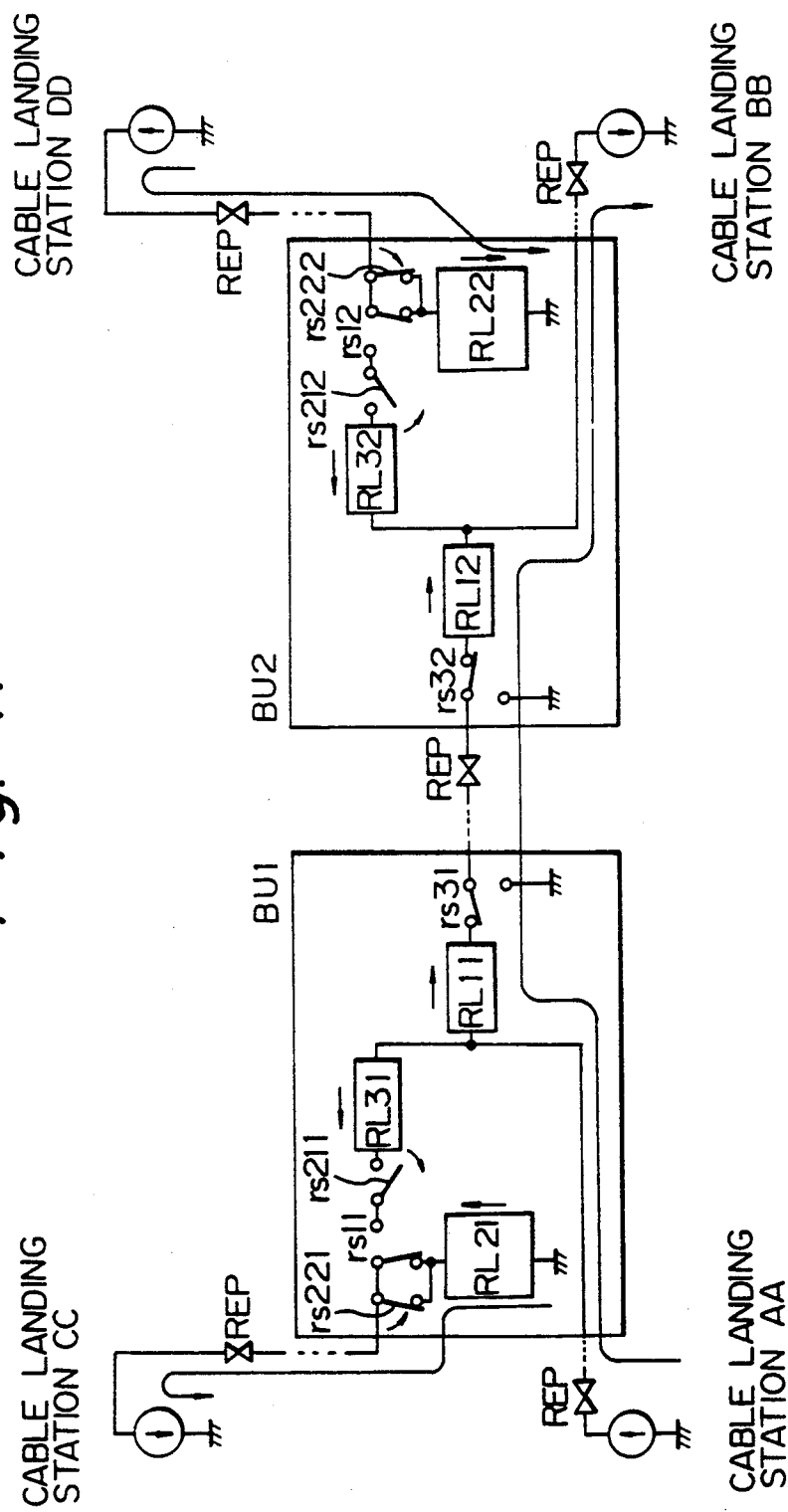

FIGS. 16 and 17 are diagrams for explaining the operation of the power feed circuit shown in FIG. 15. As shown in FIG. 16, in the normal operation, power is fed between the cable landing stations AA and BB through the main optical marine cable to energize the relay RL11 of the submarine branching unit BU1, and the relay RL12 of the submarine branching unit BU2, so that the break contacts of the respective transfer contacts rs11 and rs12 of the relays RL11 and RL12 are opened and the cable landing stations CC and DD are connected to the ground power feed lines (undersea ground). Then, as shown in FIG. 17, the cable landing stations CC and DD start to feed power through the branch optical marine cables to energize the relays RL21 and RL22, so that the power feed lines are locked up.

The respective operating currents (working currents) of the power feed line switching relays RL11 and RL12 of the submarine branching units BU1 and BU2 are different from each other to prevent the hot-switching state of the relays. Namely, when driving the relay of a submarine branching unit BU (BU1, BU2) having its contact connected to the ground, it is possible that the contact of the relay is damaged by the potential difference between the associated power feed line and the ground if the potential to ground of the power feed line is specified to be high.

To prevent damaging the contact of the relay, the potential to ground of the power feed line of the submarine branching unit BU must be reduced to zero when driving the relay. For example, in feeding power between the cable landing stations AA and BB, the opposite ends of the main optical marine cable, the voltage/current of the power fed by each of the cable landing stations AA and BB is regulated at an appropriate voltage taking into consideration a voltage drop across the optical marine cable, so that the potential of the fed power at the submarine branching unit BU is reduced to zero. However, it is impossible to reduce the respective potentials to ground of the two submarine branching units BU1 and BU2 simultaneously to zero by such a procedure.

Note, the submarine branching units BU1 and BU2 are provided respectively with the relays RL11 and RL12 differing from each other in operating current. For example, the operating current of the relay RL11 is smaller than that of the relay RL12. Therefore, when feeding power by the cable landing stations AA and BB, the voltages of the power fed by the cable landing stations AA and BB are regulated, and thus the potential to ground of the power feed line at the submarine branching unit BU1 is specified to zero, and the current of the power is adjusted to the operating current of the relay RL11. In such a power feed mode, the relay RL11 of the submarine branching unit BU1 operates, but the relay RL12 of the submarine branching unit BU2 does not operate because the operating current of the relay RL12 is higher than that of the relay RL11. Accordingly, the transfer contact rs12 is not damaged even if the potential against the ground of the power feed line is not reduced to zero, because the relay RL12 does not operate.

After driving the relay RL11 of the submarine branching unit BU1, the respective feed voltages of the cable landing stations AA and BB is adjusted to reduce the potential of the power feed line of the submarine branching unit BU2 to zero against the ground, and the current of the power is adjusted to the operating current of the relay RL12 to operate the relay RL12 of the submarine branching unit BU2. Consequently, the hot-switching state of the relays of the submarine branching units BU1 and BU2 can be prevented.

Figure 18A:
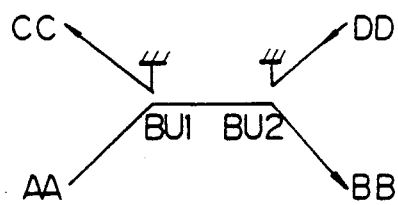
FIGS. 18A, 18B, 18C, 18D, 18E and 18F are diagrams showing power feed lines which can be established by the power feed circuit shown in FIG. 15.

FIGS. 18A to 18F are diagrams showing power feed lines which can be established by the power feed circuit shown in FIG. 15. The power feed lines shown in FIG. 18A are at the normal state, and the power feed lines shown in FIGS. 18B to 18F are at abnormal states. In FIGS. 18A to 18F, effective optical marine cables are indicated by solid lines, faulty optical marine cables are indicated by dotted lines, and arrows indicates the flowing directions of currents.

Figure 18D:
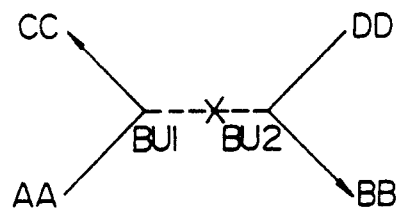
Figure 18B:
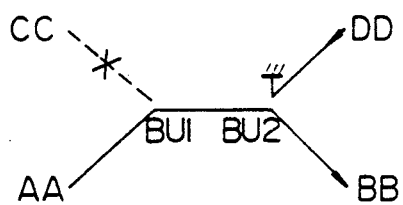
Figure 18E:
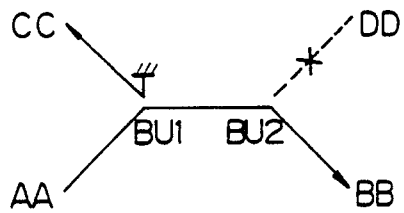
Figure 18C:
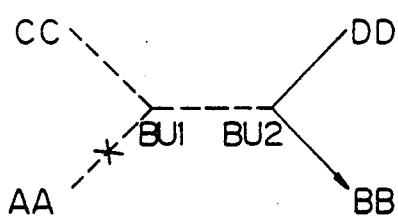
Figure 18F:
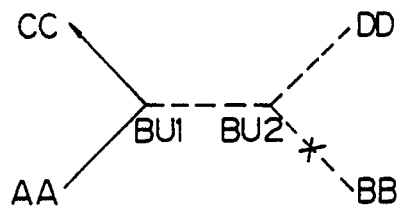

As shown in FIG. 18A, in the normal state, the cable landing stations AA and BB feed power in the both-end power feed mode and the cable landing stations CC and DD feed power in the one-end power feed mode. As shown in FIGS. 18B or 18E, when a fault occurs in the optical marine cable connected to either the cable landing station CC or the cable landing station DD, other power feed lines remain unchanged. As shown in FIGS. 18C, when a fault occurs in the optical marine cable connected to the cable landing station AA, power can be fed only through the optical marine cables branched by the submarine branching unit BU2. In such a case, the power feed lines are switched so that power is fed by the cable landing stations DD and BB in the both-end power feed mode. Similarly, as shown in FIG. 18F, when a fault occurs in the optical marine cable connected to the cable landing station BB, power can be fed only through the optical marine cables branched by the submarine branching unit BU1. In such a case, the power feed lines are switched so that power is fed by the cable landing stations AA and CC in the both-end power feed mode. As shown in FIG. 18D, when a fault occurs in the optical marine cable interconnecting the submarine branching units BU1 and BU2, the power feed lines are switched so that power is fed in the both-end power feed mode between the cable landing stations AA and CC associated with the submarine branching unit BU1, and power is fed in the both-end power feed mode between the cable landing stations BB and DD associated with the submarine branching unit BU2. Consequently, the both-end power feed lines can be established for the cable landing stations excluding the cable landing station connected to a faulty optical marine cable.

Figure 19:
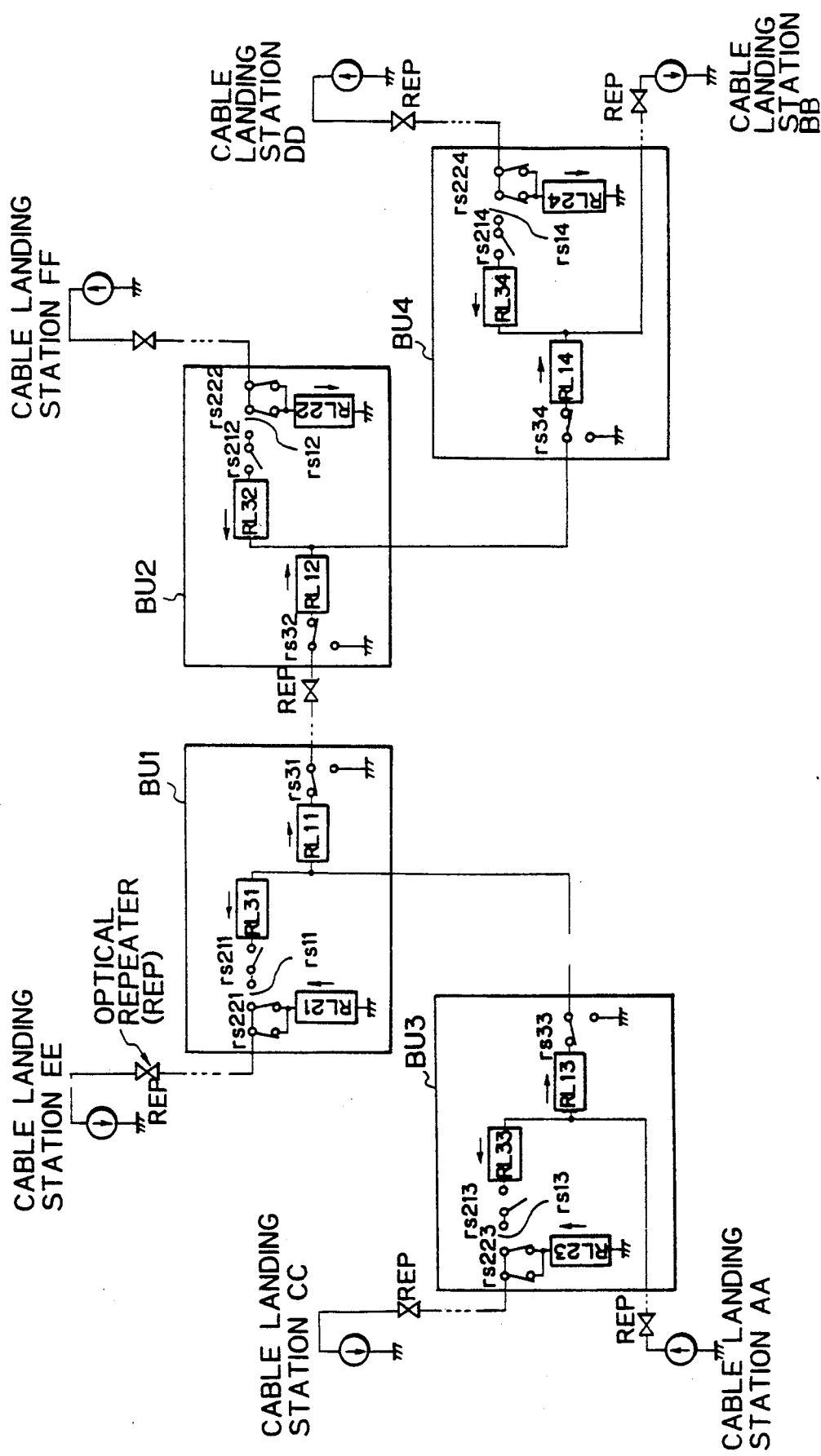
FIG. 19 is a diagram showing a power feed circuit for a submarine optical cable communication system employing four submarine branching units each incorporating the power feed line switching circuit shown in FIG. 10.

FIG. 19 is a diagram showing a power feed circuit for a submarine optical cable communication system employing four submarine branching units BU1 to BU4 each incorporating the power feed line switching circuit shown in FIG. 10. Note, the four submarine branching units BU1 to BU4 are used to construct a submarine optical cable branching system including six cable landing stations AA, BB, CC, DD, EE and FF. The cable landing stations AA and BB are interconnected by a main optical marine cable, and the cable landing stations CC, DD, EE and FF are connected to branch optical marine cables branched from the main optical marine cable by the four submarine branching units BU1 to BU4. In this system, power is fed between the cable landing stations AA and BB in the both-end power feed mode, and power is fed by the other cable landing stations CC, DD, EE and FF in the one-end power feed mode. The respective relays RL11, RL12, RL13 and RL14 are different from each other in operating current for the above described reasons.

Figure 20:
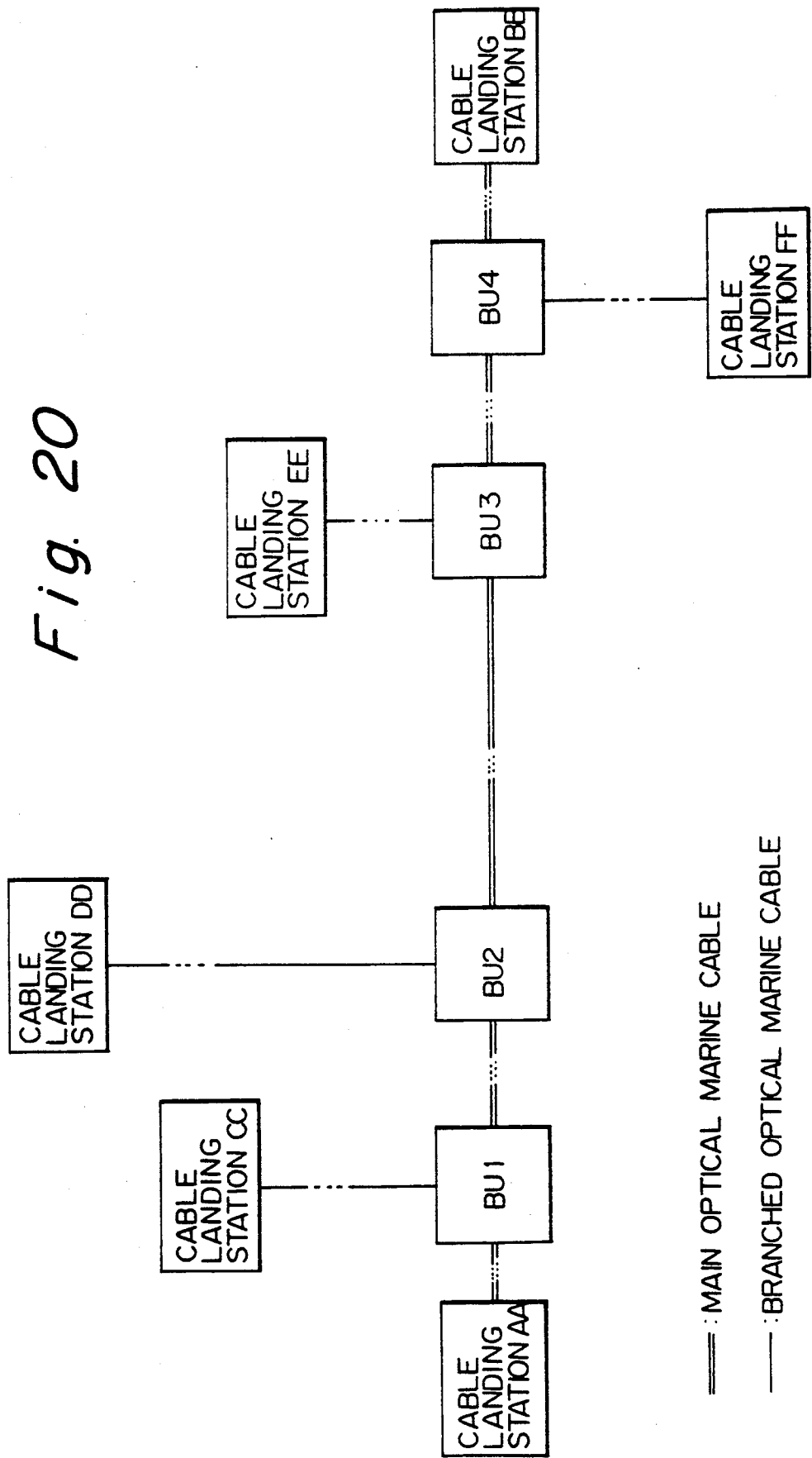
FIG. 20 is a conceptual diagram showing a power feed circuit for a submarine optical cable communication system employing a plurality of submarine branching units according to the first aspect of the present invention.

FIG. 20 is a conceptional diagram showing a power feed circuit for a submarine optical cable communication system employing a plurality of submarine branching units according to the first aspect of the present invention. As shown in FIG. 20, a desired number of power feed lines can be branched from the power feed line of a main optical marine cable, i.e., an optical marine cable interconnecting cable landing stations AA and BB, by inserting submarine branching units respectively having relays, i.e., submarine branching units BU1 to BU4 respectively having relays RL11 to RL14 in FIG. 20, to be operated respectively by different operating currents. Consequently, it is possible to construct a submarine optical cable communication system for communication between more cable landing stations than the foregoing submarine optical cable communication systems.

Note, in the above description, the relays RL11, RL21, RL31, RL41 to RL14, RL24, RL34, RL44 are used as mechanical relays, such as vacuum relays, but they can be used as electromechanical relays, such as contactless relays. Note, the electronic relays are, for example, solid-state relays having semiconductor switching elements instead of transfer contacts and make/break contacts.

As described above, according to the first aspect of the present invention, there is provided a power feed system of high reliability employing both-end power feed lines and enabling increase in cable landing stations. In this power feed system, when a fault occurs in the power feed line of any one of the optical marine cables, a power feed circuit including both-end power feed lines can be established by the rest of the power feed lines.

Note, as described above, a housing of the submarine branching unit BU is, for example, made of berylium-copper composition metal which includes an anti-corrosion function and a pressure proof function. Such a submarine branching unit or an optical repeater may be used in sea water (submarine) at a depth of about 8000 meters, and should be guaranteed during a long time, e.g., over 25 years.

Further, the housing of the submarine branching unit BU is preferably determined at a positive potential in order to avoid electrical corrision. When one-end power feed mode is established and the housing of the submarine branching unit BU is connected to the ground (undersea ground), the cable landing station (AA, BB, CC, or DD) is preferably determined at a negative potential against the potential of the housing of the submarine branching unit BU. Because, when the potential of the housing of the submarine branching unit BU is determined to be a positive potential, metal ions in the sea water (which has a positive electrical charge) may deposit on the surface of the housing of the submarine branching unit BU, but electrical corrision doses not occur, nor does metal of the housing dissolve into the sea water.

Figure 21:
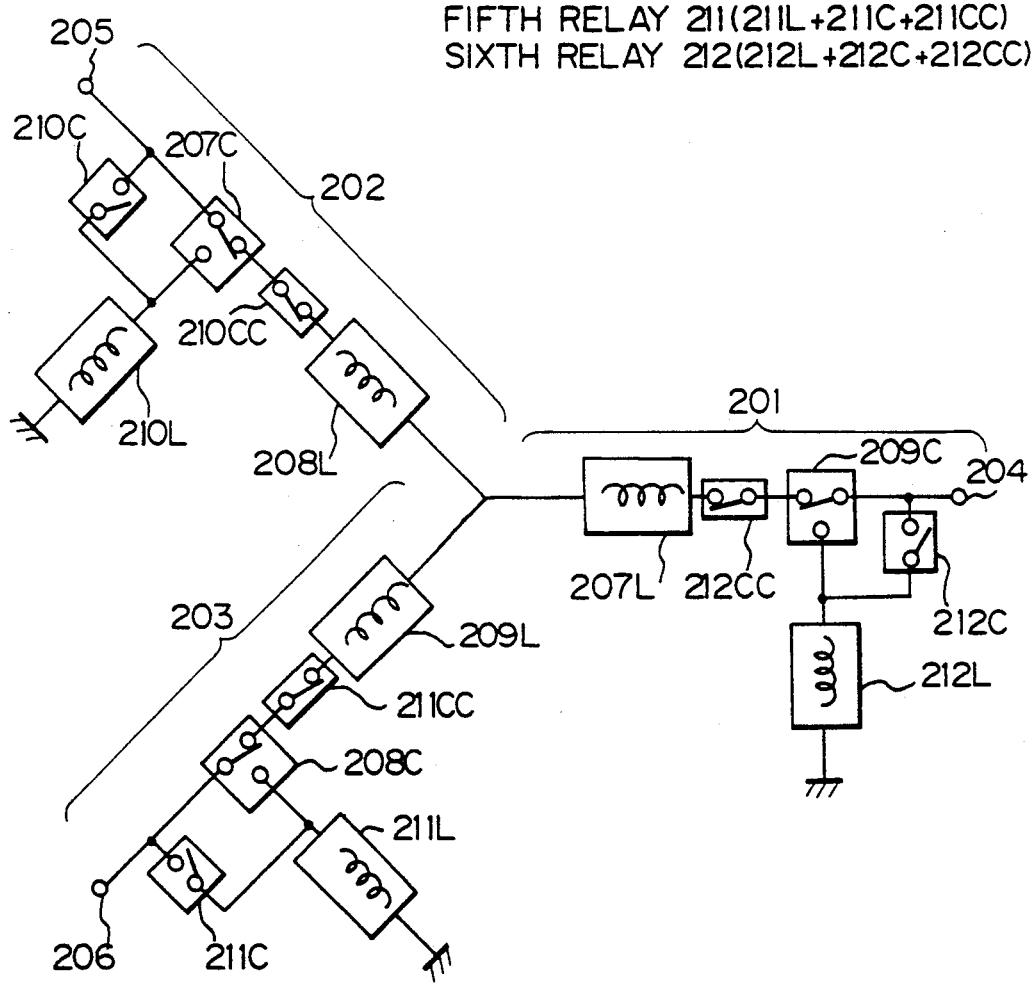
FIG. 21 is a diagram for explaining a principle of a second aspect of the present invention.

FIG. 21 is a diagram for explaining a principle of a second aspect of the present invention.

As shown in FIG. 21, a power feed line switching circuit of a second aspect according to the present invention for a submarine branching unit comprises first, second and third electrical paths 201, 202 and 203 connected in a Y-shaped connection (electrical connection), and first, second and third terminals 204, 205 and 206 connected respectively to the ends of the electrical paths to connect the first, second and third electrical paths to the power feed lines of submarine cables. The power feed line switching circuit comprises first, second and third relays 207, 208 and 209. The first relay 207 includes a drive unit 207L inserted in the first electrical path 201, and a switching unit 207C for disconnecting the second terminal 205 from the second electrical path 202 and grounding the same. The second relay 208 includes a drive unit 208L inserted in the second electrical path 202, and a switching unit 208C for disconnecting the third terminal 206 from the third electrical path 203 and grounding the same. The third relay 209 includes a drive unit 209L inserted in the third electrical path 203, and a switching unit 209C for disconnecting the first terminal 204 from the first electrical path 201 and grounding the same. The respective directions of operating currents flowing through the first, second and third relays 207, 208 and 209 with respect to the common node of the Y-shaped connection of the electrical paths 201, 202 and 203 are the same.

As shown in FIG. 21, the power feed line switching circuit of the second aspect of the present invention further comprises fourth, fifth and sixth relays 210, 211 and 212. The fourth relay 210 includes a drive unit 210L inserted in a grounding path between the switching unit 207C of the first relay 207 inserted in the second electrical path 202 and the ground (undersea ground), and a first switching unit 210C forming a lock-up circuit. The fifth relay 211 includes a drive unit 211L inserted in a grounding path between the switching unit 208L of the second relay 208 inserted in the third electrical path 203 and the ground, and a first switching unit 211C forming a lock-up circuit. The sixth relay 212 includes a drive unit 212L inserted in a grounding path between the switching unit 209L of the third relay 209 inserted in the first electrical path 201 and the ground, and a first switching unit 212C forming a lock-up circuit.

The fourth relay 210 further includes a second switching unit 210CC for opening the second electrical path 202 at a position between the drive unit 208L of the second relay 208 and the switching unit 207C of the first relay 207 simultaneously with the action of the first switching unit 210C of the fourth relay 210. Similarly, the fifth relay 211 further includes a second switching unit 211CC for opening the third electrical path 203 at a position between the drive unit 209L of the third relay 209 and the switching unit 208C of the second relay 208 simultaneously with the action of the first switching unit 211C of the fifth relay 211. In addition, the sixth relay 212 further includes a second switching unit 212CC for opening the first electrical path 201 at a position between the drive unit 207L of the first relay 207 and the switching unit 209C of the third relay 209 simultaneously with the action of the first switching unit 212C of the sixth relay 212.

Figure 22:
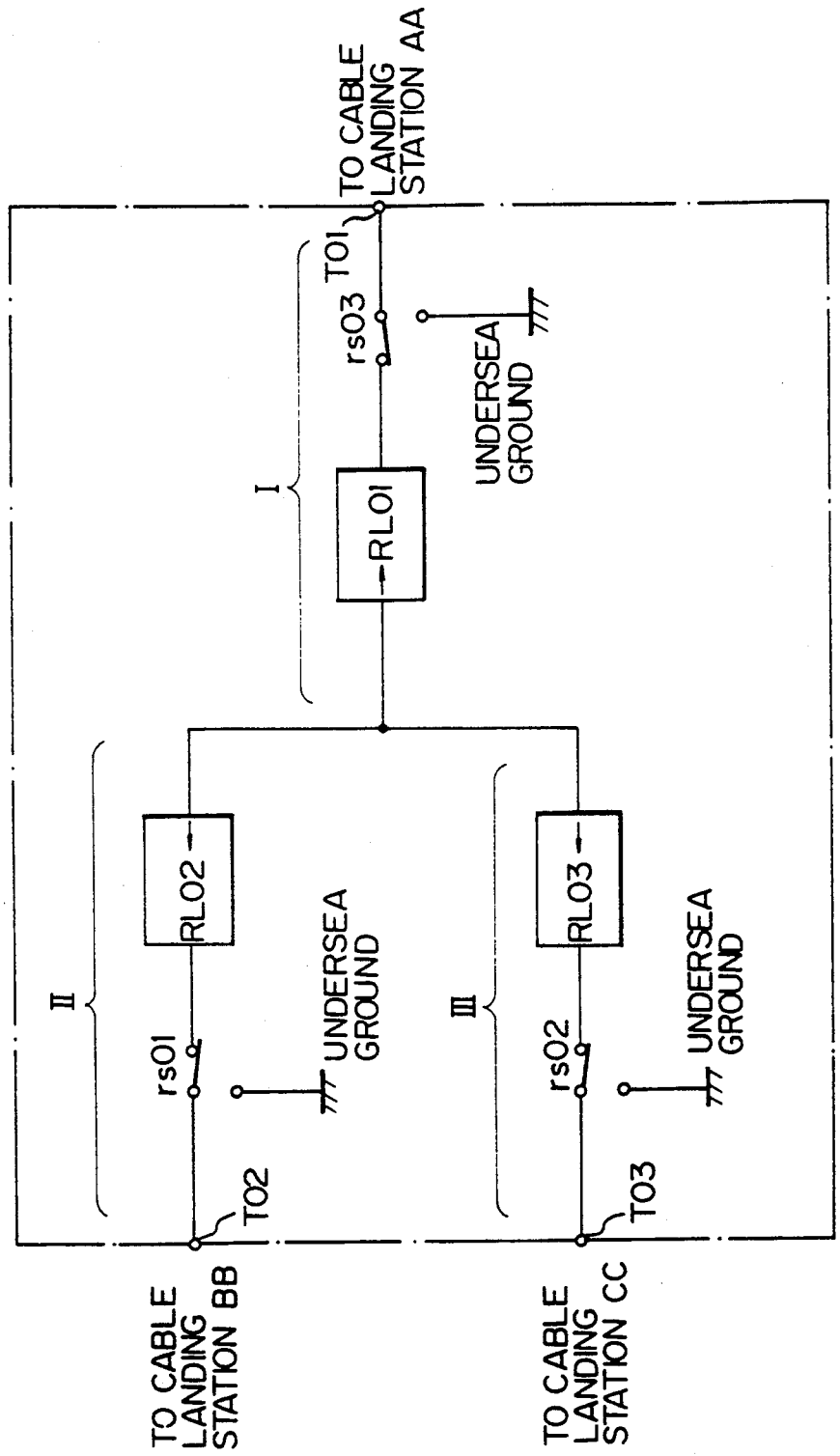
FIG. 22 is a block diagram showing a first embodiment of a power feed line switching circuit for a submarine branching unit according to the second aspect of the present invention.

FIG. 22 is a block diagram showing a first embodiment of a power feed line switching circuit for a submarine branching unit according to the second aspect of the present invention. Note, in the power feed line switching circuit shown in FIG. 22, optical fiber circuits are excluded therefrom.

As shown in FIG. 22, the power feed line switching circuit of the first embodiment according to the second aspect of the present invention is of a three-way power feed switching type capable of securing power feed lines by two of three optical marine cables connected to a submarine branching unit BU even if a fault occurs in the other optical marine cable.

The submarine branching unit BU has three terminals T01, T02 and T03 connected through power feed lines of the optical marine cables respectively to the power feed units of cable landing stations AA, BB and CC. Each of the power feed units of the cable landing stations AA, BB and CC is capable of supplying a current of either a positive polarity or a negative polarity to the optical marine cable.

The power feed circuit of the submarine branching unit BU comprises electrical paths I, II and III connected in a Y-shaped connection, and the terminals T01, T02 and T03 connected to the ends of the electrical paths I, II and III. The driving coil (hereinafter, it may be referred to as "relay coil") RL01 of a relay RL01 is inserted in the electrical path I, the driving coil (hereinafter, it may be referred to as "relay coil") RL02 of a relay RL02 is inserted in the electrical path II, and the driving coil (hereinafter, it may be referred to as "relay coil") RL03 of a relay RL03 is inserted in the electrical path III. The transfer contact rs01 of the relay RL01 is interposed between the terminal T02 on the electrical path II, and the relay coil RL02, the break contact of the transfer contact rs01 is provided between the terminal T02 and the relay coil RL02, and the make contact of the transfer contact rs01 is provided between the terminal T02 and the ground (undersea ground). Similarly, the transfer contact rs02 of the relay RL02 is inserted in the electrical path III between the terminal T03 and the relay coil RL03, the break contact of the transfer contact rs02 is provided between the terminal T03 and the relay coil RL03, and the make contact of the transfer contact rs02 is provided between the terminal T03 and the ground. Further, the transfer contact rs03 of the relay RL03 is inserted in the electrical path I between the terminal T01 and the relay coil RL01, the break contact of the transfer contact rs03 is provided between the terminal T01 and the relay coil RL01, and the make contact of the transfer contact rs03 is provided between the terminal T01 and the ground.

The relays RL01, RL02 and RL03 are driven only by operating currents (working currents) flowing in the directions of the arrows shown in FIG. 22. Namely, the relays RL01, RL02 and RL03 are driven by currents flowing from the node of the Y-shaped connection toward the terminals T01, T02 and T03. The relays RL01, RL02 and RL03 are high-tension relays, such as vacuum relays.

A method of feeding power through the power feed line switching circuit to the optical marine cables from the cable landing stations AA, BB and CC will be described with reference to FIGS. 23A, 23B and 23C.

Figure 23A:
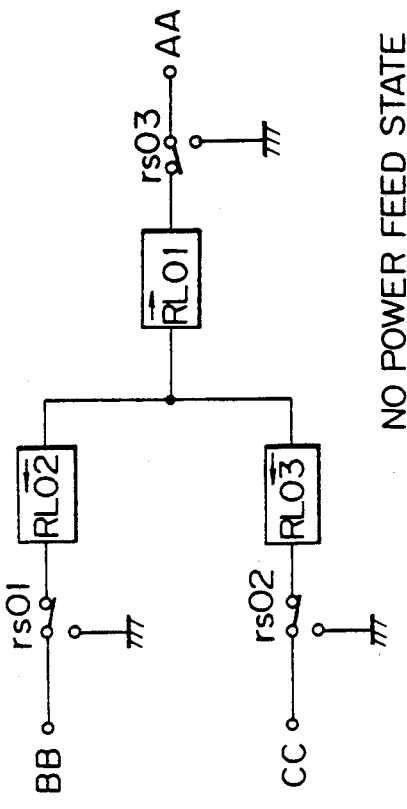
FIGS. 23A, 23B and 23C are diagrams for explaining a power feed line setting procedure by which power feed lines are established by the power feed line switching circuit shown in FIG. 22.

As shown in FIG. 23A, the respective break contacts of the transfer contacts rs01, rs02 and rs03 are closed to connect the terminals respectively to the corresponding relay coils while no power is fed to the optical marine cables. Thus, all the power feed lines are insulated from sea water (undersea ground). Such a state is advantageous for a DC insulation resistance test.

Figure 23B:
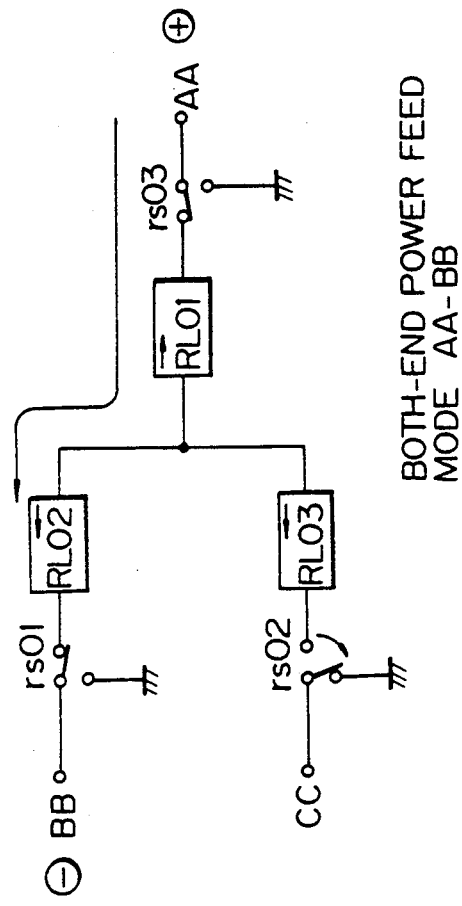
Figure 23C:
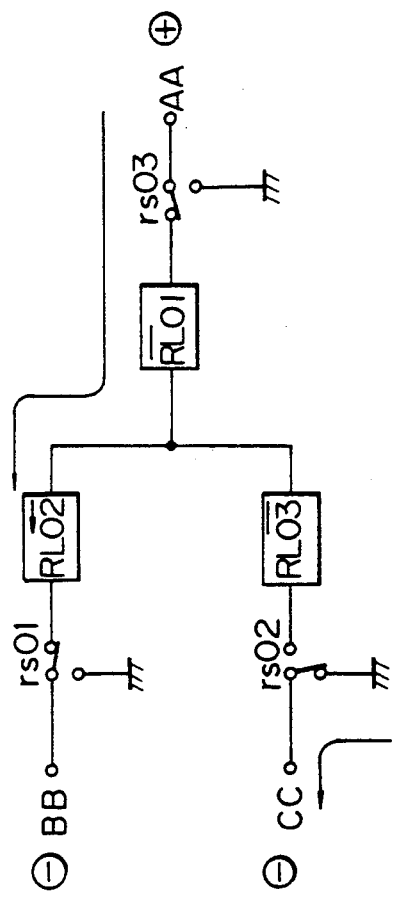

Next, as shown in FIG. 23B, power is fed by the cable landing stations AA and BB so that a current flows in the direction of the arrow to energize the relay RL02 and, consequently, a power feed line for both-end power feed is formed between the cable landing stations AA and BB. When the relay RL02 is energized, the make contact of the transfer contact rs02 is closed to connect the terminal T03 to the ground. Thus, the power feed line of the optical marine cable connected to the cable landing station CC is grounded. Further, as shown in FIG. 24C, power is fed from the cable landing station CC to feed power in the one-end power feed mode by using the ground to the optical marine cable connected to the cable landing station CC.

Figure 24C:
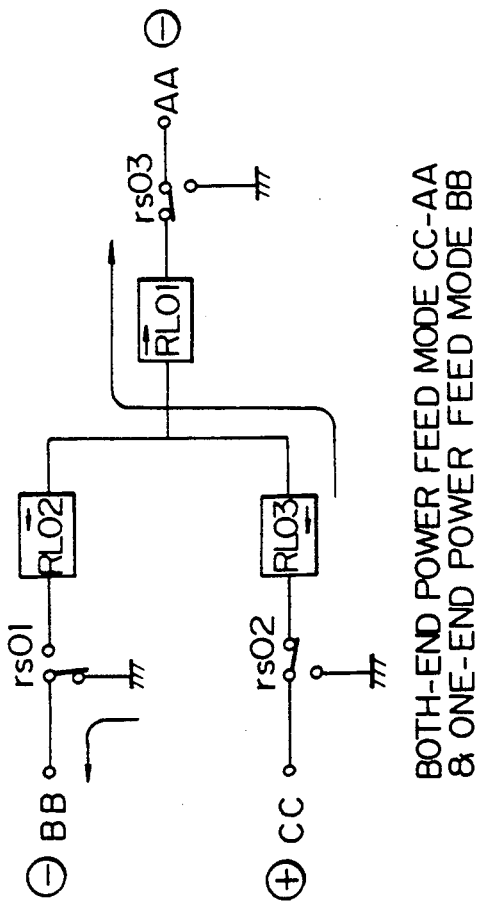

Since the unit in this embodiment has a symmetrical Y-shaped connected circuit configuration, it is possible to establish power feed lines in any one of three power feed line formations shown in FIGS. 24A, 24B and 24C. Namely, in a power feed line formation shown in FIG. 24A, power feed between the cable landing station AA (positive current) and the cable landing station BB (negative current) is specified to a both-end power feed mode, and power feed by the cable landing station CC (negative current) is specified to a one-end power feed mode. Further, in a power feed line formation shown in FIG. 24B, power feed between the cable landing station BB (positive current) and the cable landing station CC (negative current) is specified to a both-end power feed mode, and power feed by the cable landing station AA (negative current) is specified to a one-end power feed mode. Furthermore, in a power feed line formation shown in FIG. 24C, power feed between the cable landing station CC (positive current) and the cable landing station AA (negative current) is specified to a both end power feed mode, and power feed by the cable landing station BB (negative current) is specified to a one-end power feed mode.

Accordingly, if a fault occurs in any one of the three optical marine cables, it is possible to disconnect the faulty optical marine cable from the power feed lines connected in the Y-shaped connection and to feed power through the other two optical marine cables in the both-end power feed mode.

Figure 25:
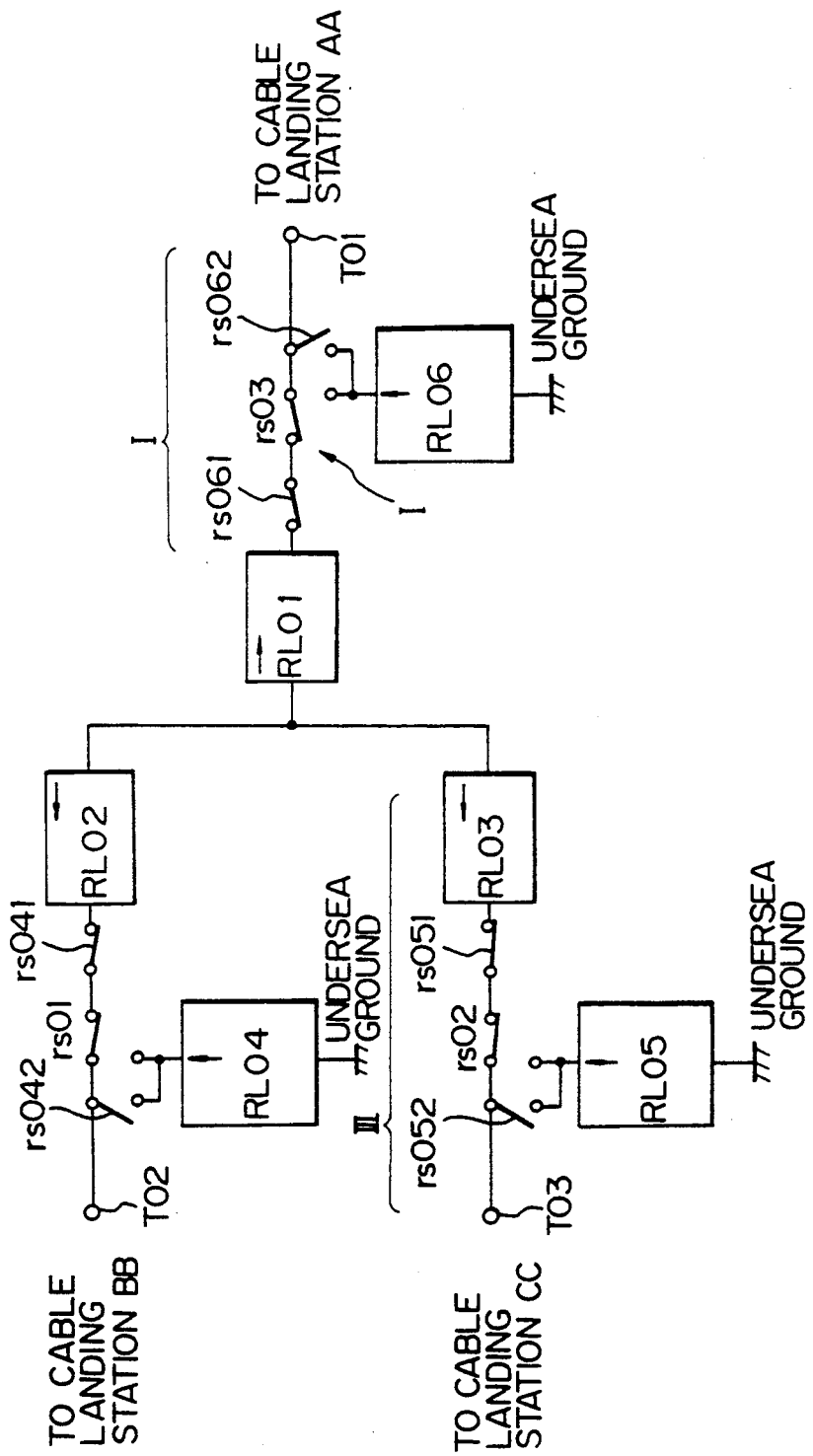
FIG. 25 is a diagram showing a second embodiment of a power feed line switching circuit for a submarine branching unit according to the second aspect of the present invention.

FIG. 25 is a diagram showing a second embodiment of a power feed line switching circuit for a submarine branching unit according to the second aspect of the present invention. In the power feed line switching circuit in the first embodiment of the second aspect shown in FIG. 22, the relays on the power feed line in the both-end feed mode are de-energized if a fault occurs in the power feed line in the both-end power feed mode. Therefore, the break contact of the transfer contact on the power feed line in the one-end power feed mode is closed. That is, the power feed line in the one-end power feed mode is changed over if a fault occurs in the power feed line in the both-end power feed mode. The power feed line switching circuit shown in FIG. 25 is formed so as to inhibit the changeover of the power feed line.

The power feed line switching circuit shown in FIG. 25 is provided, in addition to the components of the power feed line switching circuit shown in FIG. 22, with lock-up relays RL04, RL05 and RL06 in the electrical paths I, II and III, respectively, to lock-up the grounding paths. The relay RL04 has a relay coil inserted in a path connected to the electrical path II between the transfer contact rs01 and the ground. The relay RL04 has a make contact rs042 forming a lock-up circuit and connected in parallel to the make contact of the transfer contact rs01, and a break contact rs041 inserted between the transfer contact rs01 and the relay coil RL02.

The other lock-up relays RL05 and RL06 are arranged likewise in the electrical paths III and I, respectively. The relays RL04 to RL06 are driven only when operating currents flow in the directions of the arrows shown in FIG. 25.

As described above, the relays RL04, RL05 and RL06 inhibit the changeover of the power feed line in case a fault occurs in the optical marine cables in the both-end power feed mode during operation. The make contacts serve as lock-up contacts. The break contacts prevent damaging the transfer contacts by arc discharge when the transfer contacts connect the relays to the terminals. While the relays are in a lock-up state, the break contacts disconnect the transfer contacts from the relay coils.

A power feed line setting procedure of the power feed line switching circuit shown in FIG. 25 is the same as that of the power feed line switching circuit shown in FIG. 22.

FIGS. 26A, 26B and 26C are diagrams for explaining a power feed line setting procedure by which power feed lines are established by the power feed line switching circuit shown in FIG. 25. As shown in FIG. 26A, the transfer contacts rs01, rs02 and rs03 of the relays RL01, RL02 and RL03 are connected to the lines connected to the relay coils, and the make contacts rs042, rs052 and rs062 of the lock-up relays RL04, RL05 and RL06 are open while no power is fed, so that all the power feed lines are isolated from sea water (undersea ground).

As shown in FIG. 26B, power is fed in the both-end power feed mode between the cable landing stations AA and BB. Thereby the relay RL02 is driven to ground the power feed line of the optical marine cable connected to the cable landing station CC. Then, as shown in FIG. 26C, power is fed by the cable landing station CC in the one-end power feed mode. Thus the relay RL05 is energized to close the lock-up make contact rs052 of the relay RL05 and to open the break contact rs051 thereof.

Once a lock-up circuit is thus established by the relay RL05, the make contact rs052 of the relay RL05 remains closed to keep the relay RL05 energized, for example, even if a fault occurs in the optical marine cable connected to the cable landing station AA and the relay RL02 is de-energized to open the make contact of the transfer contact rs02 as shown in FIG. 27.

FIG. 27 is a diagram for explaining the functions of lock-up relays employed in the power feed line switching circuit shown in FIG. 25. As shown in FIG. 27, the break contact rs051 of the relay RL05 remains open to keep the relay coil RL03 disconnected from the optical marine cable connected to the cable landing station CC. Thus, the changeover of the power feed line of the cable landing station CC due to the occurrence of the fault in the optical marine cable connected to the cable landing station AA can be prevented. Thus, the contacts are protected from damage due to arc discharge.

Figure 28A:
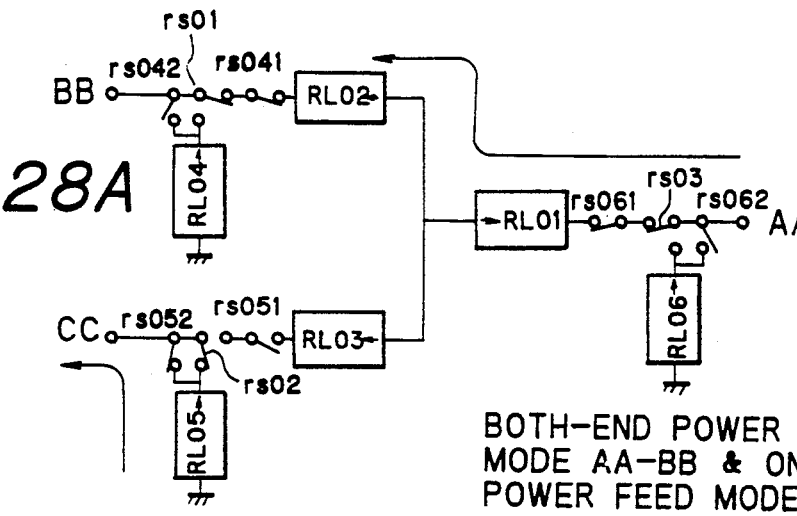
FIGS. 28A, 28B and 28C are diagrams showing power feed lines which can be established by the power feed line switching circuit shown in FIG. 25.
Figure 28B:
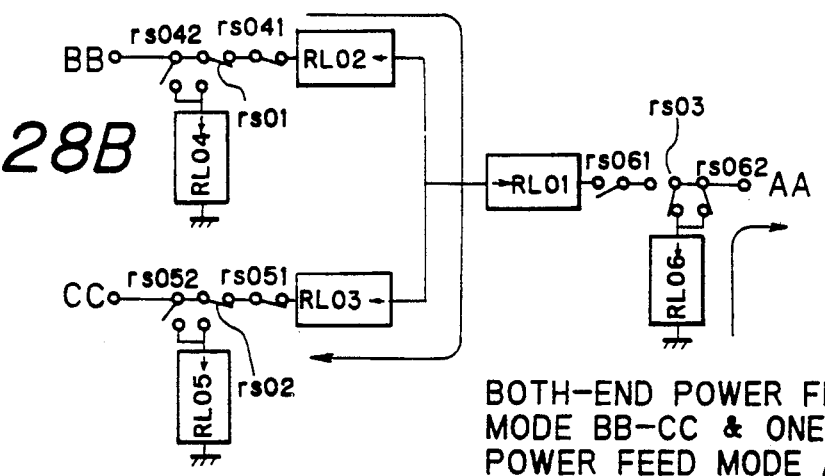
Figure 28C:
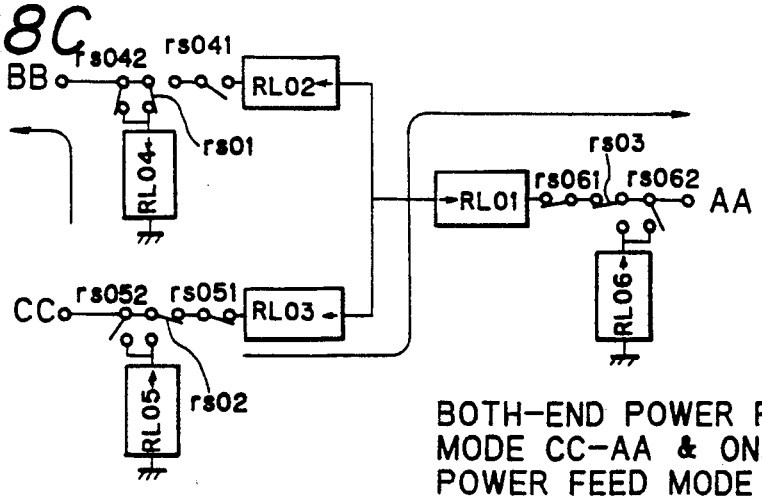

FIGS. 28A, 28B and 28C show three possible power feed line formations of the power feed line switching circuit shown in FIG. 25 for normal operation. Namely, a power feed line formation shown in FIG. 28A is a case where the power feed between the cable landing stations AA and BB in the both-end power feed mode and power feed by the cable landing station CC in the one-end power feed mode. A power feed line formation shown in FIG. 28B is a case where the power feed between the cable landing stations BB and CC in the both-end power feed mode and power feed by the cable landing station AA in the one-end power feed mode. A power feed line formation shown in FIG. 28C is a case where the power feed between the cable landing stations CC and AA in the both-end power feed mode and power feed by the cable landing station BB in the one-end power feed mode.

Figure 29:
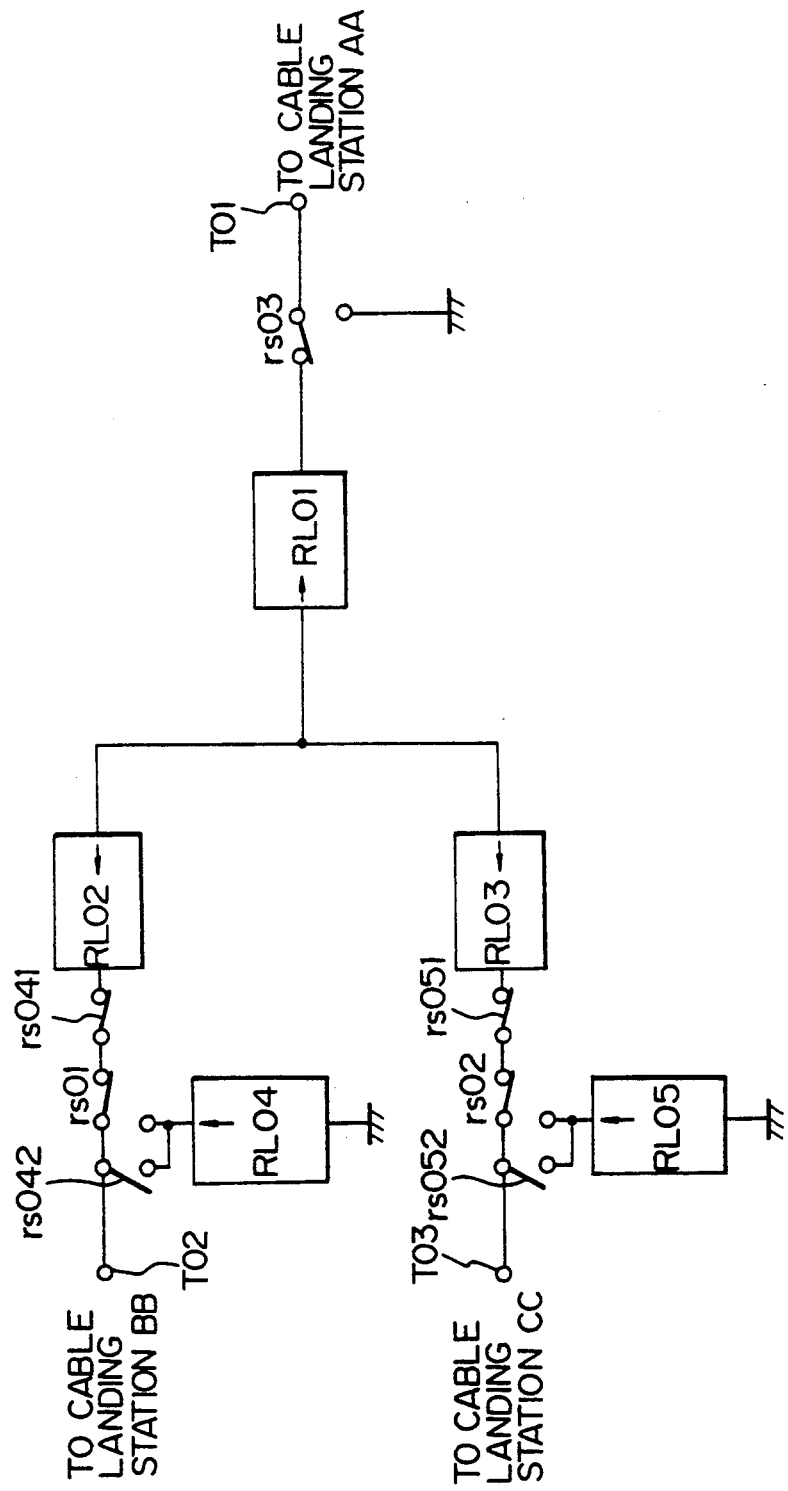
FIG. 29 is a diagram showing a third embodiment of a power feed line switching circuit for a submarine branching unit according to the second aspect of the present invention.

FIG. 29 is a diagram showing a third embodiment of a power feed line switching circuit for a submarine branching unit according to the second aspect of the present invention. Note, in the power feed line switching circuit shown in FIG. 29, the lock-up relay RL06 associated with the cable landing station AA is eliminated from that shown in FIG. 25 in order to reduce the component parts.

The power feed line switching circuit shown in FIG. 29, which executes the same power feed line setting procedure as that executed by the power feed line switching circuit shown in FIG. 25, can be set in two power feed line formations by changing the polarity of the power feed units of the cable landing stations. Namely, in the power feed line switching circuit, a power feed line formation for power feed between the cable landing station AA (positive current) and the cable landing station BB (negative current) can be specified to the both-end power feed mode and power feed by the cable landing station CC (negative current) can be specified to the one-end power feed mode, or a power feed line formation for power feed between the cable landing station CC (positive current) and the cable landing station AA (negative current) can be specified to the both-end power feed mode and power feed by the cable landing station BB (negative current) can be specified to the one-end power feed mode.

Even though a fault occurs in any one of the three optical marine cables, power feed in the both-end power feed mode can be carried out by the other two optical marine cables. For example, if a fault occurs in the optical marine cable connected to the cable landing station AA, power feed from all the cable landing stations is interrupted temporarily, and power is fed between the cable landing station BB (positive current)

and CC (negative current) in the both-end power feed mode to energize a relay RL03 so that the transfer contact rs03 of the relay RL03 disconnects the faulty optical marine cable connected to the cable landing station AA.

The power feed line switching circuits in the above described embodiments feed power through the power feed lines of the optical marine cables to optical repeaters inserted respectively in the optical marine cables. It is possible to feed power to the power supply of an optical circuit provided in the submarine branching unit through the power feed lines to switch the optical fiber transmission lines of the submarine branching unit and to feed power to the repeating circuit of the submarine branching unit.

Figure 30:
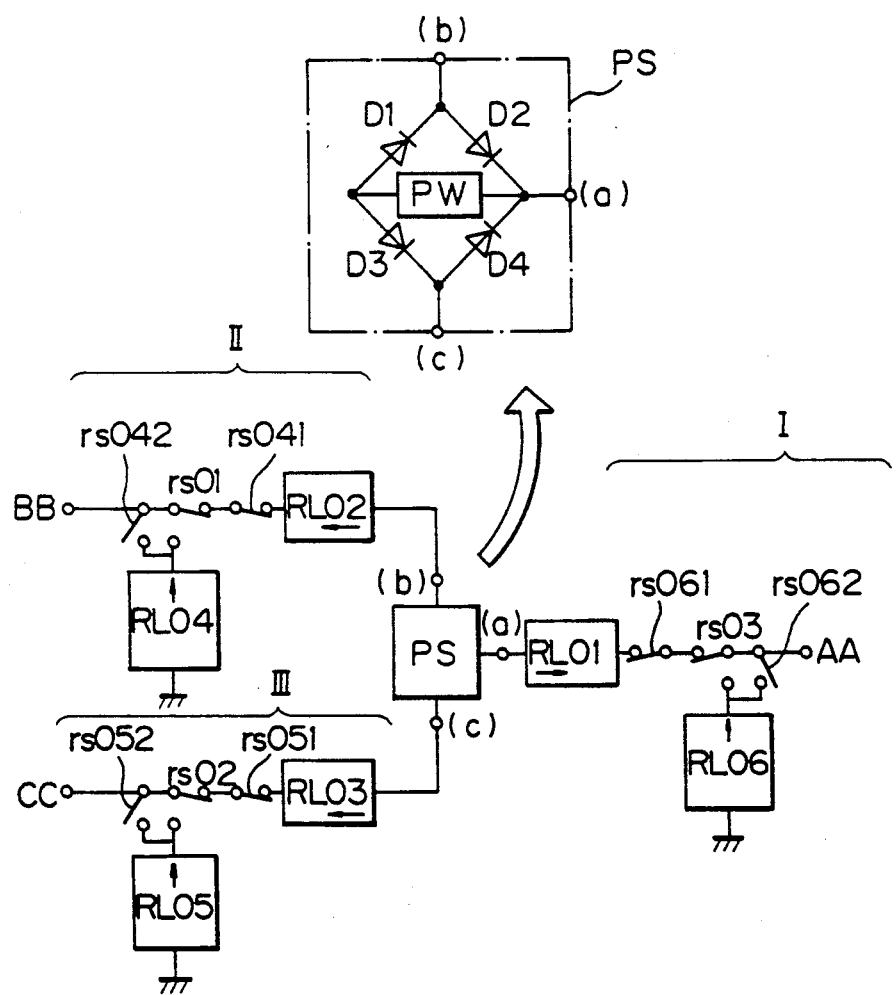
FIG. 30 is a diagram showing a fourth embodiment of a power feed line switching circuit for a submarine branching unit according to the second aspect of the present invention, wherein a power supply circuit for an optical circuit is additionally provided to the power feed line switching circuit shown in FIG. 29.

FIG. 30 is a diagram showing a fourth embodiment of a power feed line switching circuit for a submarine branching unit according to the second aspect of the present invention. Note, in the power feed line switching circuit shown in FIG. 30, a power supply circuit for an optical circuit is additionally provided to the that shown in FIG. 29.

As shown in FIG. 30, the power feed line switching circuit of the fourth embodiment of the second aspect of the present invention is provided in addition to the components of the power feed line switching circuit of FIG. 25, with a power supply circuit (optical fiber power supply circuit) supplying power to an optical circuit. A power supply circuit PS for the optical circuit is provided at the node of electrical paths I, II and III connected in a Y-shaped connection. The power supply circuit PS comprises four diodes D1, D2, D3 and D4 connected in a bridge circuit, and a power supply unit PW for the optical circuit. A current flowing into the node of the Y-shaped connection flows through the two diodes into the power supply unit PW. The power supply circuit PS is able to supply power under any condition to the power supply unit PW when the flowing direction of the current is any one of three flowing directions along the power feed lines.

Figure 31:
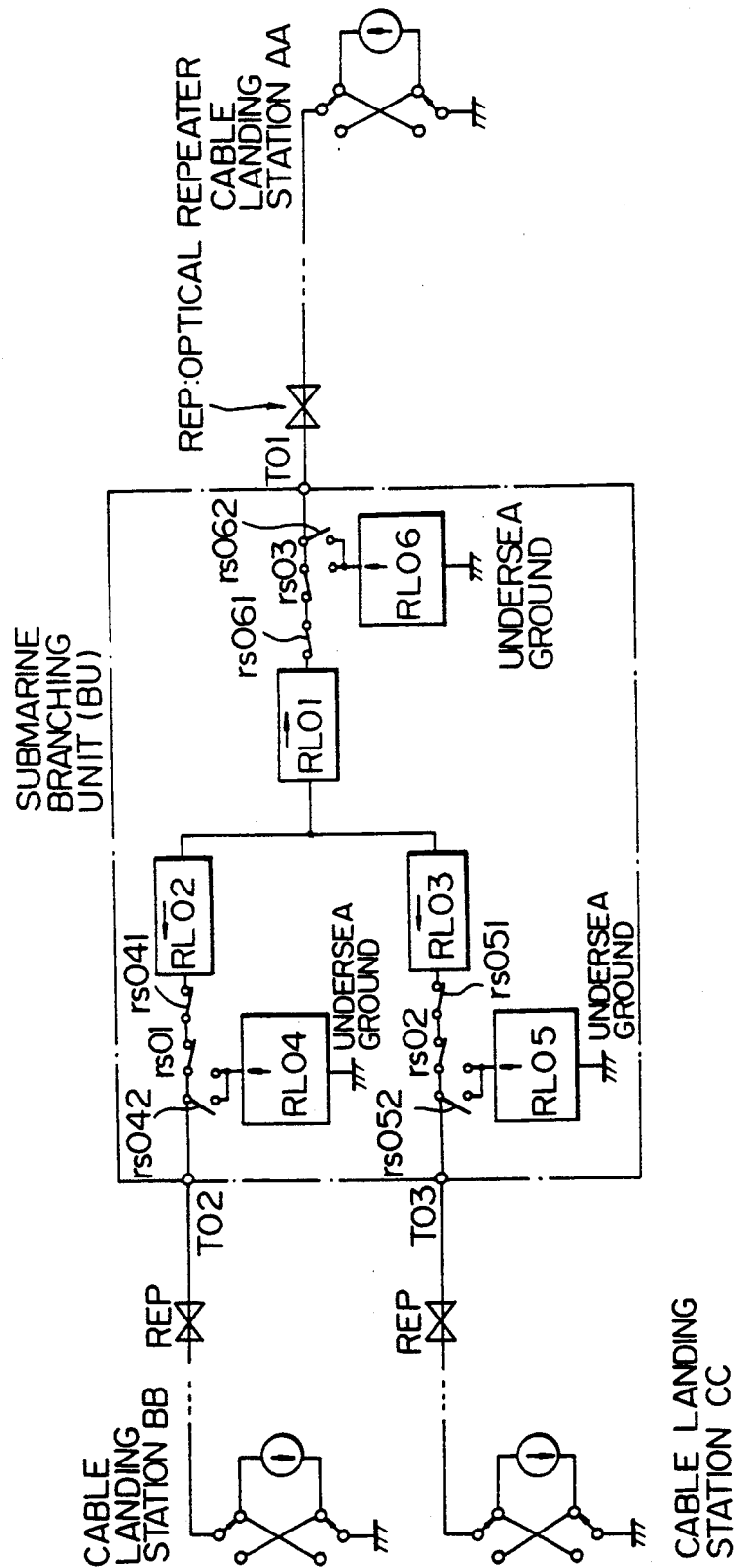
FIG. 31 is a diagram of a submarine optical cable communication system incorporating the power feed line switching circuit shown in FIG. 25.

FIG. 31 is a diagram showing construction of a submarine optical cable communication system incorporating the power feed line switching circuit shown in FIG. 25. Submarine optical cables branched by a submarine branching unit BU are connected respectively to cable landing stations AA, BB and CC having power feed units capable of inverting power feed polarity.

Figure 32:
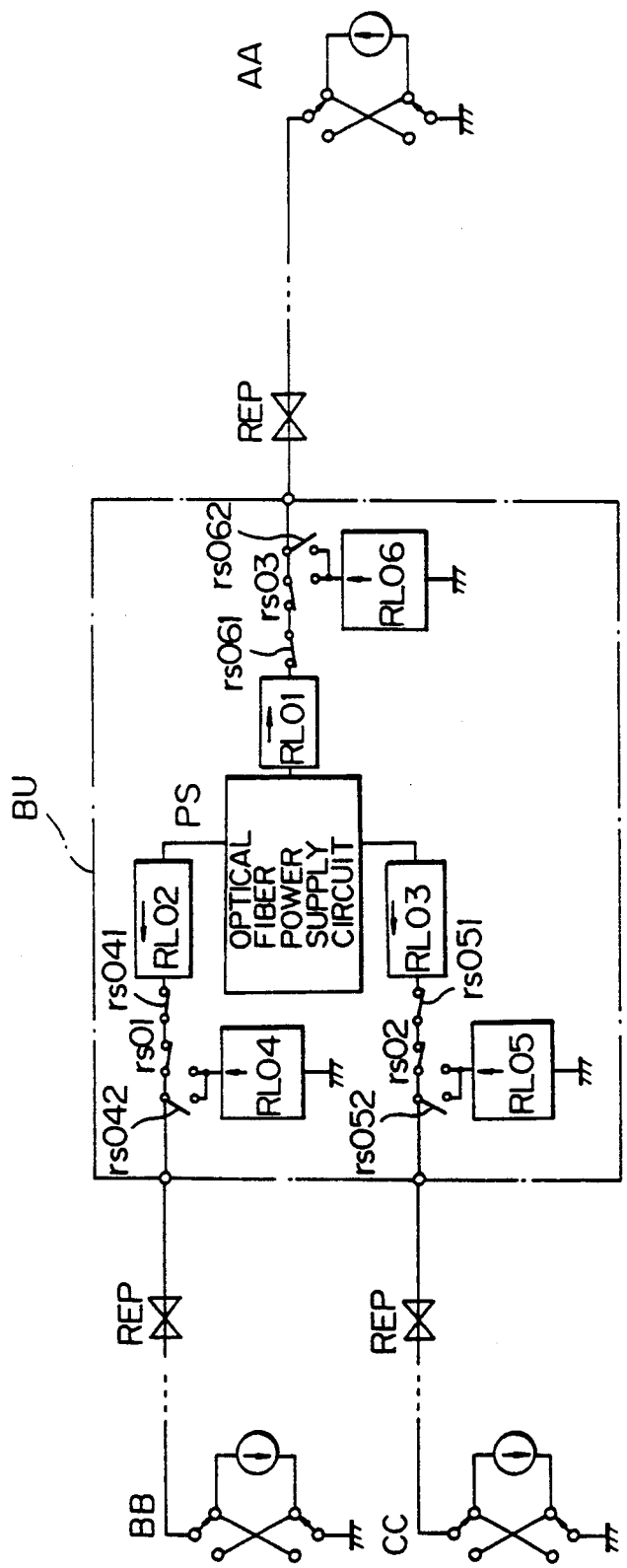
FIG. 32 is a diagram showing a submarine optical cable communication system employing the submarine optical cable communication system shown in FIG. 31, wherein a power supply circuit for an optical circuit is additionally provided thereto.

FIG. 32 is a diagram showing a submarine optical cable communication system employing the submarine optical cable communication system shown in FIG. 31. Note, in the submarine optical cable communication system shown in FIG. 32, an optical circuit is additionally provided thereto, namely, a power supply circuit PS for an optical circuit is added to the submarine branching unit BU of the submarine optical communication system shown in FIG. 31. The operation of these systems are the same as that explained with reference to the power feed line switching circuit of FIG. 25.

Figure 33:
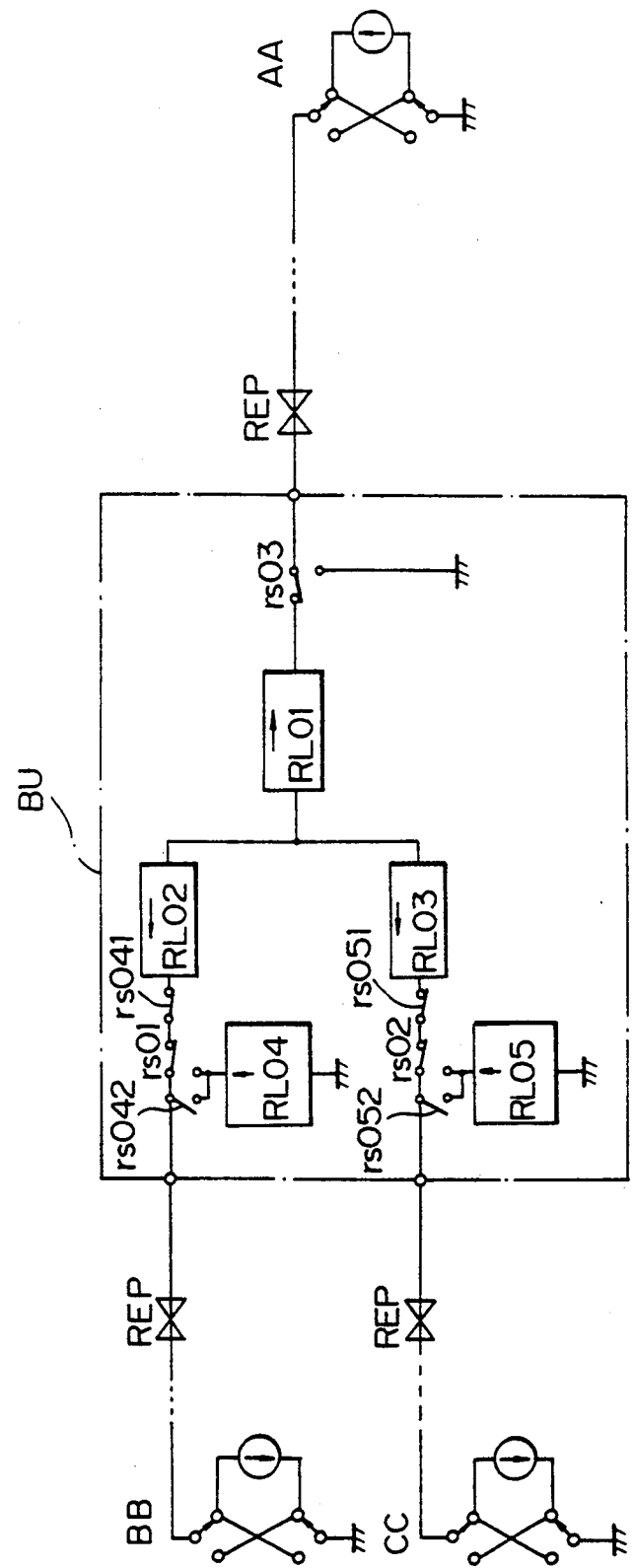
FIG. 33 is a diagram showing a submarine optical cable communication system employing the power feed line switching circuit shown in FIG. 29.
Figure 34:
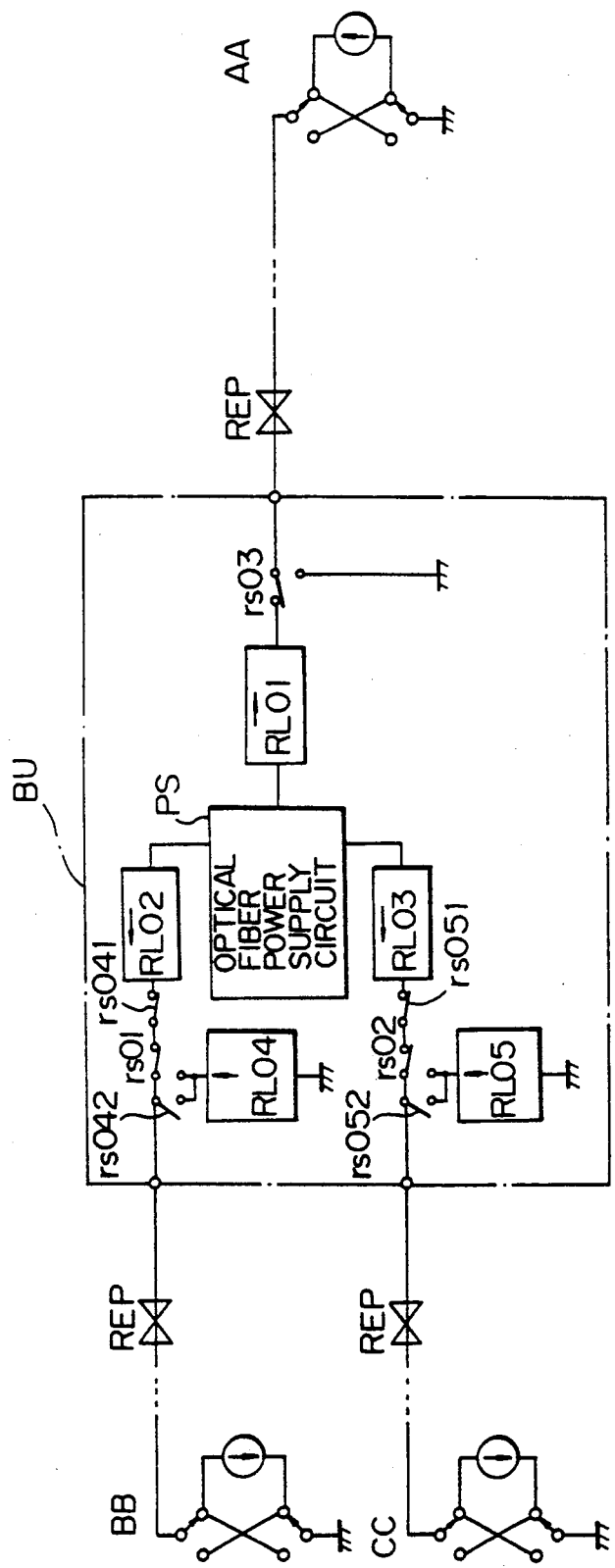
FIG. 34 is a diagram showing a submarine optical cable communication system employing the submarine optical cable communication system shown in FIG. 33, wherein a power supply circuit for an optical circuit is additionally provided thereto.

FIG. 33 is a diagram showing a submarine optical cable communication system employing the power feed line switching circuit shown in FIG. 29. FIG. 34 shows a submarine optical cable communication system formed by adding a power supply circuit PS to the submarine optical cable communication system shown in FIG. 33. These submarine optical cable systems operate in the same manner as that of operation of the power feed line switching circuit shown in FIG. 29.

Figure 35:
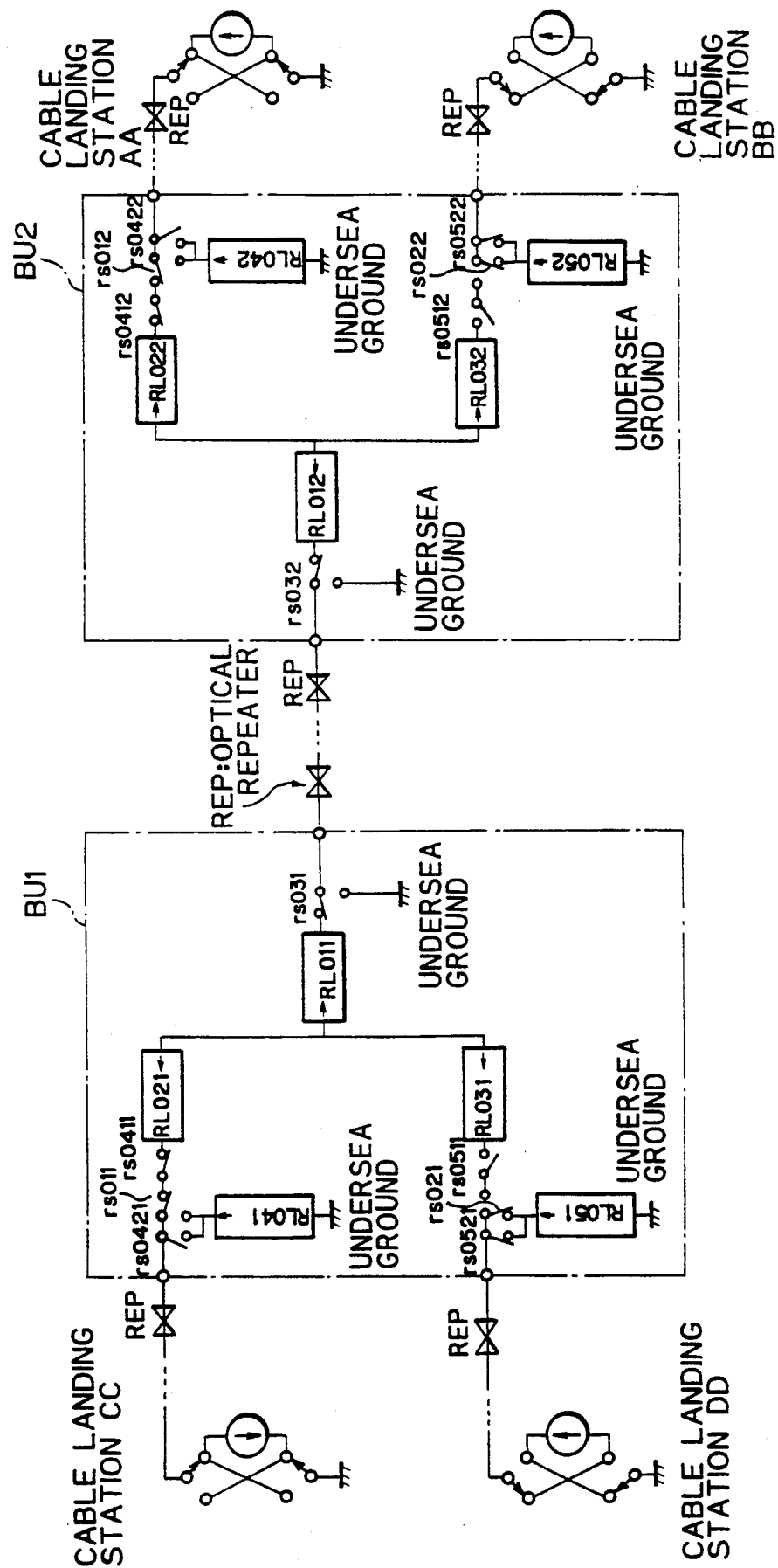
FIG. 35 is a diagram showing a submarine optical cable communication system employing two power feed line switching circuits similar to that shown in FIG. 29 to increase the cable, landing stations associated with the submarine optional cable communication system.

FIG. 35 is a diagram showing a submarine optical cable communication system employing two power feed line switching circuits similar to that shown in FIG. 29 to increase the cable landing stations associated with the submarine optical cable communication system. That is, FIG. 35 shows a power feed circuit for a submarine optical communication system for communication between four cable landing stations AA, BB, CC and DD. The submarine optical cable communication system is provided with two submarine branching units BU1 and BU2 for branching optical marine cables. The submarine branching units BU1 and BU2 are identical to that shown in FIG. 29. Any lock-up relay is not provided in a optical marine cable interconnecting the respective terminals of the submarine branching units BU1 and BU2. Naturally, the submarine branching units BU1 and BU2 may be provided respectively with power supply circuits (optical fiber power supply circuit) as shown in FIG. 36.

In setting power feed lines in this power feed system, power is fed between the cable landing station AA (positive current) and the cable landing station CC (negative current) in the both-end power feed mode to energize the relay RL022 of the submarine branching unit BU2, and the relay RL021 of the submarine branching unit BU1. Therefore, the power feed line of the optical marine cable connected to the cable landing station BB is connected to the ground (undersea ground) by the submarine branching unit BU2 (transfer contacts rs022 of the relay RL022), and the power feed line of the optical marine cable connected to the cable landing station DD is connected to the ground by the submarine branching unit BU1 (transfer contacts rs021 of the relay RL021), and then power is fed by the cable landing stations BB and DD in the one-end power feed mode.

Figure 36:
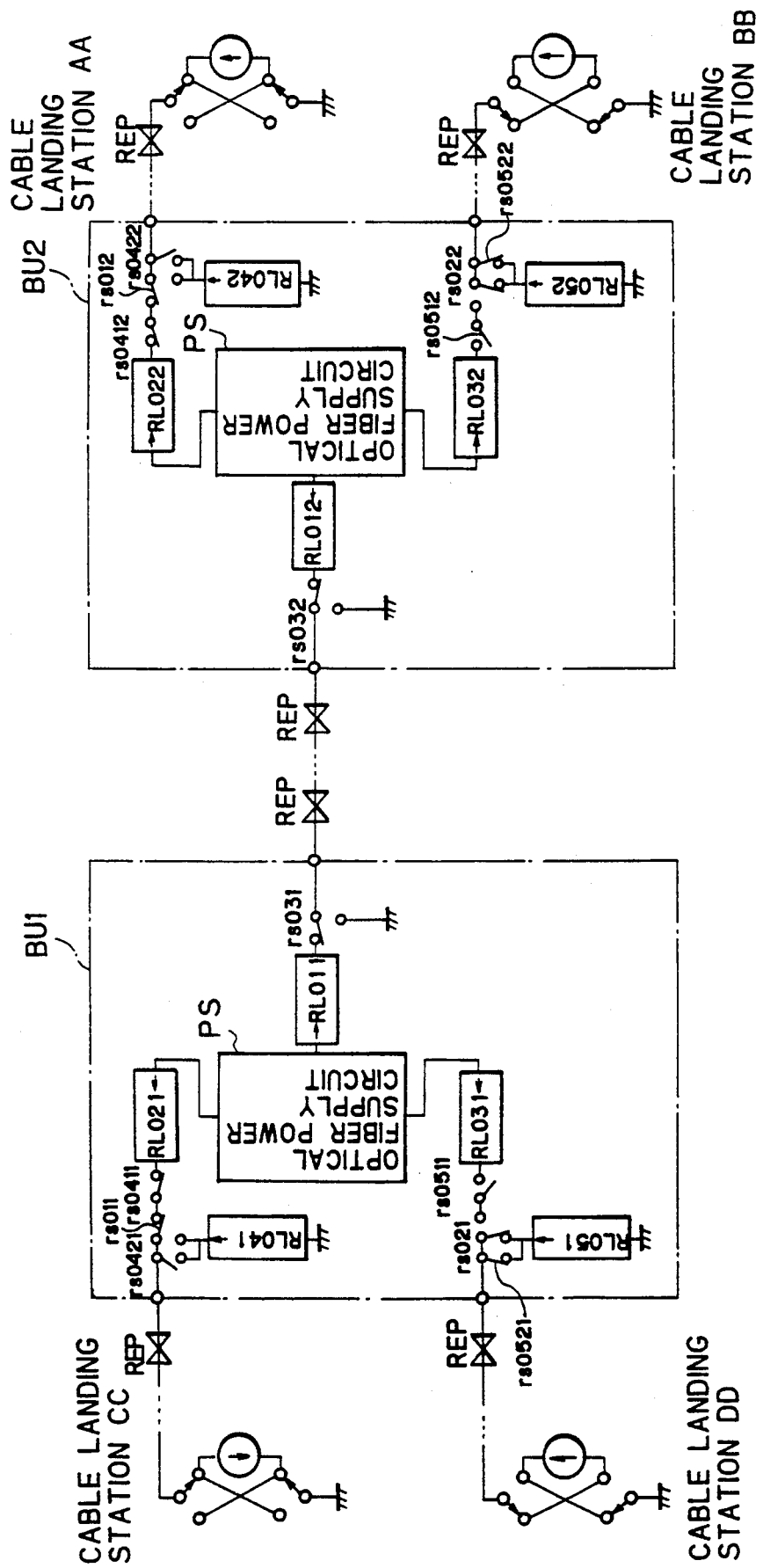
FIG. 36 is a diagram showing a submarine optical cable communication system employing the submarine optical cable communication system shown in FIG. 35,; wherein a power supply circuit for an optical circuit is additionally provided thereto.

FIGS. 37A to 37G are diagrams showing power feed lines which can be established in the submarine optical cable communication system shown in FIGS. 35 or 36. FIGS. 37A and 37B show possible power feed line formations for operation in the normal state, and FIGS. 37C to 37G show possible power feed line formations for operation in the abnormal state, in which solid lines show optical marine cables capable of feeding power, the arrows indicate the flowing direction of currents, and dotted lines indicate faulty optical marine cables incapable of feeding power.

For operation in the normal state, either a power feed line formation shown in FIG. 37A in which power is fed between the cable landing stations AA and CC in the both-end power feed mode and power is fed by the cable landing stations BB and DD in the one-end power feed mode, or a power feed line formation shown in FIG. 37B in which power is fed between the cable landing stations DD and BB in the both-end power feed mode and power is fed by the cable landing stations AA and CC in the one-end power feed mode is established.

First, when the optical marine cable connected to the cable landing station CC or the optical marine cable connected to the cable landing station AA becomes faulty, the power feed line formation shown in FIG. 37C or 37F is established. Namely, power is fed between the cable landing stations DD and BB in the both-end power feed mode and power is fed by the cable landing station BB or CC in the one-end power feed mode.

Next, when the optical marine cable connected to the cable landing station DD or the optical marine cable connected to the cable landing station BB becomes faulty, power is fed between the cable landing stations AA and CC in the both-end power feed mode and power is fed by the cable landing station BB or DD in the one-end power feed mode shown in FIG. 37E or 37D.

Further, when the optical marine cable interconnecting the submarine branching units BU1 and BU2 becomes faulty, power is fed in the both-end power feed mode between the cable landing stations BB and AA and between the cable landing stations CC and DD shown in FIG. 37G.

Consequently, the power feed line switching circuit in this embodiment is capable of switching the power feed lines to establish the power feed line for both-end power feed by the normal optical marine cables in case any one of the optical marine cable becomes faulty.

When a plurality of submarine branching units are employed for establishing power feed lines, the two or more relays of the different submarine branching units are inserted in the both-end power feed line. In such a case, relays differing from each other in operating current (working current) are employed to prevent the hot-switching of the relays. In driving the relay of the submarine branching unit, it is possible that the contacts of the relay are damaged by the potential difference in a switching the contact to connect the contact to the ground, if the potential to ground of the contact is high.

As described above, to prevent damaging the contact, the potential against the ground (undersea ground) of the power feed line of the submarine branching unit must be reduced to zero in driving the relay. For example, in feeding power in the both-end power feed mode between the cable landing stations connected respectively to the opposite ends of the main optical marine cable, the two cable landing stations regulate the feed voltages properly so that the potential of the power in the submarine branching unit is zero. When the system is provided with two submarine branching units shown in FIG. 35, it is impossible to reduce the potentials to ground of both the submarine branching units simultaneously.

With reference to FIG. 36, in the case that a both-end power feed line is established between the cable landing stations AA and CC, and the relay RL012 of the submarine branching unit BU2 and the relay RL021 of the submarine branching unit BU1 differ from each other in operating current. For example, the operating current of the relay coil RL021 is lower than that of the relay coil RL012. In feeding power between the cable landing stations AA and CC, the feed voltages of the cable landing stations AA and CC are regulated so that the potential to ground of the power feed line in the submarine branching unit BU1 is zero and the current of the power corresponding to the operating current of the relay coil RL021. Consequently, the relay RL021 of the submarine branching unit BU1 is driven for operation, but the relay RL012 of the submarine branching unit BU2 is unable to operate because the operating current of the relay RL012 is higher than that of the relay RL021. Although the potential against the ground of the power feed line is not zero, the transfer contact rs012 is not damaged because the relay RL012 does not operate.

After the relay RL021 of the submarine branching unit BU1 has been operated, the feed potentials of the cable landing stations AA and CC are regulated, and a current corresponding to the operating current of the relay coil RL012 is supplied and the relay RL012 of the submarine branching unit BU2 is driven for operation. Therefore, the hot-switching of the relays of the submarine branching units BU1 and BU2 can be prevented.

Consequently, when the respective operating currents of the relays of the submarine branching units on the both-end power feed line are different from each other, it is possible to establish a power feed circuit for submarine optical cable communication system for communication between a further greater number of cable landing stations.

Note, as already described above, a housing of the submarine branching unit BU is, for example, made of berylium-copper composition metal which includes an anti-corrosion, function and a pressure proof function. Such a submarine branching unit or an optical repeater may be used in sea water (submarine) at a depth of about 8000 meters, and they should be guaranteed the quality during a long time, e.g., over 25 years.

Further, the housing of the submarine branching unit BU is preferably determined at a positive potential in order to avoid an electrical corrision. When one-end power feed mode is established and the housing of the submarine branching unit BU is connected to the ground (undersea ground), the cable landing station (AA, BB, CC, or DD) is preferably determined at a negative potential against the potential of the housing of the submarine branching unit BU. Because, when the potential of the housing of the submarine branching unit BU is determined to be a positive potential, metal ions in the sea water (which have a positive electrical charge) may deposit on the surface of the housing of the submarine branching unit BU, but an electrical corrision does not occur, nor does metal of the housing dissolve into the sea water.

In addition, the electromechanical relays, such as vacuum relays, employed in the submarine branching units in the foregoing embodiments may be substituted by contactless relays, such as solid-state relays having semiconductor switching elements instead of transfer contacts and make/break contacts.

According to the above second aspect of the present invention, communication can be secured, even if any one of optical marine cables becomes faulty, by establishing power feed lines between the other optical marine cables. The established power feed lines include a both-end power feed line having high reliability in any circumstances. The power feed lines can be established by a comparatively simple power feed line setting procedure substantially similar to a currently employed power feed line switching procedure. Furthermore, a power feed line switching circuit additionally provided with a lock-up circuit keeps a previously established power feed line unchanged in case a fault occurs in the submarine cable during operation.

Incidentally, in laying a submarine cable or after the submarine cable has been laid for a submarine cable communication system, it is necessary to inspect the power feed line of the submarine cable to see if the power feed line is normal. A DC insulation resistance test is employed for the inspection to see if the power feed line is grounded. However, the DC insulation resistance test cannot be applied to testing a power feed line grounded by a submarine branching unit for power feed in the one-end power feed mode. Accordingly, the submarine branching unit must be provided with a power feed circuit capable of isolating the power feed lines of all the associated submarine cables from sea water when no power needs to be fed.

Figure 38:
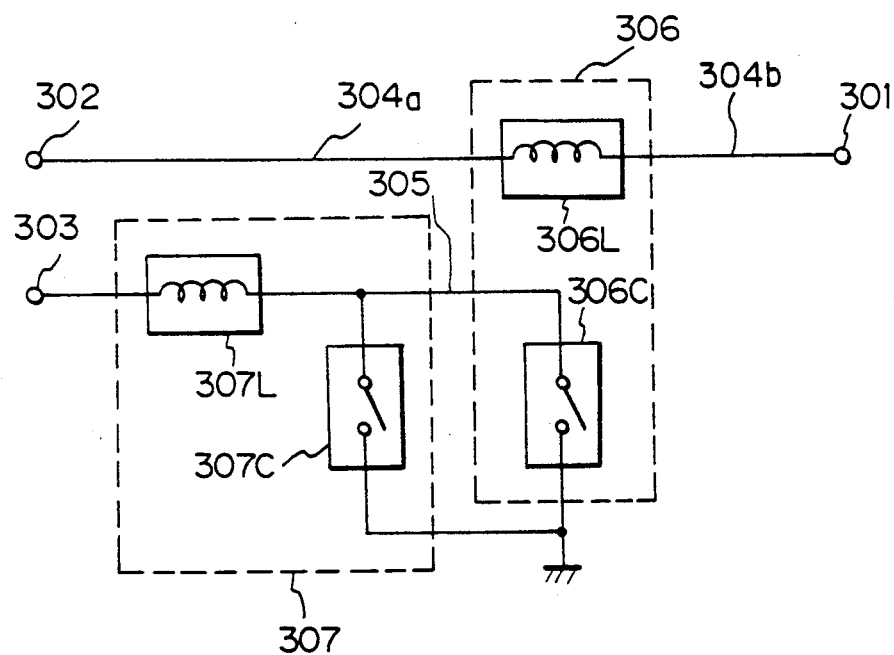
FIG. 38 is a diagram for explaining a principle of a third aspect of the present invention.

FIG. 38 is a diagram for explaining a principle of a third aspect of the present invention.

A power feed line switching circuit for a submarine branching unit of the third aspect of the present invention comprises first, second and third terminals 301, 302, 303 connected respectively to the power feed lines of optical marine cables, a first power feed line 304a, 304b formed between the first and second terminals 301, 302 for power feed in the both-end power feed mode, a second power feed line 305 formed between the third terminal 303 and the ground (undersea ground) for power feed in the one-end power feed mode. Further, the power feed line switching circuit comprises a first relay 306 having a drive unit 306L inserted in the first power feed line 304a, 304b and a switching unit 306C inserted in the second power feed line 305. Note, the switching unit 306C disconnects the third terminal 303 from the ground when the relay is de-energized and grounds the third terminal 303 when the relay is energized. Furthermore, the power feed line switching circuit of the third aspect of the present invention, further comprises a second relay 307 having a drive unit 307L inserted in a grounding line between the third terminal 303 and the ground, and a switching unit 307C connected in parallel to the switching unit 306C of the first relay 306 to form a lock-up circuit for the grounding line.

In the power feed line switching circuits in the third aspect of the present invention, the third terminal 303 is disconnected from the switching unit 306C of the first relay 306 from the ground, when no power is fed to isolate all the power feed lines in the power feed line switching circuit from sea water. Accordingly, it is possible to apply a DC insulation resistance test to the inspection of the power feed lines of the submarine cables of the submarine cable communication system employing the power feed line switching circuit while no power is fed to the submarine cable communication system.

Figure 39:
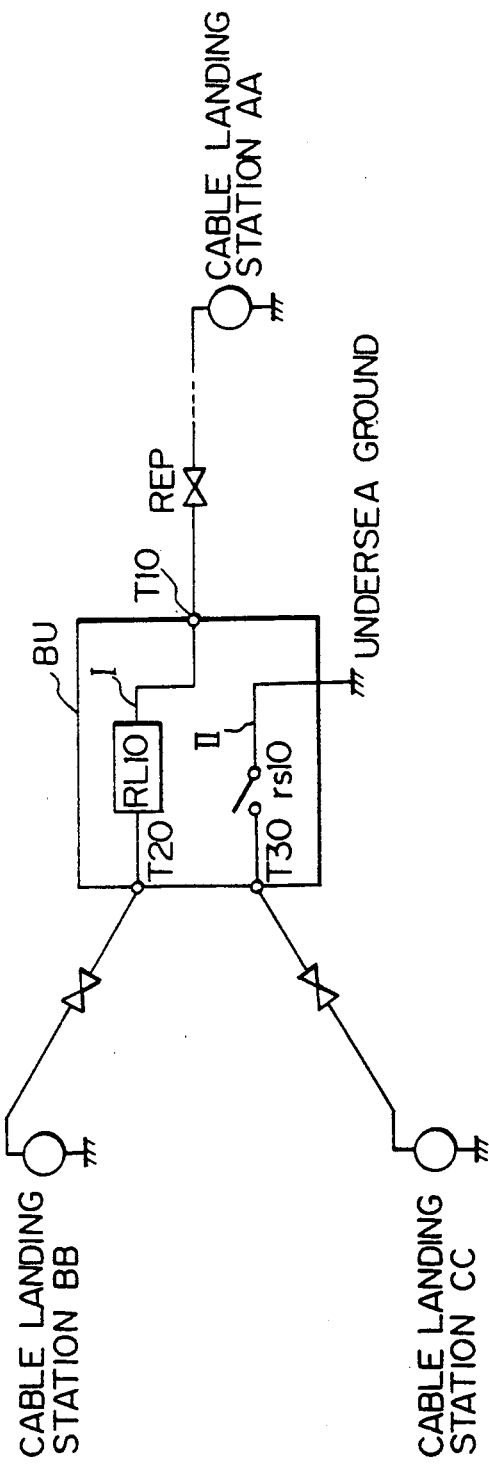
FIG. 39 is a diagram showing a first embodiment of a power feed line switching circuit for a submarine branching unit according to the third aspect of the present invention.

FIG. 39 shows a power feed line switching circuit in a first embodiment according to the third aspect of the present invention for a submarine branching unit BU applied to a submarine optical cable communication system. In FIG. 39, an optical circuit is omitted from the power feed line switching circuit.

Referring to FIG. 39, the submarine branching unit BU has three terminals T10, T20 and T30 connected through the power feed lines of optical marine cables respectively to cable landing stations AA, BB and CC.

The terminals T10 and T20 are interconnected within the submarine branching unit BU by a power feed line I, which is isolated from the ground (undersea ground). A relay RL10 has a driving coil inserted in the power feed line I, and a make contact rs10 inserted in a power feed line II connected to the ground. The terminal T30 is grounded through the make contact rs10 of the relay RL10 and the power feed line II. The relay RL10 is a hightension relay, such as a vacuum relay.

Power is fed in the both-end power feed mode between the two cable landing stations, i.e., the cable landing stations AA and BB, connected to the terminals T10 and T20, and power is fed in the one-end power feed mode from the cable landing station CC connected to the terminal T30.

While no power is fed, the make contact rs10 of the relay RL10 is open to isolate the power feed lines of the submarine cables in the submarine branching unit from sea water (undersea ground), and hence it is possible to conduct a DC insulation resistance test.

A method of feeding power from the cable landing stations AA, BB and CC to the optical marine cables by using the power feed line switching circuit will be described hereinafter with reference to FIG. 40.

In starting the operation, first power is fed in the both-end power feed mode between the cable landing stations AA and BB to energize the relay RL10 inserted in the power feed line I so that the make contact rs10 of the relay RL10 is closed to ground the terminal T30 connected to the cable landing station CC. Then, power is fed in the one-end power feed mode from the cable landing station CC by using the ground of the submarine branching unit BU. In stopping power feed by a power feed stopping procedure, the one-end power feed by the cable landing station CC is stopped, and then the both-end power feed between the cable landing stations AA and BB is stopped.

Figure 41:
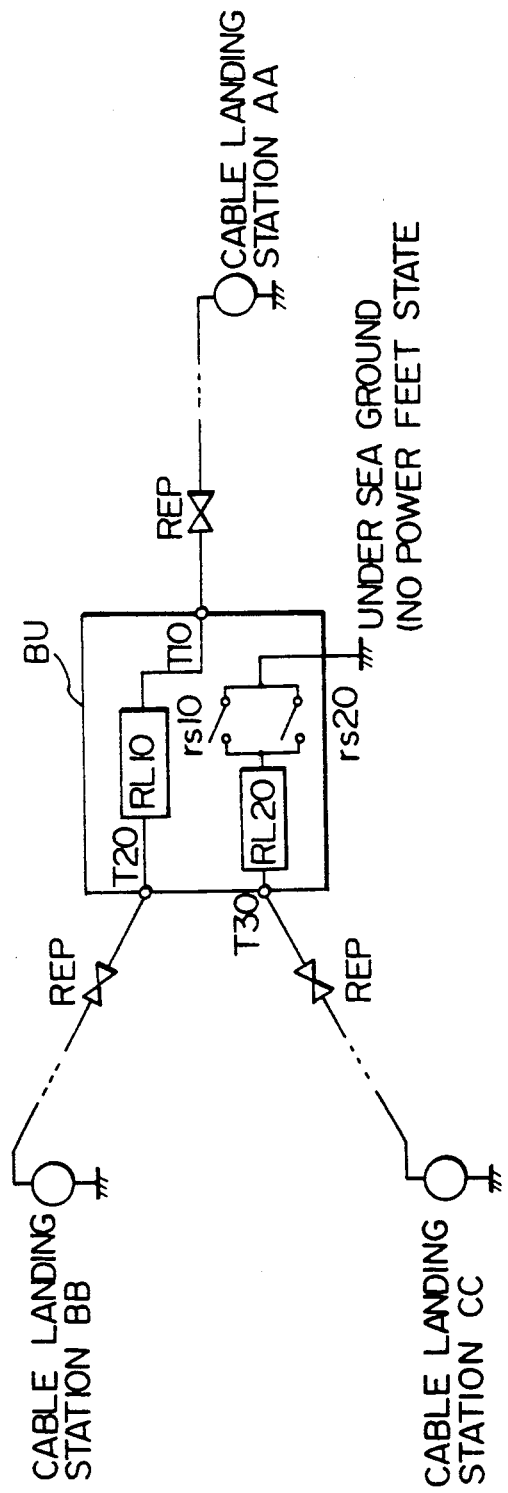
FIG. 41 is a diagram showing a second embodiment of a power feed line switching circuit for a submarine branching unit according to the third aspect of the present invention.

FIG. 41 shows a power feed line switching circuit in a second embodiment of the third aspect of the present invention. In the power feed line switching circuit in the first embodiment, the relay RL10 is de-energized and the make contact r11 is opened if a fault occurs in the power feed line interconnecting the cable landing stations AA and BB during operation or if the power feed stopping procedure is carried out incorrectly. That is, if power feed between the cable landing stations AA and BB is stopped before stopping power feed from the cable landing station CC and, consequently, the power feed line of the submarine cable connected to the operating cable landing station CC is opened during constant-current power feed. If the power feed line is opened during constant-current power feed, a high voltage is generated in the power feed line, which may possibly damage the associated equipment, such as an optical repeater. The power feed line switching circuit shown in FIG. 41 is intended to solve such a problem.

Figure 40:
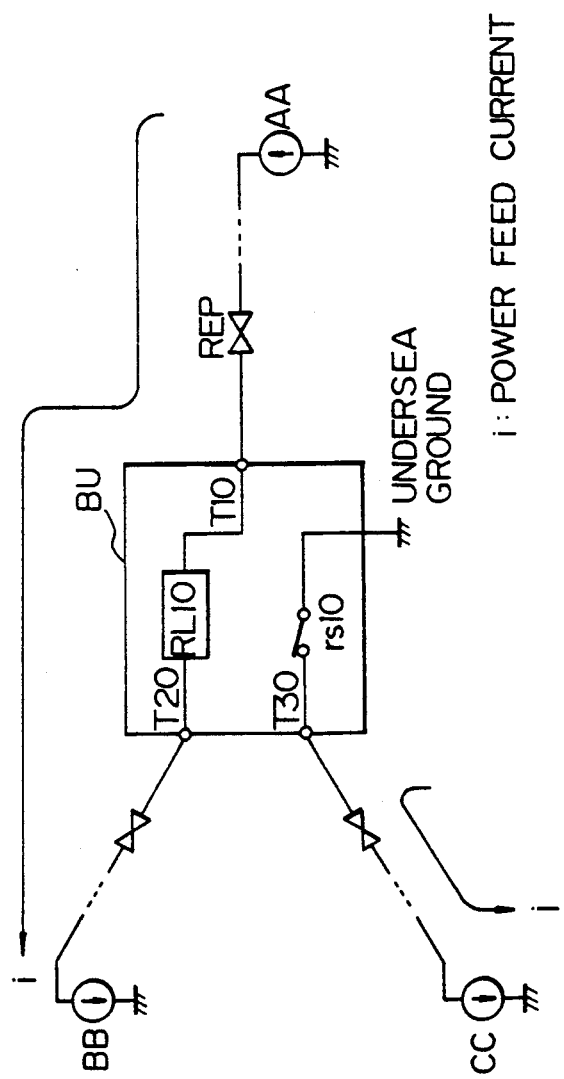
FIG. 40 is a diagram for explaining the operation of the power feed line switching circuit embodying the third aspect of the present invention.

The power feed line switching circuit shown in FIG. 41 is different from that shown in FIG. 40 in that the power feed line switching circuit shown in FIG. 41 is provided, in addition to the components of the power feed line switching circuit shown in FIG. 40, a relay RL2 having a drive unit inserted in the power feed line II connected to the cable landing station CC, and a break contact rs20 connected in parallel to the make contact rs10 of the relay RL10. The break contact rs20 forms a lock-up circuit for the relay RL20.

As is obvious from FIG. 41, the power feed lines of all the optical marine cables are isolated from sea water when no power is fed, so that a DC insulation resistance test is possible.

Figure 42:
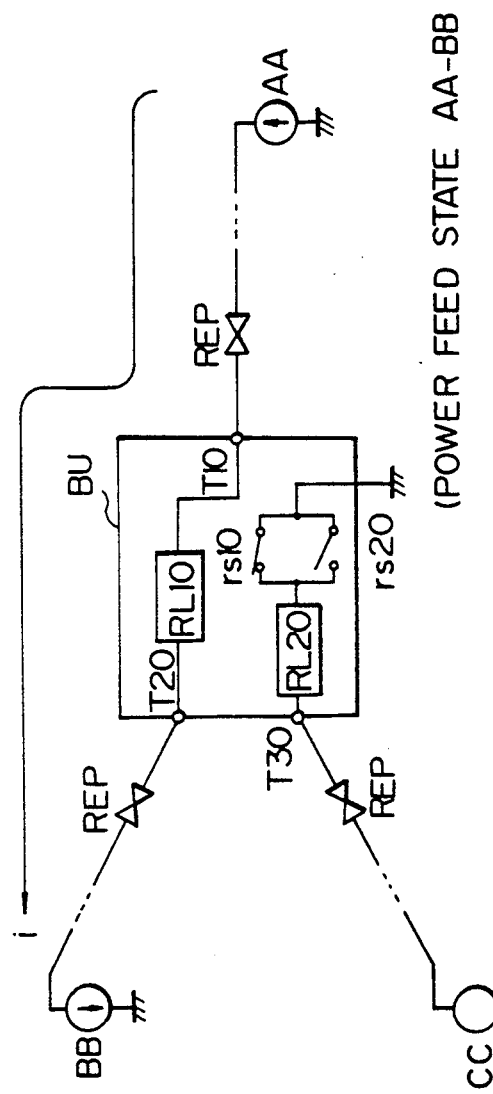
FIGS. 42, 43 and 44 are diagrams for explaining the operation of the power feed line switching circuit shown in FIG. 41.

A power feed start procedure to feed power to the power feed line switching circuit of FIG. 42 will be explained with reference to FIG. 42. First power is fed in the both-end power feed mode between the cable landing stations AA and BB to close the make contact r11 by energizing the relay RL10. Consequently, the power feed line of the optical marine cable connected to the cable landing station CC is grounded undersea to enable the cable landing station CC to feed power.

Figure 43:
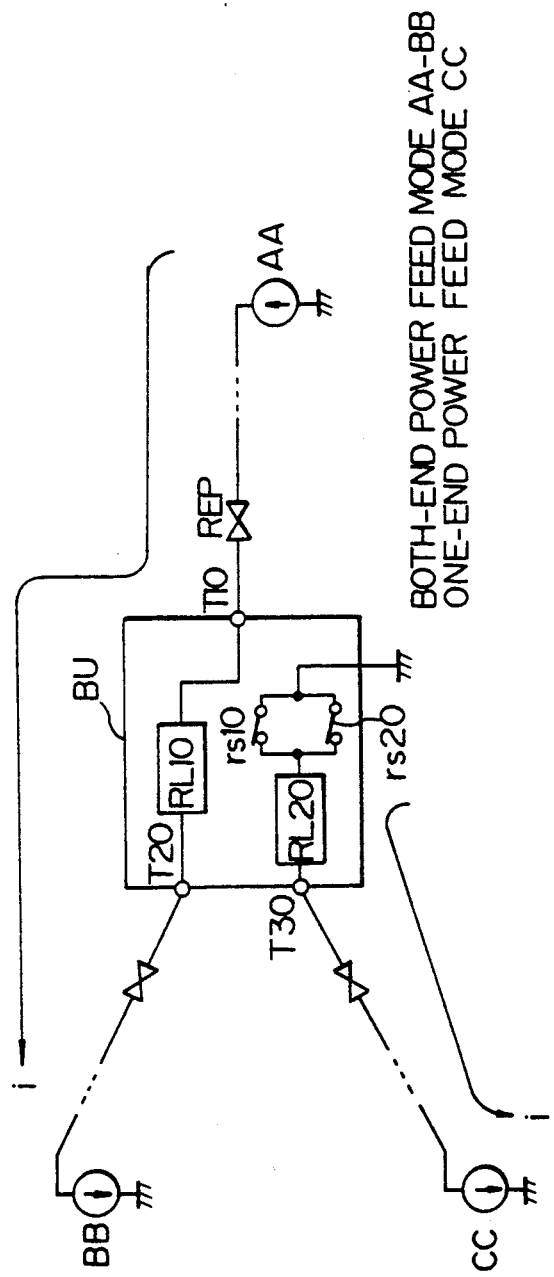

Subsequently, as shown in FIG. 43, power is fed in the one-end power feed mode by the cable landing station CC to close the break contact rs20 by energizing the relay RL20. Consequently, the grounding line II connecting the power feed line connected to the cable landing station CC to the ground is locked up by the relay RL20 as long as current is supplied to the power feed line connected to the cable landing station CC regardless of the condition of the make contact r11 of the relay RL10.

Figure 44:
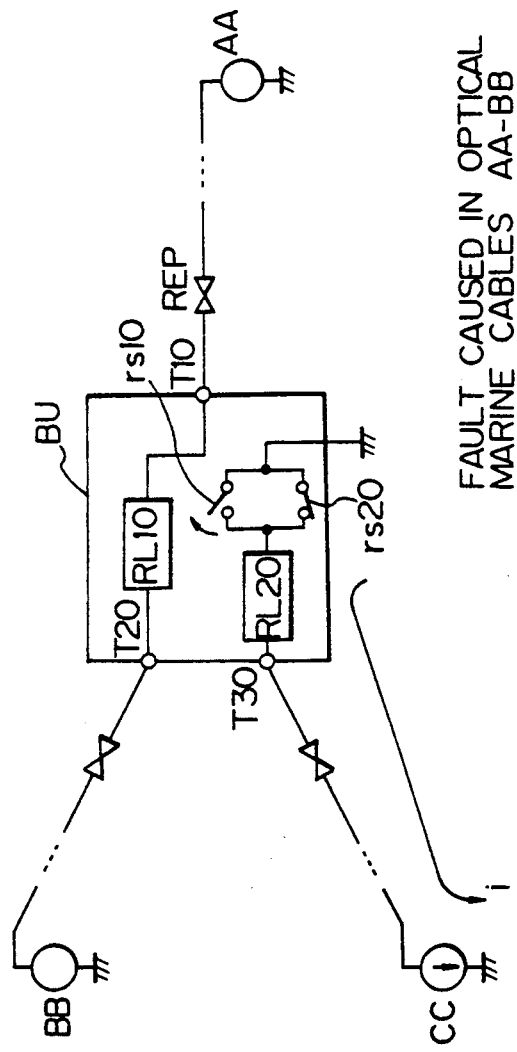

Accordingly, as shown in FIG. 44, the power feed line connected to the cable landing station CC is not opened and hence no high voltage is generated in the power feed line even if the make contact rs10 of the relay RL10 is opened when power feed is interrupted due to the occurrence of a fault in the power feed line between the cable landing stations AA and BB while the cable landing stations AA, BB and CC are in operation.

In stopping power feed, the power feeding operation of the cable landing stations AA and BB is stopped after the power feed operation of the cable landing station CC has been stopped.

Figure 45:
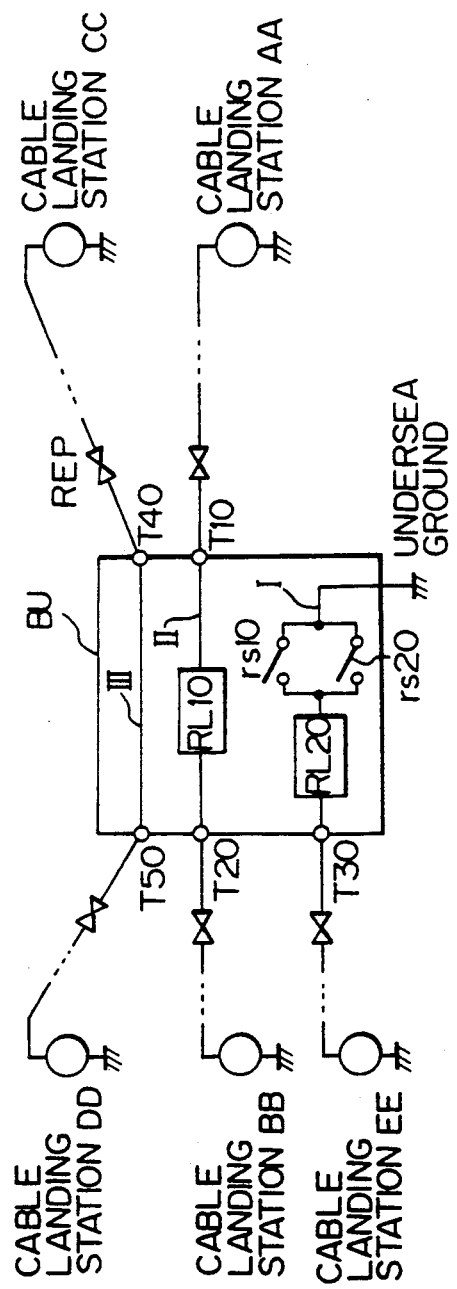
FIG. 45 is a diagram showing a third embodiment of a power feed line switching circuit for a submarine branching unit according to the third aspect of the present invention.

FIG. 45 shows a power feed line switching circuit in a third embodiment of the third aspect according to the present invention incorporated into a submarine branching unit branching five optical marine cables. The power feed line switching circuit shown in FIG. 45 is provided, in addition to the components of the power feed line switching circuit shown in FIG. 41, with terminals T40 and T50, and a both-end power feed line III extending between the terminals T40 and T50.

Figure 46:
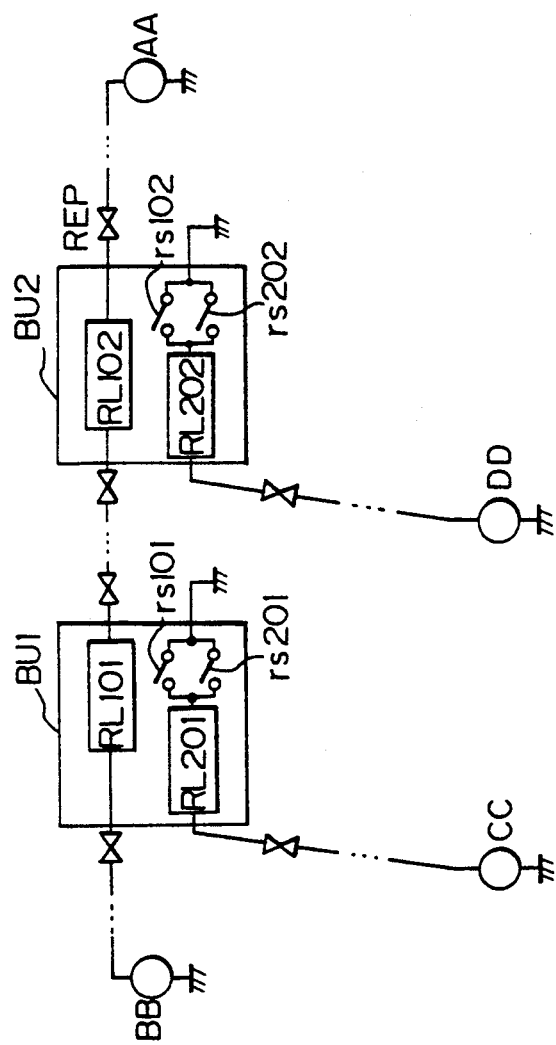
FIG. 46 is a diagram showing a power feed system for a submarine cable communication system using two submarine branching units each incorporating a power feed line switching circuit in accordance with the third aspect of the present invention.

FIG. 46 shows a power feed system for a submarine cable communication system interconnecting four cable landing stations AA, BB, CC and DD by employing two submarine branching units BU1 and BU2 each provided with the power feed line switching circuit of FIG. 41. In this power feed system, the power feed lines I of the respective power feed line switching circuits of the submarine branching units BU1 and BU2 are interconnected by a submarine cable to form a both-end power feed line between the cable landing stations AA and BB. The cable landing stations CC and DD are connected to the submarine branching units BU1 and BU2, respectively, for power feed in the one-end power feed mode.

In carrying out a power feed procedure by the system of FIG. 46, first power is fed in the both-end power feed mode between the cable landing stations AA and BB to ground undersea the power feed lines connected to the cable landing stations CC and DD, and then the cable landing stations CC and DD feed power in the one-end power feed mode.

This power feed system may be provided with more submarine branching units to interconnect more cable landing stations.

Figure 47:
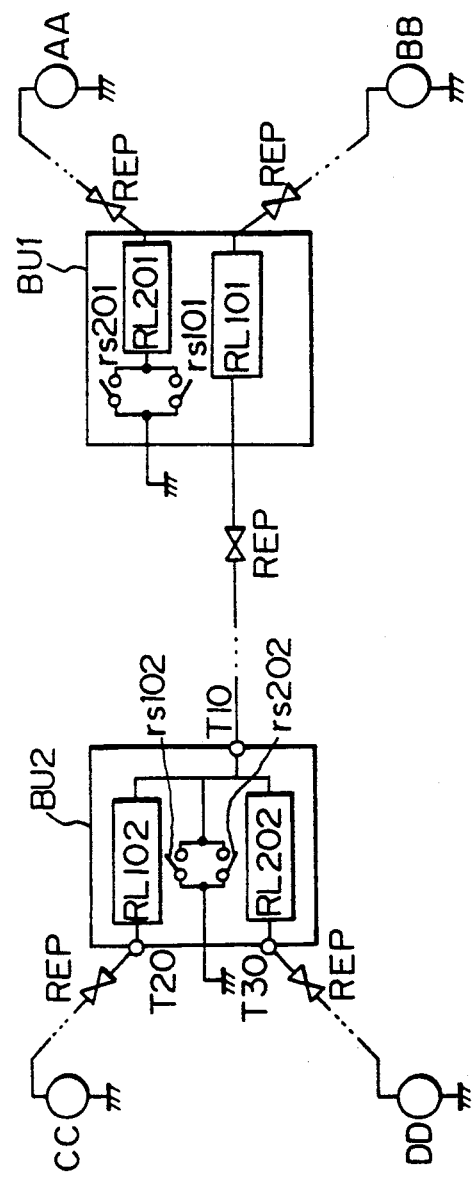
FIGS. 47 and 48 are diagrams showing power feed systems for a submarine cable communication system using two submarine branching units respectively incorporating, in combination, a power feed line switching circuit in accordance with the third aspect of the present invention and a known power feed line switching circuit of the prior art.

FIG. 47 shows a power feed system for a submarine cable communication system interconnecting four cable landing stations AA, BB, CC and DD by using two submarine branching units BU1 and BU2. The submarine branching unit BU1 incorporates the power feed line switching circuit of FIG. 41.

Note, in the above, the submarine branching unit BU2 incorporates a known power feed line switching circuit such as disclosed in Unexamined Japanese Patent Publication (Kokai) No. 1-200832. The power feed line switching circuit of the submarine branching unit BU2 grounds all the power feed lines by feeding power across terminals T10 and T20 (or the terminal T10 and a terminal T30) to close the make contact rs102 (or rs202) by energizing a relay RL102 (or RL202).

The power feed system shown in FIG. 47 using, in combination, the submarine branching units respectively incorporating the power feed line switching circuits of different circuit configurations is able, even if a fault occurs in the power feed line of a submarine cable, to keep the rest of the power feed lines of the submarine cables effective.

Figure 48:
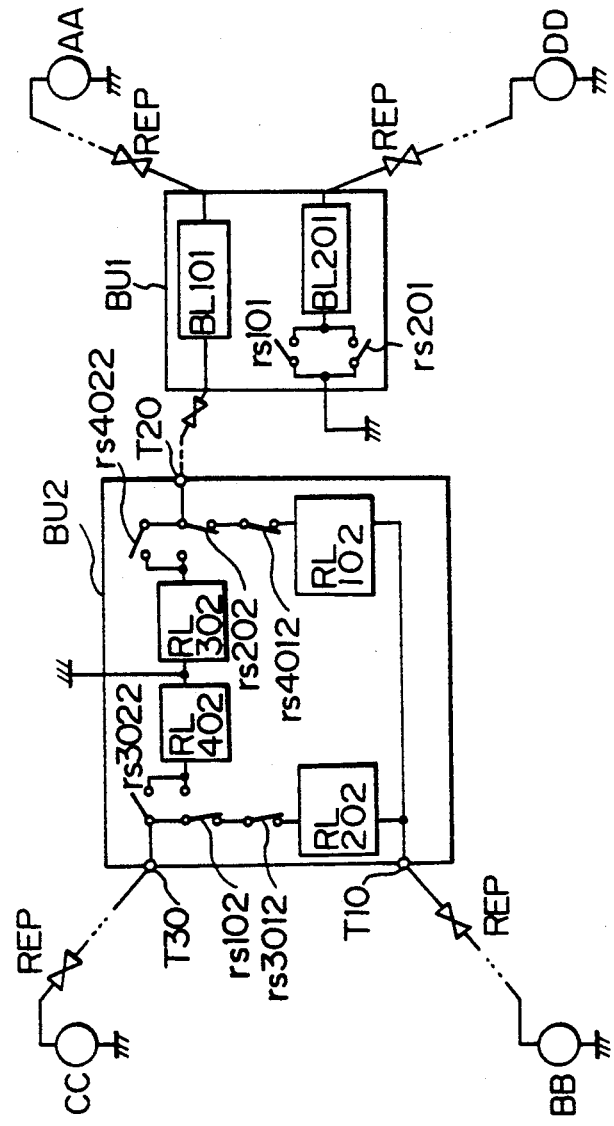

A power feed system shown in FIG. 48 uses, in combination, power feed line switching circuits of different circuit configurations for the same purpose. In FIG. 48, a submarine branching unit BU1 incorporates the power feed line switching circuit shown in FIG. 41, and a submarine branching unit BU2 incorporates, for example, a known power feed line switching circuit disclosed in Japanese Patent Publication (Kokoku) No. 63-189025.

The power feed line switching circuit of the submarine branching unit BU2 feeds power in the both-end power feed mode through a submarine cable connected to terminals T10 and T20 (or a submarine cable connected to the terminal T10 and a terminal T30) to ground the power feed line of a submarine cable connected to the other terminal T30 (or T20) by the contact rs102 (or rs202) of a relay RL102 (or RL202) for power feed in the one-end power feed mode. Relays RL302 and RL402 form lock-up circuits for the one-end power feed lines.

The electromechanical relays, such as vacuum relays, employed in the foregoing embodiments may be substituted by contactless relays, such as solid-state relays comprising semiconductor switching elements instead of transfer contacts and make/break contacts.

According to the above third aspect of the present invention, the power feed lines within the submarine branching units are isolated from sea water and therefore the power feed lines of the submarine cable communication systems can be inspected by a DC insulation resistance test. Furthermore, the power feed system employing the power feed line switching circuit in accordance with the present invention has the both-end power feed line and the one-end power feed line which are separated completely from each other and therefore the power feed units of the cable landing stations need not be provided with any special current control circuit for inverting the polarity of power to be fed, and power feeding operation can be achieved by a simple power feeding procedure.

Many widely different embodiments of the present invention may be constructed without departing from the spirit and scope of the present invention, and it should be understood that the present invention is not limited to the specific embodiments described in this specification, except as defined in the appended claims.

I claim:

1. A power feed line switching circuit for a submarine branching unit comprising:

a first, second and third electrical paths connected in a Y-shaped connection;

a first, second and third terminals connected respectively to the ends of said electrical paths to connect said first, second and third electrical paths to the power feed lines of optical marine cables;

a first relay including a drive means inserted in said first electrical path, and a switching means for disconnecting said second terminal from said second electrical path and connecting said second terminal to the ground;

a second relay including a drive means inserted in said second electrical path, and a switching means for disconnecting said first terminal from said first electrical path and connecting said first terminal to the ground; and a third relay including a drive means inserted in a grounding path between the switching means of said first relay and the ground, and a first switching means to form a lock-up circuit for the grounding path.

2. A power feed line switching circuit for a submarine branching unit as claimed in claim 1, wherein said third relay further includes a second switching means inserted in said second electrical path between the drive means of said second relay and the switching means of said first relay to open said second electrical path simultaneously with the action of said first switching means.

3. A method of feeding power to a submarine cable communication system having optical marine cables branched by one or more submarine branching units to connect three or more cable landing stations, each of said submarine branching units including a power feed line switching circuit, wherein said method comprises the steps of:

establishing a one-end power feed line for said cable landing station connected to said second terminal after establishing a both-end power feed line for said cable landing stations connected to said first and third terminals of said power feed line switching circuit for normal operation; and establishing a both-end power feed line for said cable landing stations connected to said second and third terminals, when said power feed line connecting said cable landing station to said first terminal becomes faulty, to disconnect said faulty power feed line.

4. A method of feeding power to a submarine cable communication system as claimed in claim 3, wherein said power feed line switching circuit comprises:

a first, second and third electrical paths connected in a Y-shaped connection;

a first, second and third terminals connected respectively to the ends of said electrical paths to connect said first, second and third electrical paths to the power feed lines of optical marine cables;

a first relay including a drive means inserted in said first electrical path, and a switching means for disconnecting said second terminal from said second electrical path and connecting said second terminal to the ground;

a second relay including a drive means inserted in said second electrical path, and a switching means for disconnecting said first terminal from said first electrical path and connecting said first terminal to the ground; and a third relay including a drive means inserted in a grounding path between the switching means of said first relay and the ground, and a first switching means to form a lock-up circuit for the grounding path.

5. A method of feeding power to a submarine cable communication system as claimed in claim 4, wherein said third relay further includes a second switching means inserted in said second electrical path between the drive means of said second relay and the switching means of said first relay to open said second electrical path simultaneously with the action of said first switching means.

6. A method of feeding power to a submarine cable communication system as claimed in claim 3, wherein said cable landing stations are specified to four or more, and said method further comprises:

a step of establishing a one-end power feed line for said cable landing station connected to said second terminal of each power feed line switching circuit, after establishing a main power feed line by connecting electrical paths between said first and third terminals through said optical marine cables in a cascade connection with respect to said plurality of submarine branching units for power feed between said two cable landing stations connected respectively to the opposite ends of said main power feed line in said both-end power feed mode.

7. A method of feeding power to a submarine cable communication system as claimed in claim 6, wherein respective operating currents of said first relays of a plurality of power feed line switching circuits in said submarine branching units are different from each other, and the respective first relays of said power feed line switching circuits are driven sequentially by varying said current flowing through said main power feed line.

8. A method of feeding power to a submarine cable communication system as claimed in claim 6, wherein said submarine cable communication system comprises:

at least one submarine branching units each including said power feed line switching circuit; and another submarine branching circuit including a different power feed line switching circuit therefrom.

9. A power feed line switching circuit for a submarine branching unit comprising:

a first, second and third electrical paths connected in a Y-shaped connection;

a first, second and third terminals connected respectively to the ends of said electrical paths to connect said first, second and third electrical paths to the power feed lines of optical marine cables;

a first relay including a drive means inserted in said first electrical path, and a switching means for disconnecting said second terminal from said second electrical path and connecting said second terminal to the ground;

a second relay including a drive means inserted in said second electrical path, and a switching means for disconnecting said third terminal from said third electrical path and connecting said third terminal to the ground; and a third relay including a drive means inserted in said third electrical path, and a switching means for disconnecting said first terminal from said first electrical path and connecting said first terminal to the ground.

10. A power feed line switching circuit for a submarine branching unit as claimed in claim 9, wherein said respective directions of operating currents flowing through said first, second and third relays with respect to the common node of said Y-shaped connection of said electrical paths are the same.

11. A power feed line switching circuit for a submarine branching unit as claimed in claim 9, wherein said power feed line switching circuit further comprises:

a fourth relay including a drive means inserted in a grounding path between the switching means of said first relay and the ground, and a first switching means forming a lock-up circuit for the grounding path; and a fifth relay including a drive means inserted in a grounding path between the switching means of said second relay and the ground, and a first switching means forming a lock-up circuit for the ground path.

12. A power feed line switching circuit for a submarine branching unit as claimed in claim 10, wherein said power feed line switching circuit further comprises a sixth relay including a drive means inserted in a grounding path between the switching means of said third relay and the ground, and a first switching means forming a lock-up circuit for the ground path.

13. A power feed line switching circuit for a submarine branching unit as claimed in claim 11, wherein said fourth relay further includes a second switching means for opening said second electrical path at a position between the drive means of said second relay and the switching means of said first relay simultaneously with said action of the first switching means of said fourth relay, and said fifth relay further includes a second switching means for opening said third electrical path at a position between the drive means of said third relay and the switching means of said second relay simultaneously with said action of the first switching means of said fifth relay.

14. A power feed line switching circuit for a submarine branching unit as claimed in claim 11, wherein said sixth relay further includes a second switching means for opening said first electrical path at a position between the drive means of said first relay and the switching means of said third relay simultaneously with said action of the first switching means of said sixth relay.

15. A method of feeding power to a submarine cable communication system having a submarine branching unit for branching optical marine cables to interconnect three or more land stations, each land station having a power feed unit having a power polarity changing unit, and said submarine branching unit includes a power feed line switching circuit, wherein said method comprises the step of:
    establishing a one-end power feed line for said land station connected to the other terminal, after establishing a both-end power feed line between said land stations connected to said two terminals among said first, second and third terminals of said power feed line switching circuit.

16. A method of feeding power to a submarine cable communication system as claimed in claim 15, wherein said power feed line switching circuit comprises:
    a first, second and third electrical paths connected in a Y-shaped connection;
    a first, second and third terminals connected respectively to the ends of said electrical paths to connect said first, second and third electrical paths to the power feed lines of optical marine cables;
    a first relay including a drive means inserted in said first electrical path, and a switching means for disconnecting said second terminal from said second electrical path and connecting said second terminal to the ground;
    a second relay including a drive means inserted in said second electrical path, and a switching means for disconnecting said third terminal from said third electrical path and connecting said third terminal to the ground; and
    a third relay including a drive means inserted in said third electrical path, and a switching means for disconnecting said first terminal from said first electrical path and connecting said first terminal to the ground.

17. A method of feeding power to a submarine cable communication system as claimed in claim 16, wherein said respective directions of operating currents flowing through said first, second and third relays with respect to the common node of said Y-shaped connection of said electrical paths are the same.

18. A method of feeding power to a submarine cable communication system as claimed in claim 16, wherein said power feed line switching circuit further comprises a sixth relay including a drive means inserted in a grounding path between the switching means of said third relay and the ground, and a first switching means forming a lock-up circuit for the ground path.

19. A method of feeding power to a submarine cable communication system as claimed in claim 18, wherein said sixth relay further includes a second switching means for opening said first electrical path at a position between the drive means of said first relay and the switching means of said third relay simultaneously with said action of the first switching means of said sixth relay.

20. A method of feeding power to a submarine cable communication system having a submarine branching unit for branching optical marine cables to interconnect three or more land stations, each land station having a power feed unit having a power polarity changing unit, and said submarine branching unit includes a power feed line switching circuit, wherein said method comprises the steps of:
    establishing a one-end power feed line for said land station connected to the third terminal, after establishing both-end power feed line between said land stations connected to said first and second terminals of said power feed line switching circuit or between said land stations connected to said first and third terminals; and
    establishing a both-end power feed line, when a fault occurs in said power feed line between said land stations performing both-end power feed, between said land stations connected to said two terminals other than said terminal connected to said faulty power feed line, to disconnect said faulty power feed line.

21. A method of feeding power to a submarine cable communication system as claimed in claim 20, wherein said power feed line switching circuit comprises:
    a first, second and third electrical paths connected in a Y-shaped connection;
    a first, second and third terminals connected respectively to the ends of said electrical paths to connect said first, second and third electrical paths to the power feed lines of optical marine cables;
    a first relay including a drive means inserted in said first electrical path, and a switching means for disconnecting said second terminal from said second electrical path and connecting said second terminal to the ground;
    a second relay including a drive means inserted in said second electrical path, and a switching means for disconnecting said third terminal from said third electrical path and connecting said third terminal to the ground;
    a third relay including a drive means inserted in said third electrical path, and a switching means for disconnecting said first terminal from said first electrical path and connecting said first terminal to the ground;

a fourth relay including a drive means inserted in a grounding path between the switching means of said first relay and the ground, and a first switching means forming a lock-up circuit for the grounding path; and a fifth relay including a drive means inserted in a grounding path between the switching means of said second relay and the ground, and a first switching means forming a lock-up circuit for the ground path.

22. A method of feeding power to a submarine cable communication system as claimed in claim 21, wherein said fourth relay further includes a second switching means for opening said second electrical path at a position between the drive means of said second relay and the switching means of said first relay simultaneously with said action of the first switching means of said fourth relay, and said fifth relay further includes a second switching means for opening said third electrical path at a position between the drive means of said third relay and the switching means of said second relay simultaneously with said action of the first switching means of said fifth relay.

23. A method of feeding power to a submarine cable communication system having a submarine branching unit for branching optical marine cables to interconnect four or more land stations, each land station having a power feed unit having a power polarity changing unit, and said submarine branching unit includes a power feed line switching circuit, wherein said method comprises the steps of:

using a power feed line interconnecting a plurality of power feed line switching circuits through a optical marine cable connected to said first terminal as a main power feed line; and establishing a one-end power feed line for said other land stations, after establishing a both-end power feed line between said two land stations interconnected by said main power feed line.

24. A method of feeding power to a submarine cable communication system as claimed in claim 23, wherein said respective operating currents of said first relay, and said second or third relay of said plurality of power feed line switching circuits are different from each other, and said first relay, and said second or third relay are driven sequentially by varying said current flowing said main power feed line.

25. A method of feeding power to a submarine cable communication system as claimed in claim 23, wherein a power feed line is formed by using said power feed line switching circuit, and a power feed line switching circuit of a circuit configuration other than that of said former power feed line switching circuit.

26. A method of feeding power to a submarine cable communication system as claimed in claim 23, wherein said power feed line switching circuit for a submarine branching unit comprises:

a first, second and third electrical paths connected in a Y-shaped connection;

a first, second and third terminals connected respectively to the ends of said electrical paths to connect said first, second and third electrical paths to the power feed lines of optical marine cables;

a first relay including a drive means inserted in said first electrical path, and a switching means for disconnecting said second terminal from second electrical path and connecting said second terminal to the ground;

a second relay including a drive means inserted in said second electrical path, and a switching means for disconnecting said third terminal from said third electrical path and connecting said third terminal to the ground; and a third relay including a drive means inserted in said third electrical path, and a switching means for disconnecting said first terminal from said first electrical path and connecting said first terminal to the ground.

27. A method of feeding power to a submarine cable communication system as claimed in claim 26, wherein said respective directions of operating currents flowing through said first, second and third relays with respect to the common node of said Y-shaped connection of said electrical paths are the same.

28. A method of feeding power to a submarine cable communication system as claimed in claim 26, wherein said power feed line switching circuit further comprises:

a fourth relay including a drive means inserted in a grounding path between the switching means of said first relay and the ground, and a first switching means forming a lock-up circuit for the grounding path; and a fifth relay including a drive means inserted in a grounding path between the switching means of said second relay and the ground, and a first switching means forming a lock-up circuit for the ground path.

29. A method of feeding power to a submarine cable communication system as claimed in claim 25, wherein said power feed line switching circuit further comprises a sixth relay including a drive means inserted in a grounding path between the switching means of said third relay and the ground, and a first switching means forming a lock-up circuit for the ground path.

30. A method of feeding power to a submarine cable communication system as claimed in claim 28, wherein said fourth relay further includes a second switching means for opening said second electrical path at a position between the drive means of said second relay and the switching means of said first relay simultaneously with said action of the first switching means of said fourth relay, and said fifth relay further includes a second switching means for opening said third electrical path at a position between the drive means of said third relay and the switching means of said second relay simultaneously with said action of the first switching means of said fifth relay.

31. A method of feeding power to a submarine cable communication system as claimed in claim 28, wherein said sixth relay further includes a second switching means for opening said first electrical path at a position between the drive means of said first relay and the switching means of said third relay simultaneously with said action of the first switching means of said sixth relay.

32. A power feed line switching circuit for a submarine branching unit, comprising:

a first, second and third terminals connected respectively to said power feed lines of optical marine cables;

a first power feed line for both-end power feed between said first and second terminals;

a second power feed line for one-end power feed between said third terminal and a ground;

a first relay including a drive means inserted in said first power feed line, and a switching means inserted in said second power feed line to disconnect said third terminal from the ground when said first relay is de-energized and to ground said third terminal when said first relay is energized.

33. A power feed line switching circuit for a submarine branching unit as claimed in claim 32, wherein said power feed line switching circuit further comprises a second relay including a drive means inserted in a grounding line between said third terminal and the ground, and a switching means connected in parallel to the switching means of said first relay to form a lock-up circuit in the grounding line.

34. A method of feeding power to a submarine cable communication system having a submarine branching unit for branching optical marine cables to interconnect three or more land stations, each land station having a power feed unit having a power polarity changing unit, and said submarine branching unit includes a power feed line switching circuit, wherein said method comprises the step of:

forming a power feed line by feeding power in said both-end power feed mode between said cable landing stations connected respectively to said first and second terminals of said power feed line switching circuit, and then feeding power in said one-end power feed mode by said cable landing station connected to said third terminal.

35. A method of feeding power to a submarine cable communication system as claimed in claim 34, wherein said power feed line switching circuit comprises;

a first, second and third terminals connected respectively to said power feed lines of optical marine cables;

a first power feed line for both-end power feed between said first and second terminals;

a second power feed line for one-end power feed between said third terminal and a ground;

a first relay including a drive means inserted in said first power feed line, and a switching means inserted in said second power feed line to disconnect said third terminal from the ground when said first relay is de-energized and to ground said third terminal when said first relay is energized.

36. A method of feeding power to a submarine cable communication system as claimed in claim 35, wherein said power feed line switching circuit further comprises a second relay including a drive means inserted in a grounding line between said third terminal and the ground, and a switching means connected in parallel to the switching means of said first relay to form a lock-up circuit in the grounding line.

37. A method of feeding power to a submarine cable communication system having a submarine branching unit for branching optical marine cables to interconnect four or more land stations, each land station having a power feed unit having a power polarity changing unit, and said submarine branching unit includes a power feed line switching circuit, wherein said method comprises the step of:

forming a main power feed line by connecting said first power feed lines of said power feed line switching circuits included in said plurality of submarine branching units in a series connection, and forming a power feed line by feeding power in said both-end power feed mode between said cable landing stations connected respectively to said ends of said main power feed line, and then feeding power in said one-end power feed mode by said cable landing stations connected respectively to said respective third terminals of said power feed line switching means.

38. A method of feeding power to a submarine cable communication system as claimed in claim 37, wherein said power feed line switching circuit comprises;

a first, second and third terminals connected respectively to said power feed lines of optical marine cables;

a first power feed line for both-end power feed between said first and second terminals;

a second power feed line for one-end power feed between said third terminal and a ground;

a first relay including a drive means inserted in said first power feed line, and a switching means inserted in said second power feed line to disconnect said third terminal from the ground when said first relay is de-energized and to ground said third terminal when said first relay is energized.

39. A method of feeding power to a submarine cable communication system as claimed in claim 38, wherein said power feed line switching circuit further comprises a second relay including a drive means inserted in a grounding line between said third terminal and the ground, and a switching means connected in parallel to the switching means of said first relay to form a lock-up circuit in the grounding line.

* * * * *